(12) United States Patent
Tsuboi et al.

(10) Patent No.: US 10,942,802 B2
(45) Date of Patent: *Mar. 9, 2021

(54) SEMICONDUCTOR DEVICE AND MEMORY ACCESS CONTROL METHOD

(71) Applicant: RENESAS ELECTRONICS CORPORATION, Tokyo (JP)

(72) Inventors: Yukitoshi Tsuboi, Tokyo (JP); Hiroyuki Hamasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,915

(22) Filed: Jun. 25, 2019

(65) Prior Publication Data
US 2019/0317854 A1 Oct. 17, 2019

Related U.S. Application Data

(63) Continuation of application No. 15/446,501, filed on Mar. 1, 2017, now Pat. No. 10,379,941.

(30) Foreign Application Priority Data

Mar. 2, 2016 (JP) .................................. 2016-039566

(51) Int. Cl.
*G06F 11/00* (2006.01)
*G06F 11/10* (2006.01)

(52) U.S. Cl.
CPC ...... *G06F 11/1016* (2013.01); *G06F 11/1044* (2013.01)

(58) Field of Classification Search
None
See application file for complete search history.

(56) References Cited

U.S. PATENT DOCUMENTS

| 5,201,039 A * | 4/1993 | Sakamura | ........... G06F 9/30101 711/201 |
| 6,687,860 B1 * | 2/2004 | Iijima | ................. G06F 12/0207 365/201 |
| 6,697,930 B2 * | 2/2004 | Wise | ..................... G06F 9/3867 712/2 |

(Continued)

FOREIGN PATENT DOCUMENTS

| JP | 05-88992 A | 4/1993 |
| JP | 2008-204084 A | 9/2008 |
| WO | 2008/115400 A1 | 9/2008 |

OTHER PUBLICATIONS

Extended European Search Report issued in corresponding European Patent Application No. 17158017.8, dated Nov. 3, 2017.

(Continued)

*Primary Examiner* — Mujtaba M Chaudry
(74) *Attorney, Agent, or Firm* — McDermott Will & Emery LLP

(57) ABSTRACT

A semiconductor device includes an address conversion circuit which generates the second address for storing an error detecting code in a memory based on the first address for storing data; a write circuit which writes data at the first address and writes an error detecting code at the second address; and a read circuit which reads data from the first address, reads the error detecting code from the second address, and detects an error based on the data and the error detecting code. The address conversion circuit generates an address as the second address by modifying the value of at least one bit of the first address so as to offset the storing position of the error detecting code to the storing position of the data, and by inverting the value of or permutating the order of the prescribed number of bits among the other bits.

15 Claims, 50 Drawing Sheets

(56) References Cited

U.S. PATENT DOCUMENTS

| | | | | |
|---|---|---|---|---|
| 2003/0222283 | A1* | 12/2003 | Takazawa | G11C 29/26 257/200 |
| 2007/0260845 | A1* | 11/2007 | Kita | G06F 12/0246 711/203 |
| 2008/0215955 | A1* | 9/2008 | Kimbara | G06F 11/1008 714/768 |
| 2010/0253555 | A1* | 10/2010 | Weingarten | H03M 13/2906 341/51 |
| 2013/0086449 | A1* | 4/2013 | Giovannini | G06F 11/1044 714/763 |
| 2013/0238959 | A1* | 9/2013 | Birk | G11C 16/3427 714/773 |
| 2014/0136927 | A1* | 5/2014 | Li | G06F 11/1068 714/768 |
| 2016/0246673 | A1* | 8/2016 | Kim | H03M 13/3746 |

OTHER PUBLICATIONS

U.S. PTO Non-Final Office Action issued in corresponding parent U.S. Appl. No. 15/446,501, dated Mar. 13, 2018.
U.S. PTO Final Office Action issued in corresponding parent U.S. Appl. No. 15/446,501, dated Jul. 17, 2018.
U.S. PTO Notice of Allowance issued in corresponding parent U.S. Appl. No. 15/446,501, dated Mar. 25, 2019.
Entire U.S. PTO of corresponding parent U.S. Appl. No. 15/446,501, filed Mar. 1, 2017.
Japanese Office Action issued in corresponding Japanese Patent Application No. 2016-039566, dated Mar. 5, 2019, with English Translation.

\* cited by examiner

FIG. 7

| | NO FAULT IN ADDRESS (ALL BITS) | | A2 BIT AT STUCK-AT-1 FAULT | | A2 BIT AT STUCK-AT-0 FAULT | | A1 BIT AT STUCK-AT-1 FAULT | | A1 BIT AT STUCK-AT-0 FAULT | | A0 BIT AT STUCK-AT-1 FAULT | | A0 BIT AT STUCK-AT-0 FAULT | |
|---|---|---|---|---|---|---|---|---|---|---|---|---|---|---|
| | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) |
| 0 | 000 | 111 | 100 | 111 | 000 | 011 | 010 | 111 | 000 | 101 | 001 | 111 | 000 | 110 |
| 1 | 001 | 110 | 101 | 110 | 001 | 010 | 011 | 110 | 001 | 100 | 001 | 111 | 000 | 110 |
| 2 | 010 | 101 | 110 | 101 | 010 | 001 | 010 | 110 | 000 | 101 | 011 | 101 | 010 | 100 |
| 3 | 011 | 100 | 111 | 100 | 011 | 000 | 011 | 011 | 001 | 100 | 011 | 101 | 010 | 100 |
| 4 | 100 | 011 | 100 | 111 | 000 | 011 | 110 | 011 | 100 | 001 | 101 | 011 | 100 | 010 |
| 5 | 101 | 010 | 101 | 110 | 001 | 010 | 111 | 010 | 101 | 000 | 101 | 011 | 100 | 010 |
| 6 | 110 | 001 | 110 | 101 | 010 | 001 | 110 | 010 | 100 | 001 | 111 | 001 | 110 | 000 |
| 7 | 111 | 000 | 111 | 100 | 011 | 000 | 111 | 010 | 101 | 000 | 111 | 001 | 110 | 000 |

← FAULT IS DETECTED BY ECC ERROR CHECKING (OK) — →

ADR INVERSION

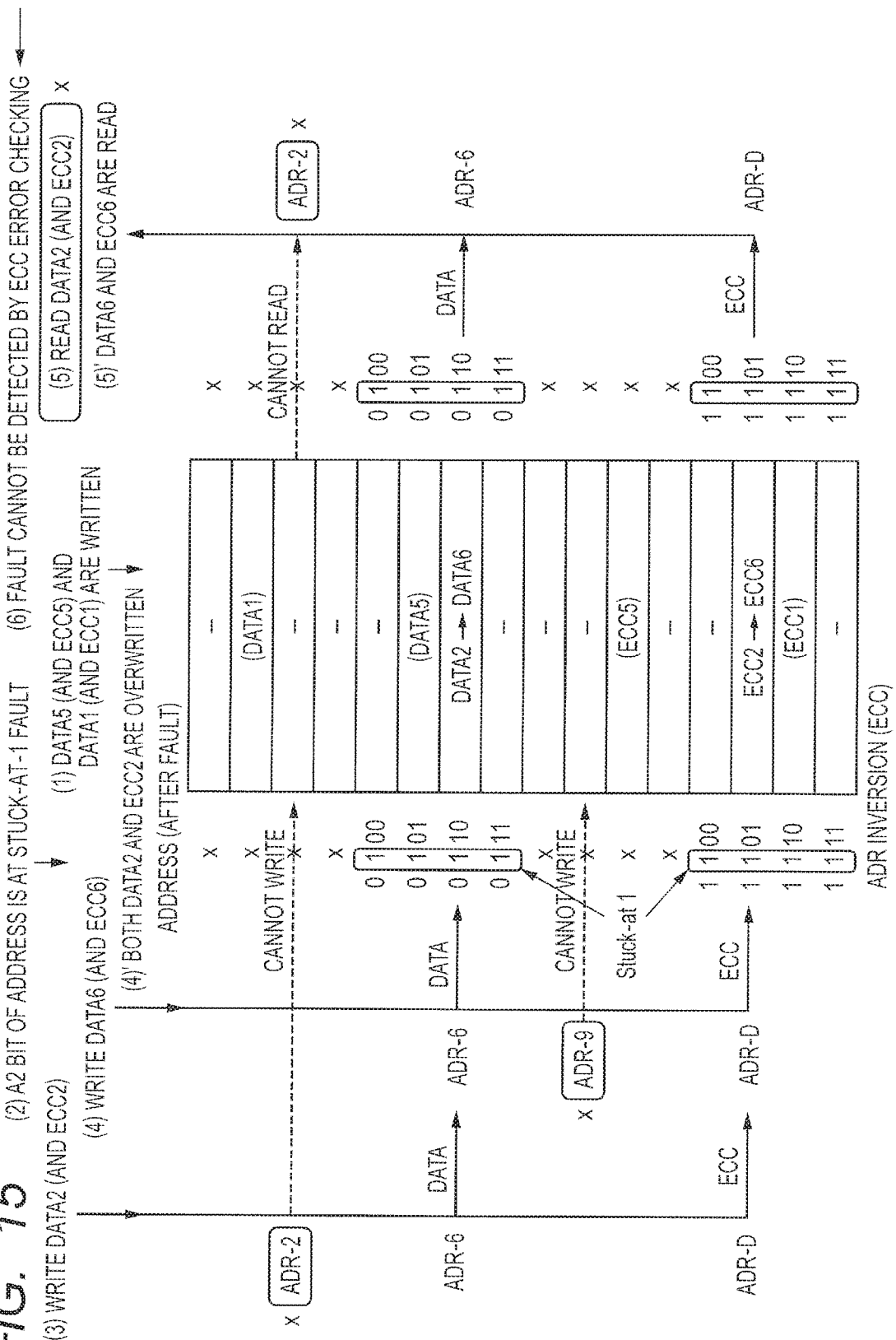

FIG. 16

| | NO FAULT IN ADDRESS (ALL BITS) | | A2 BIT AT STUCK-AT-1 FAULT | | A2 BIT AT STUCK-AT-0 FAULT | | A1 BIT AT STUCK-AT-1 FAULT | | A1 BIT AT STUCK-AT-0 FAULT | | A0 BIT AT STUCK-AT-1 FAULT | | A0 BIT AT STUCK-AT-0 FAULT | |
|---|---|---|---|---|---|---|---|---|---|---|---|---|---|---|
| | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) |
| 0 | 000 | 000 | 100 | 100 | 000 | 000 | 010 | 010 | 000 | 000 | 001 | 001 | 000 | 000 |
| 1 | 001 | 010 | 101 | 110 | 001 | 010 | 011 | 010 | 001 | 000 | 001 | 011 | 000 | 010 |
| 2 | 010 | 100 | 110 | 100 | 010 | 000 | 010 | 110 | 000 | 100 | 011 | 101 | 010 | 100 |
| 3 | 011 | 110 | 111 | 110 | 011 | 010 | 011 | 110 | 001 | 100 | 011 | 111 | 010 | 110 |
| 4 | 100 | 001 | 100 | 101 | 001 | 011 | 110 | 011 | 100 | 001 | 101 | 001 | 100 | 000 |
| 5 | 101 | 011 | 101 | 101 | 010 | 001 | 111 | 011 | 101 | 001 | 101 | 101 | 100 | 010 |
| 6 | 110 | 101 | 110 | 111 | 010 | 011 | 110 | 111 | 100 | 101 | 111 | 101 | 110 | 100 |
| 7 | 111 | 111 | 111 | 111 | 011 | 011 | 111 | 111 | 101 | 101 | 111 | 111 | 110 | 110 |

← FAULT IS DETECTED BY ECC ERROR CHECKING (OK) →

ADR ROTATION

FIG. 17

← FAULT CANNOT BE DETECTED BY ECC ERROR CHECKING →

| | NO FAULT IN ADDRESS (ALL BITS) | | A2 BIT AT STUCK-AT-1 FAULT | | A2 BIT AT STUCK-AT-0 FAULT | | A1 BIT AT STUCK-AT-1 FAULT | | A1 BIT AT STUCK-AT-0 FAULT | | A0 BIT AT STUCK-AT-1 FAULT | | A0 BIT AT STUCK-AT-0 FAULT | |
|---|---|---|---|---|---|---|---|---|---|---|---|---|---|---|
| | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) |
| 0 | 000 | 111 | 100 | 111 | 000 | 011 | 010 | 111 | 000 | 101 | 001 | 111 | 000 | 110 |
| 1 | 001 | 110 | 101 | 110 | 001 | 010 | 011 | 110 | 001 | 100 | 001 | 111 | 000 | 110 |
| 2 | 010 | 101 | 110 | 101 | 010 | 001 | 010 | 111 | 000 | 101 | 011 | 101 | 010 | 100 |
| 3 | 011 | 100 | 111 | 100 | 011 | 000 | 110 | 011 | 001 | 100 | 011 | 101 | 010 | 100 |
| 4 | 100 | 011 | 100 | 111 | 000 | 011 | 110 | 011 | 100 | 001 | 101 | 011 | 100 | 010 |
| 5 | 101 | 010 | 110 | 101 | 001 | 010 | 111 | 010 | 100 | 000 | 001 | 011 | 100 | 010 |
| 6 | 110 | 001 | 110 | 101 | 010 | 001 | 110 | 011 | 101 | 001 | 111 | 001 | 110 | 000 |
| 7 | 111 | 000 | 111 | 100 | 011 | 000 | 111 | 010 | 101 | 000 | 111 | 001 | 110 | 000 |

↑ ADR INVERSION

ADR ROTATION 2

FIG. 21

FIG. 26
CASE OF ADDRESS BEING 3 BITS (N = 3)
→ 2 KINDS
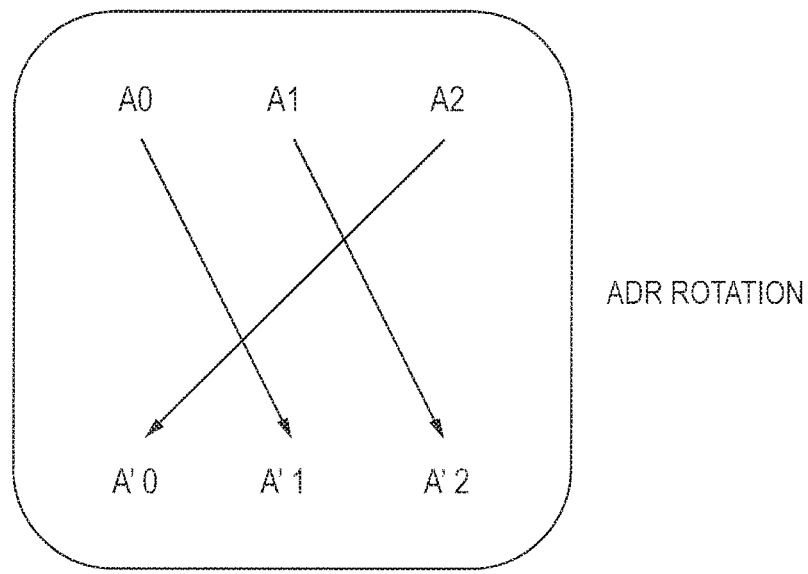
ADR ROTATION
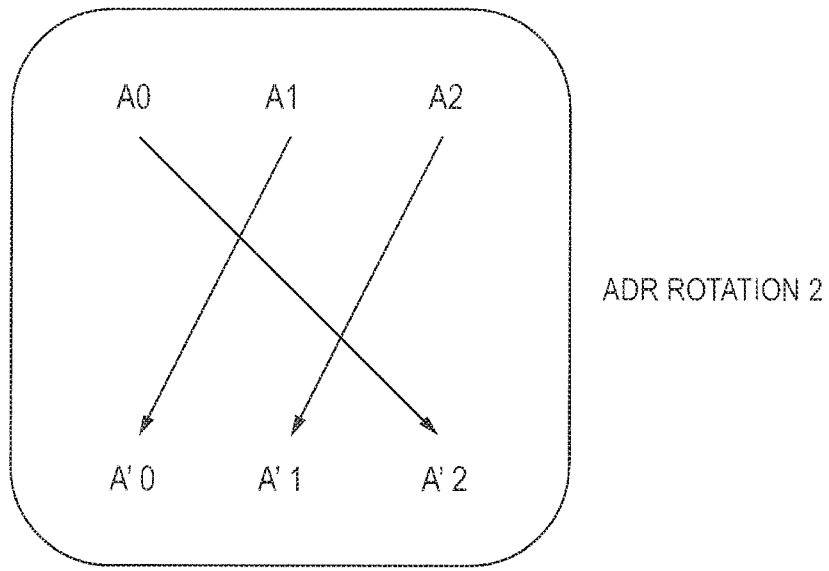
ADR ROTATION 2

FIG. 27
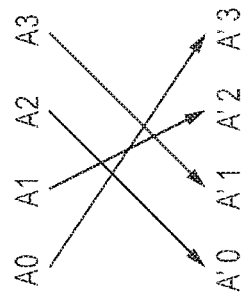
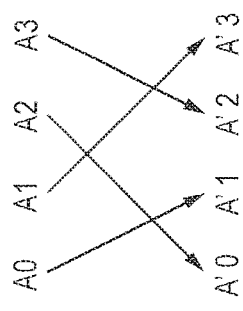
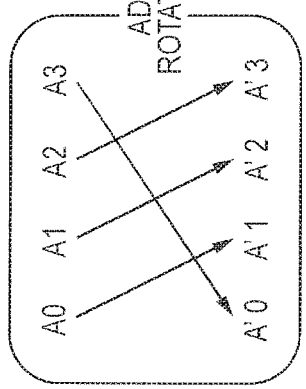
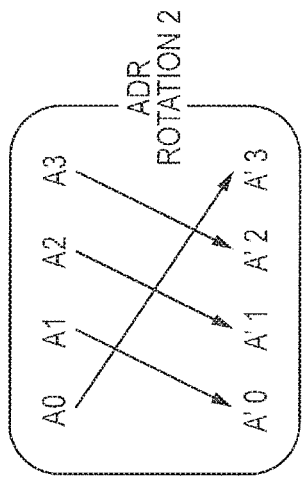
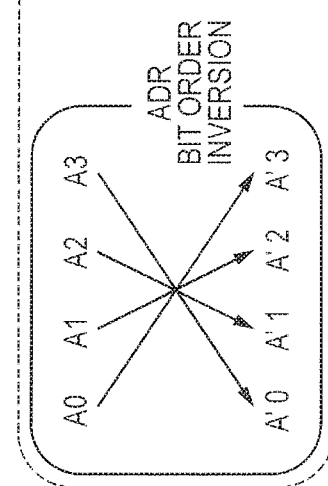

(Eq 1)

$$SN = N! - \sum_{i=2}^{N-1} \binom{N}{i} \cdot S_{i-1} \quad \text{where} \quad \binom{n}{k} = \frac{n!}{k!(n-k)!}$$

FIG. 31

A4 = DATA (0)
A3 A2 A1 A0

| ADDRESS | D7 | D6 | D5 | D4 | D3 | D2 | D1 | D0 |
|---|---|---|---|---|---|---|---|---|
| ADR-00 = 0000 | | | | DATA0 | | | | |
| ADR-01 = 0001 | | | | DATA1 | | | | |
| ADR-02 = 0010 | | | | DATA2 | | | | |
| ADR-03 = 0011 | | | | DATA3 | | | | |
| ADR-04 = 0100 | | | | DATA4 | | | | |
| ADR-05 = 0101 | | | | DATA5 | | | | |
| ADR-06 = 0110 | | | | DATA6 | | | | |
| ADR-07 = 0111 | DATA { | | | DATA7 | | | | |
| ADR-08 = 1000 | | | | DATA8 | | | | |
| ADR-09 = 1001 | | | | DATA9 | | | | |
| ADR-0A = 1010 | | | | DATAA | | | | |
| ADR-0B = 1011 | | | | DATAB | | | | |
| ADR-0C = 1100 | | | | DATAC | | | | |
| ADR-0D = 1101 | | | | DATAD | | | | |
| ADR-0E = 1110 | | | | DATAE | | | | |
| ADR-0F = 1111 | | | | DATAF | | | | |

A4 = ECC (1)
A3 A2 A1 A0

| ADDRESS | D7 | D6 | D5 | D4 | D3 | D2 | D1 | D0 |
|---|---|---|---|---|---|---|---|---|
| ADR-10 = 0000 | | | | ECC0 | | | | |
| ADR-11 = 0001 | | | | ECC4 | | | | |
| ADR-12 = 0010 | | | | ECC8 | | | | |
| ADR-13 = 0011 | | | | ECCC | | | | |
| ADR-14 = 0100 | | | | ECC1 | | | | |
| ADR-15 = 0101 | | | | ECC5 | | | | |
| ADR-16 = 0110 | | | | ECC9 | | | | |
| ADR-17 = 0111 | ECC { | | | ECCD | | | | |
| ADR-18 = 1000 | | | | ECC2 | | | | |
| ADR-19 = 1001 | | | | ECC6 | | | | |
| ADR-1A = 1010 | | | | ECCA | | | | |
| ADR-1B = 1011 | | | | ECCE | | | | |
| ADR-1C = 1100 | | | | ECC3 | | | | |
| ADR-1D = 1101 | | | | ECC7 | | | | |
| ADR-1E = 1110 | | | | ECCB | | | | |
| ADR-1F = 1111 | | | | ECCF | | | | |

ADR ROTATION 3

FIG. 36

| | NO FAULT IN ADDRESS (ALL BITS) | | A3 BIT AT STUCK-AT-1 FAULT | | A3 BIT AT STUCK-AT-0 FAULT | | A2 BIT AT STUCK-AT-1 FAULT | | A2 BIT AT STUCK-AT-0 FAULT | | A1 BIT AT STUCK-AT-1 FAULT | | A1 BIT AT STUCK-AT-0 FAULT | |
|---|---|---|---|---|---|---|---|---|---|---|---|---|---|---|
| | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) | ADDRESS (DATA) | ADDRESS (ECC) |
| 0 | 0000 | 1100 | 1000 | 1100 | 0000 | 0100 → not used | 0100 | 1100 | 0000 | 1000 → not used | 0010 | 1110 | 0000 | 1100 |
| 1 | 0001 | | 1001 | | 0001 | | 0101 | | 0001 | | 0011 | | 0001 | |
| 2 | 0010 | | 1010 | | 0010 | | 0110 | | 0010 | | 0010 | | 0000 | |
| 3 | 0011 | | 1011 | | 0011 | | 0111 | | 0011 | | 0011 | | 0001 | |
| 4 | 0100 | 1101 | 1100 | 1101 | 0100 | 0101 → not used | 0100 | 1101 | 0000 | 1001 → not used | 0110 | 1111 | 0100 | 1101 |
| 5 | 0101 | | 1101 | | 0101 | | 0101 | | 0001 | | 0111 | | 0101 | |
| 6 | 0110 | | 1110 | | 0110 | | 0110 | | 0010 | | 0110 | | 0000 | |
| 7 | 0111 | | 1111 | | 0111 | | 0111 | | 0011 | | 0111 | | 0101 | |
| 8 | 1000 | 1110 | 1000 | 1110 | 0000 | 0110 → not used | 1100 | 1110 | 1000 | 1010 → not used | 1010 | 1110 | 1000 | 1110 |
| 9 | 1001 | | 1001 | | 0001 | | 1101 | | 1001 | | 1011 | | 1001 | |
| A | 1010 | | 1010 | | 0010 | | 1110 | | 1010 | | 1010 | | 1000 | |
| B | 1011 | | 1011 | | 0011 | | 1111 | | 1011 | | 1011 | | 1001 | |
| C | 1100 | 1111 | 1100 | 1111 | 0100 | 0111 → not used | 1100 | 1111 | 1000 | 1011 → not used | 1110 | 1111 | 1100 | 1101 |
| D | 1101 | | 1101 | | 0101 | | 1101 | | 1001 | | 1111 | | 1101 | |
| E | 1110 | | 1110 | | 0110 | | 1110 | | 1010 | | 1110 | | 1100 | |
| F | 1111 | | 1111 | | 0111 | | 1111 | | 1011 | | 1111 | | 1101 | |

ADR SHIFT & OFFSET SETUP (CASE OF B3 = 1 AND B2 = 1)

← FAULT IS DETECTED BY ECC ERROR CHECKING (OK) →

CASE OF A0 BIT AT STUCK-AT 1 FAULT OR A0 BIT AT STUCK-AT 0 FAULT IS SAME AS ABOVE

FIG. 50
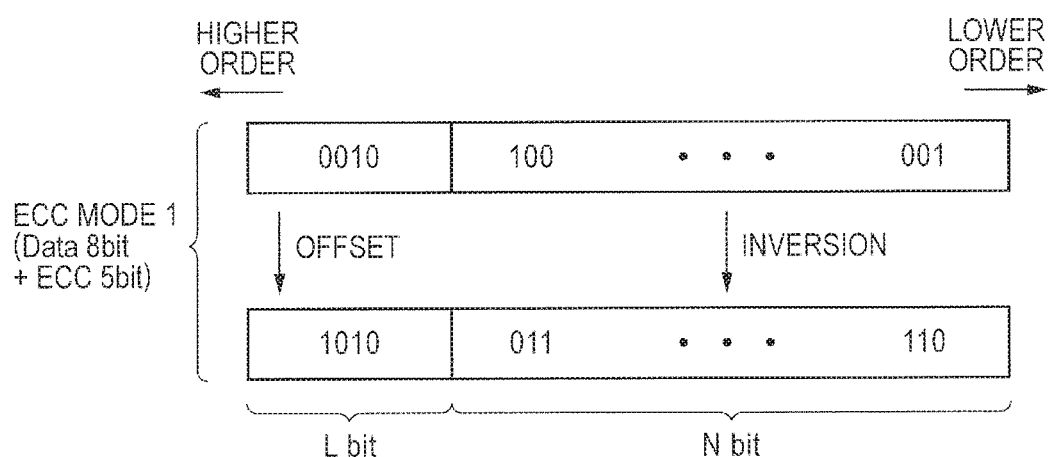
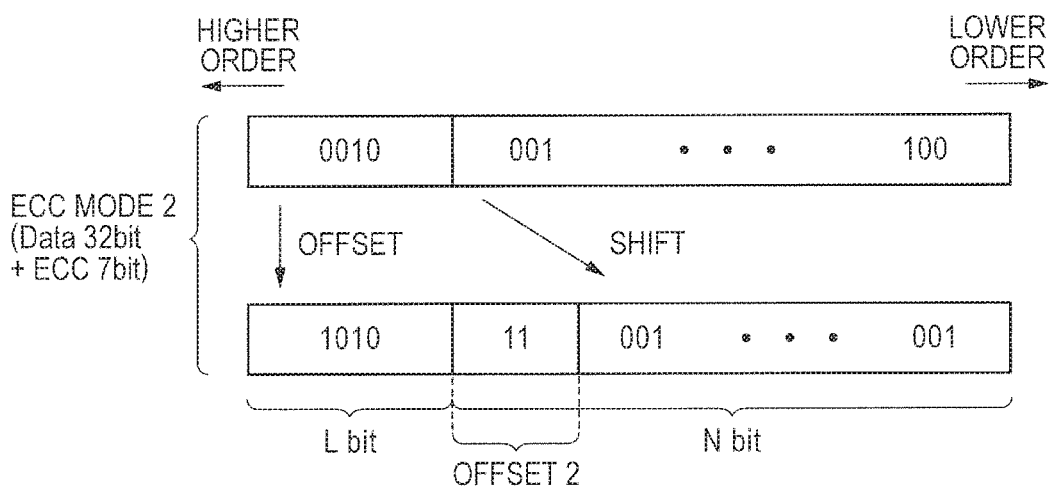

SEMICONDUCTOR DEVICE AND MEMORY ACCESS CONTROL METHOD

CROSS-REFERENCE TO RELATED APPLICATIONS

This is a Continuation of U.S. patent application Ser. No. 15/446,501 filed on Mar. 1, 2017, which claims the benefit of Japanese Patent Application No. 2016-039566 filed on Mar. 2, 2016 including the specification, drawings and abstract are incorporated herein by reference in their entirety.

BACKGROUND

The present invention relates to a semiconductor device and a memory access control method, and relates to the technology of storing data and an error detecting code generated from the data in a memory, for example.

Patent Literature 1 discloses a memory control circuit as an example in the past as illustrated in FIG. 4 of the Patent Literature 1. This memory control circuit includes an address/control-line controlling circuit and an ECC circuit. When an address and data are sent to the memory control circuit from a CPU, the ECC circuit generates ECC data from the data and writes it at a specified address of the memory. When reading data, the ECC circuit creates new ECC data from the data read from the memory, compares the ECC data read from the memory with the newly created ECC data, and makes the error detection and the correction of the data.

However, in this memory control circuit, there is a problem that it is difficult to detect an address error at the time of occurrence of a fault of the value sticking, in any one of the address signal lines which the address/control-line controlling circuit uses to specify the address to the memory. This is because the data and the ECC data created from the data are to be written at the address specified to the memory; accordingly, even if the data and the ECC data are read from an address different from expectation, no disagreement will be detected in comparing the read ECC data with the newly created ECC data.

Here, in order to solve this problem, a computer system disclosed by Patent Literature 1 specifies separately the address to write the data and the address to write the ECC data. However, this technology is completely different from the technology to be disclosed by the present specification in solving the above problem.

(Patent Literature 1) Japanese Unexamined Patent Application Publication No. Hei 5 (1993)-88992.

SUMMARY

As described above, the technology disclosed by Patent Literature 1 has a problem that it is difficult to detect a fault of the address signal system in the memory access.

The other issues and new features of the present invention will become clear from the description of the present specification and the accompanying drawings.

According to one embodiment, a semiconductor device generates an address as a second address for storing an error detecting code, by modifying the value of at least one bit of a first address for storing data so as to offset the storing position of an error detecting code to the storing position of the data, and by inverting the value of or permutating the order of the prescribed number of bits among the other bits.

According to the one embodiment, it is possible to detect a fault of the address signal system in the memory access.

BRIEF DESCRIPTION OF THE DRAWINGS

FIG. 7 is a drawing illustrating a value change of an address signal at the time of occurrence of a stuck-at fault according to Embodiment 1;

FIG. 8 is a drawing illustrating a value change of the address signal at the time of occurrence of a stuck-at fault when not performing an ADR inversion;

FIG. 13 is a drawing illustrating a value change of an address signal at the time of occurrence of a stuck-at fault according to Embodiment 2 (the first example);

FIG. 15 is a conceptual diagram illustrating the operation when performing an ADR inversion (the second example);

FIG. 16 is a drawing illustrating a value change of an address signal at the time of occurrence of a stuck-at fault according to Embodiment 2 (the second example);

FIG. 17 is a drawing illustrating a value change of the address signal at the time of occurrence of a stuck-at fault when performing an ADR inversion (the second example);

FIG. 21 is a drawing illustrating a value change of an address signal at the time of occurrence of another stuck-at fault according to Embodiment 3;

FIG. 26 is a drawing illustrating an address bit permutation pattern of a 3-bit address;

FIG. 27 is a drawing illustrating an address bit permutation pattern of a 4-bit address;

FIG. 31 is a conceptual drawing of a memory map of an internal memory according to Embodiment 5;

FIG. 36 is a drawing illustrating a value change of an address signal at the time of occurrence of a stuck-at fault according to Embodiment 6;

FIG. 50 is a drawing illustrating a change of the address by an address conversion according to Embodiment 12.

DETAILED DESCRIPTION

Hereinafter, preferred embodiments are explained with reference to drawings. Concrete numerical values illustrated in the following embodiments are only an illustration for facilitating understanding of the embodiments, and are not restricted to the values except when it is otherwise specified clearly. In the following descriptions and drawings, an abbreviation and simplification are properly made about what is obvious for a person skilled in the art for clarification of explanation.

Embodiment 1

Figure 1:
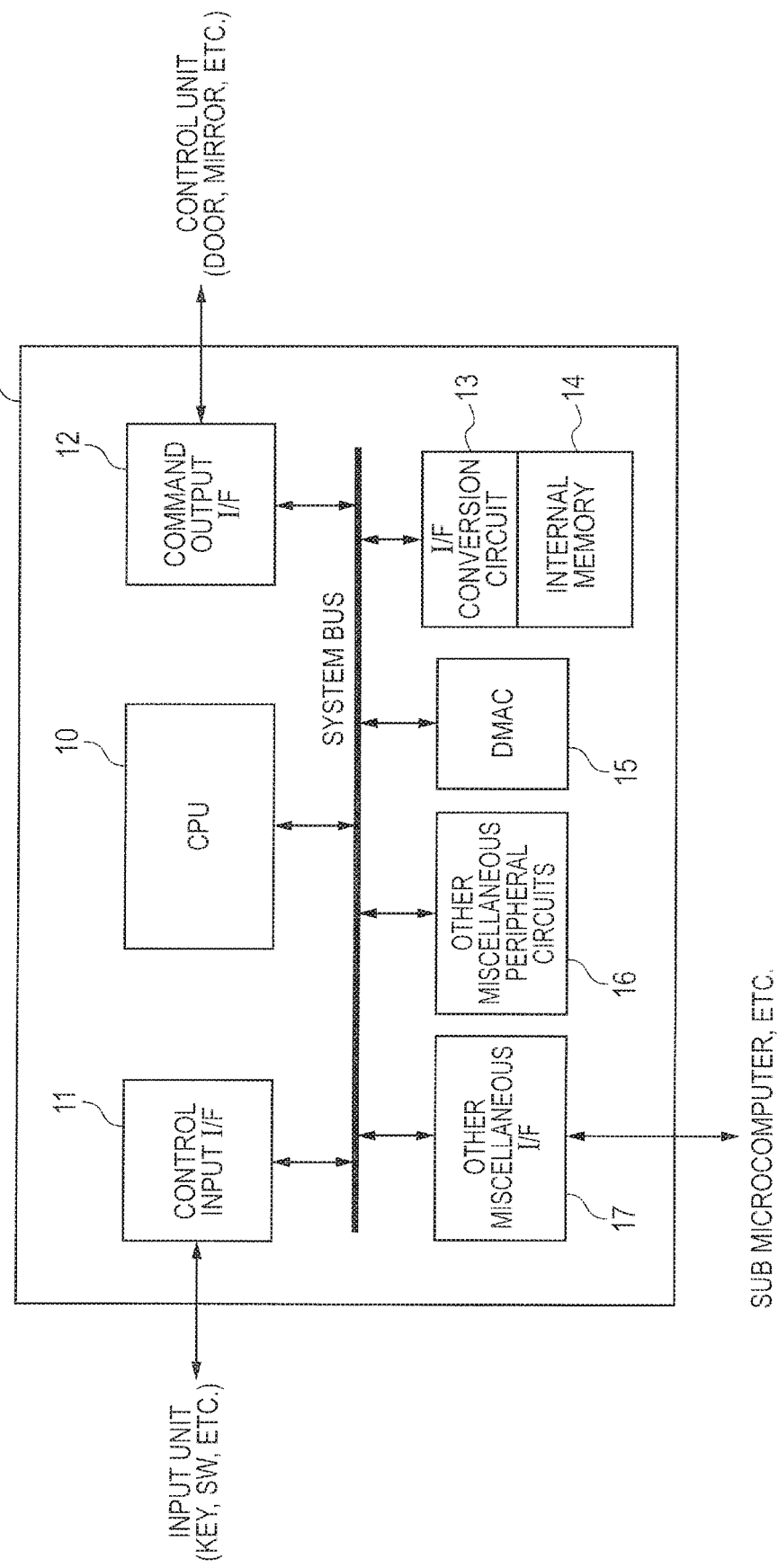
FIG. 1 is a block diagram illustrating the configuration of a CPU system according to Embodiment 1.

First, the configuration and the operation of Embodiment 1 are explained with reference to drawings. With reference to FIG. 1, the configuration of a CPU (Central Processing Unit) system 1 according to Embodiment 1 is explained. As illustrated in FIG. 1, the CPU system. 1 includes a CPU 10, a control input I/F 11, a command output I/F 12, an I/F conversion circuit 13, an internal memory 14, a DMAC (Direct Memory Access Controller) 15, other miscellaneous peripheral circuits 16, and other miscellaneous I/F's 17.

The CPU 10, the control input I/F 11, the command output I/F 12, the I/F conversion circuit 13, the DMAC 15, the other miscellaneous peripheral circuits 16, and the other miscellaneous I/F's 17 are mutually coupled via a system bus. The internal memory 14 is coupled with the system bus via the I/F conversion circuit 13.

Embodiment 1 explains an example in which the CPU system 1 is employed as an in-vehicle control system mounted in a vehicle. However, the example is not restricted to this. The CPU system 1 may be mounted in any equipment which includes an input unit for inputting data to the CPU system 1 and a control unit to which the CPU system 1 performs controls based on the data inputted from the input unit (the equipment includes, for example, transportation machineries such as a vehicle or a motorcycle, construction machineries such as a heavy industrial machine, or industrial machineries such as a manufacture robot). The CPU system 1 may be an information processing system to be mounted in any equipment (for example, information equipment, such as a personal computer or Smartphone), as far as the equipment includes a memory and a device accessible to the memory (for example, a CPU).

The CPU system 1 is built in a micro controller (a semiconductor device), for example. Then, this CPU system 1 can control a vehicle, cooperating with other micro controllers (a "sub microcomputer" in FIG. 1).

The input unit is a device mounted in the vehicle. The input unit receives an input to instruct the control of the control unit from a user. The input unit is a key unit or a switch ("SW" in FIG. 1), for example. In response to the input from the user, the input unit transmits the input data indicative of the inputted content to the CPU system 1.

The control unit is a device mounted in the vehicle. The control unit is controlled by the CPU system 1. The control unit is a door or a mirror, for example. The CPU system 1 generates a command serving as the control data indicative of the control contents of the control unit, based on the inputted content indicated by the input data received from the input unit, and transmits the generated command to the control unit. In response to the command from the CPU system 1, the control unit operates according to the control contents indicated by the command.

The CPU 10 generates control data based on the input data from the input unit. For example, when the control data is for a door, the CPU 10 generates the control data which instructs opening and closing of the door as the control contents. For example, when the control data is for a mirror, the CPU 10 generates the control data which instructs adjustment of the position of the mirror as the control contents.

The control input I/F 11 is an interface circuit which couples the input unit to the system bus. That is, input data to control the control unit is inputted to the control input I/F 11 from the input unit. The command output I/F 12 is an interface circuit which couples the control unit with the system bus. That is, the command output I/F 12 outputs to the control unit the command for controlling the control unit.

The I/F conversion circuit 13 is an interface circuit which couples the internal memory 14 with the system bus. The I/F conversion circuit 13 writes data into the internal memory 14 responding to the request of the write of data from each of the CPU 10 and the DMAC 15. The I/F conversion circuit 13 reads data from the internal memory 14 responding to the request of the read of data from each of the CPU 10 and the DMAC 15. When accessing (writing data into, or reading data from) the internal memory 14 responding to the request from each of the CPU 10 and the DMAC 15, the I/F conversion circuit 13 executes the processing for detecting a fault in a data signal system and an address signal system.

More specifically, when the I/F conversion circuit 13 writes data into the internal memory 14, the I/F conversion circuit 13 also writes an ECC (Error Correcting Code) generated from the data into the internal memory 14. When the I/F conversion circuit 13 reads data from the internal memory 14, the I/F conversion circuit 13 generates an ECC from the read data and detects a fault by comparing the generated ECC with the ECC which has been written in the internal memory 14 with the data. In Embodiment 1, as will be described later, by generating the address to store the ECC from the address to store the data, it is possible to detect not only a fault in the data signal system but also a fault in the address signal system.

The internal memory 14 is a storage circuit in which various kinds of data are stored. That is, the above-described input data, the control data (command), an ECC, etc. are stored in the internal memory 14, for example.

The DMAC 15 realizes data transfer among the circuits 10 to 13, 16, and 17 coupled to the system bus. For example, the DMAC 15 transfers to the I/F conversion circuit 13 the input data inputted from the input unit to the control input I/F 11, and requests the I/F conversion circuit 13 for the write of the transferred input data into the internal memory 14. For example, the DMAC 15 requests the I/F conversion circuit 13 for the read of a command from the internal memory 14, and transfers the command read from the I/F conversion circuit 13 to the command output I/F 12. Accordingly, the command is outputted to the control unit.

Here, the CPU 10 requests the I/F conversion circuit 13 for the read of the input data stored in the internal memory 14 by the DMAC 15, and acquires the input data read by the I/F conversion circuit 13. The CPU 10 generates a command based on the acquired input data, and requests the I/F conversion circuit 13 for the write of the generated command into the internal memory 14. Accordingly, the command stored in the internal memory 14 is transferred by the DMAC 15 as described above.

The CPU system 1 may include arbitrary circuits as the other miscellaneous peripheral circuits 16. The other miscellaneous I/F's 17 are interface circuits which couple other units provided in the in-vehicle control system, such as a sub microcomputer, to the system bus.

As explained above, the CPU 10 and the DMAC 15 operate as a bus master. Other circuits 11 to 13, 16, and 17 operate as a bus slave.

Figure 2:
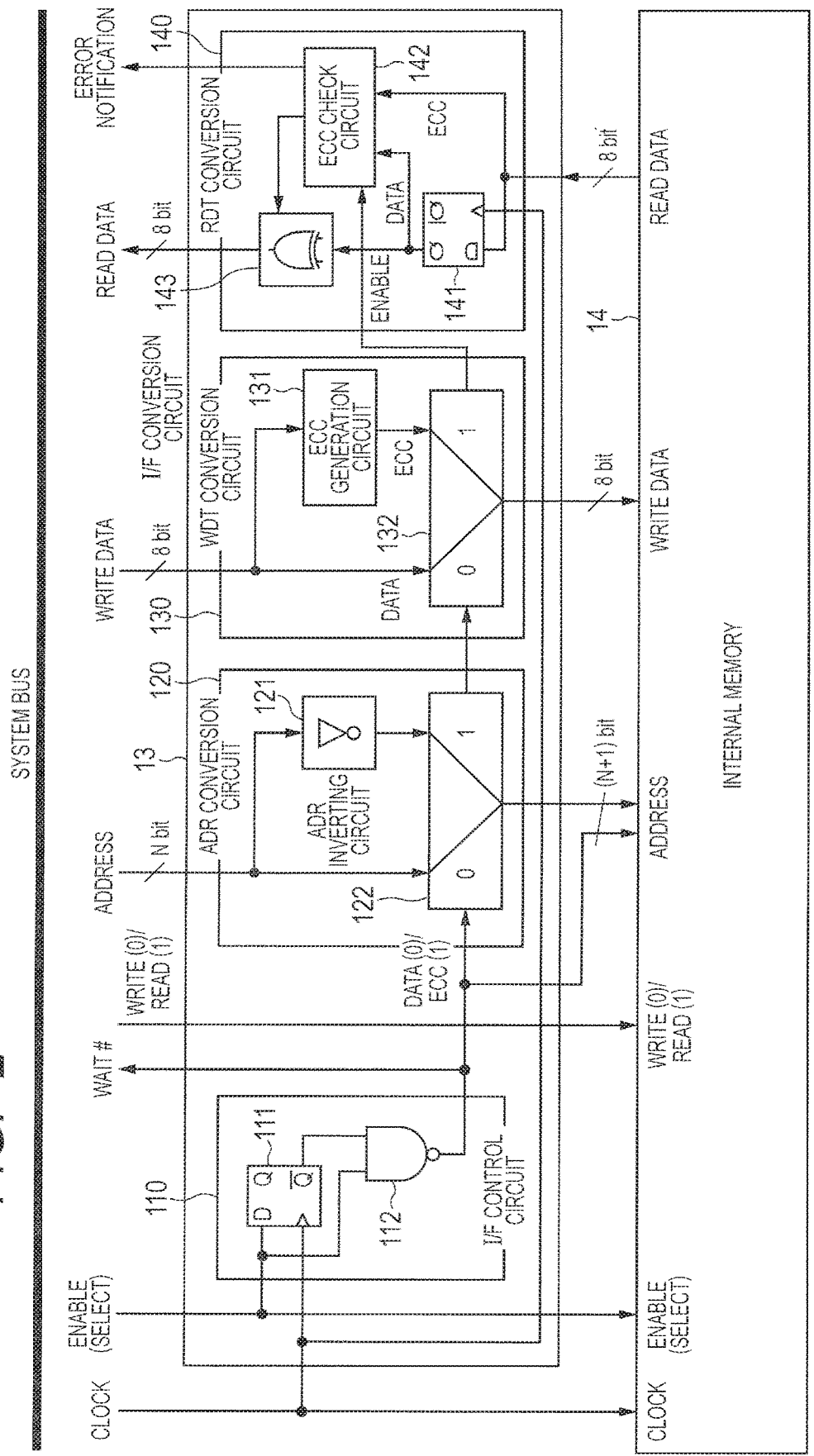
FIG. 2 is a block diagram illustrating the configuration of an I/F conversion circuit according to Embodiment 1.

Next, with reference to FIG. 2, the configuration of the I/F conversion circuit 13 according to Embodiment 1 is explained. As illustrated in FIG. 2, the I/F conversion circuit 13 includes an I/F control circuit 110, an ADR conversion circuit 120, a WDT conversion circuit 130, and an RDT conversion circuit 140. Here, "ADR", "WDT" and "RDT" are abbreviated names respectively indicating an address, write data, and read data.

The bus master outputs an enabling (select) signal, a write/read signal, an address signal, and write data to the I/F conversion circuit 13 via the system bus. The I/F conversion circuit 13 outputs a wait #signal, read data, and an error notification signal to the bus master via the system bus. The I/F conversion circuit 13 and the internal memory 14 operate in synchronization with a clock signal inputted from a clock generating circuit (not shown). "#" of the wait #signal is a symbol which indicates that the wait #signal is an active-low signal.

Here, an example is explained on the following assumption: an enable signal is 1 bit; a write/read signal is 1 bit; an address signal is N bits (N is a prescribed positive integer); write data is 8 bits; a wait #signal is 1 bit; read data is 8 bits; and an error notification signal is 1 bit.

When writing data into the internal memory 14, the bus master outputs to the I/F conversion circuit 13, as signals to request the write of data, an asserted enable signal (the value is "1" for example), a write/read signal to specify the write of data (the value is "0" for example), an address signal indicating the address at which the data is written, and write data serving as the data to be written. Responding to this, the I/F conversion circuit 13 writes the write data at the address indicated by the address signal in the internal memory 14. In this case, the I/F conversion circuit 13 also writes an ECC generated from the write data into the internal memory 14.

When reading data from the internal memory 14, the bus master outputs to the I/F conversion circuit 13 the asserted enable signal (the value is "1"), the write/read signal (the value is "1") to specify the read of data, and the address signal indicating the address from which the data is read. Responding to this, the I/F conversion circuit 13 reads the data stored at the address indicated by the address signal in the internal memory 14, and outputs the data read to the bus master as the read data. In this case, the I/F conversion circuit 13 reads the ECC corresponding to the data from the internal memory 14, and determines whether an error has occurred in the data, based on the ECC read and the data. When the error of the data is detected by this determination, the I/F conversion circuit 13 outputs an error notification signal to notify the error to the bus master. However, in the case of a one-bit error, the read data to be outputted to the bus master is corrected.

When the bus master accesses the internal memory 14, the I/F control circuit 110 prolongs the access up to two clock cycles, by applying wait by one clock cycle to the bus master. Then, the I/F control circuit 110 controls to make the ADR conversion circuit 120, the WDT conversion circuit 130, and the RDT conversion circuit 140 perform the operation concerning the data in the first clock cycle and the operation concerning the ECC in the second clock cycle. That is, by prolonging the output of the signal outputted by the bus master up to the second clock cycle, it is possible for the I/F control circuit 110 to perform the operation concerning the ECC based on the signal in the second clock cycle.

The I/F control circuit 110 includes an enable signal holding circuit 111 and a wait signal generation circuit 112.

When the bus master accesses the internal memory 14, the enable signal holding circuit 111 holds the value of the asserted enable signal in the first clock cycle and outputs a signal as the inverted output of the held value to the wait signal generation circuit 112 in the second clock cycle, in synchronization with the clock signal. That is, the enable signal outputted from the bus master is inputted to the internal memory 14 as it is via the I/F conversion circuit 13, and is inputted to the I/F control circuit 110 as well. The enable signal holding circuit 111 is an FF (Flip-Flop) circuit, for example.

That is, in the first clock cycle, based on the deasserted enable signal (the value is "0") in one previous clock cycle, the enable signal holding circuit 111 outputs the signal (the value is "1") as the inverted output to the wait signal generation circuit 112. Next, in the second clock cycle, based on the asserted enable signal (the value is "1") in one previous clock cycle (the first clock cycle), the enable signal holding circuit 111 outputs a signal (the value is "0") as the inverted output to the wait signal generation circuit 112.

Here, the enable signal indicates whether to enable or disenable the write and read of data. The enable signal is asserted when enabling the write and read of data. The enable signal is deasserted when disenabling the write and read of data.

When the asserted enable signal is inputted, the internal memory 14 writes data into the internal memory 14, based on the write/read signal (specifying the write), the address signal, and the write data which are inputted from the I/F conversion circuit 13, as will be described later. On the other hand, when the deasserted enable signal is inputted, the internal memory 14 does not perform the write of data into the internal memory 14, irrespective of the input of the write/read signal, the address signal, and the write data.

When the asserted enable signal is inputted, the internal memory 14 reads data from the internal memory 14, based on the write/read signal (specifying the read), and the address signal which are inputted from the I/F conversion circuit 13, as will be described later. On the other hand, when the deasserted enable signal is inputted, the internal memory 14 does not perform the read of data from the internal memory 14, irrespective of the input of the write/read signal and the address signal.

The wait signal generation circuit 112 outputs to the bus master a signal as the NAND operation result of the enable signal inputted from the bus master and the signal inputted from the enable signal holding circuit 111, as the wait #signal. The wait signal generation circuit 112 is an NAND circuit, for example.

That is, in the first clock cycle, the wait signal generation circuit 112 outputs to the bus master the asserted wait #signal (the value is "0" for example), based on the asserted enable signal (the value is "1" for example) and the signal (the value is "1" for example) from the enable signal holding circuit 111. While this asserted wait #signal is inputted, the bus master stops the operation. Next, in the second clock cycle, the wait signal generation circuit 112 outputs to the bus master the deasserted wait #signal (the value is "1" for example), based on the enable signal kept asserted (the value is "1" for example) and the signal (the value is "0") from the enable signal holding circuit 111. When this deasserted wait #signal is inputted, the bus master resumes the operation.

In this way, when the bus master accesses the internal memory 14, the access cycle is prolonged by one clock cycle by inputting the asserted wait #signal. Then, the access to the internal memory 14 by the bus master is completed by two clock cycles. Therefore, the output of the enable signal, the write/read signal, the address signal, and the write data is maintained for two clock cycles when the bus master accessing the internal memory 14.

The wait #signal functions also as a data/ECC signal which switches operation of the ADR conversion circuit 120, the WDT conversion circuit 130, and the RDT conversion circuit 140. That is, the wait signal generation circuit 112 outputs the wait #signal to each of the ADR conversion circuit 120, the WDT conversion circuit 130, and the RDT conversion circuit 140 as the data/ECC signal.

The wait #signal functions also as a signal indicating the value of the highest-order bit of the address at which data is written in the internal memory 14 or the address from which data is read in the internal memory 14. That is, the wait signal generation circuit 112 outputs the wait #signal to the internal memory 14 as a signal indicating the highest-order bit of the address.

In the first clock cycle, in order to specify to the internal memory 14 the address at which data is written or read, the ADR conversion circuit 120 outputs the address signal inputted from the bus master to the internal memory 14 as it is. On the other hand, in the second clock cycle, in order to specify to the internal memory 14 the address at which the ECC pairing with the data to write or to read is written or read, the ADR conversion circuit 120 generates the address signal indicating the address at which the ECC is written or read, based on the address signal inputted from the bus master, and outputs the generated address signal to the internal memory 14.

The ADR conversion circuit 120 includes an ADR inverting circuit 121 and a selector 122. The address signal outputted from the bus master is inputted into the ADR inverting circuit 121. The ADR inverting circuit 121 inverts each value of all the bits of the address indicated by the inputted address signal and outputs the address signal to the selector 122. The address signal from the bus master and the address signal from the ADR inverting circuit 121 are inputted into the selector 122. The selector 122 selects one of the address signal from the bus master and the address signal from the ADR inverting circuit 121, and outputs the selected address signal to the internal memory 14.

When it is the first clock cycle in which the data/ECC signal (the value is "0" for example) is inputted from the wait signal generation circuit 112, the selector 122 selects the address signal inputted from the bus master, and outputs the selected address signal to the internal memory 14. On the other hand, when it is the second clock cycle in which the data/ECC signal (the value is "1" for example) is inputted from the wait signal generation circuit 112, the selector 122 selects the address signal inputted from the ADR inverting circuit 121, and outputs the selected address signal to internal memory 14.

Accordingly, in the (N+1)-bit address signal finally inputted into the internal memory 14, the lower order N bits become the N-bit address signal which the ADR conversion circuit 120 has outputted, and the highest order one bit becomes the data/ECC signal which the wait signal generation circuit 112 has outputted.

Then, the internal memory 14 performs the write or read of data to the address indicated by the (N+1)-bit address signal in the first clock cycle. The internal memory 14 performs the write or read of ECC to the address indicated by the (N+1)-bit address signal in the second clock cycle.

In the first clock cycle, in order to write the data into the internal memory 14, the WDT conversion circuit 130 outputs the write data inputted from the bus master to the internal memory 14 as it is. On the other hand, in the second clock cycle, in order to write the ECC pairing with the write data into the internal memory 14, the WDT conversion circuit 130 generates the ECC based on the write data inputted from the bus master and outputs the generated ECC to the internal memory 14.

The WDT conversion circuit 130 includes an ECC generation circuit 131 and a selector 132. The write data from the bus master is inputted into the ECC generation circuit 131. The ECC generation circuit 131 generates the ECC from the inputted write data, and outputs the generated ECC to the selector 132.

The write data from the bus master and the ECC from the ECC generation circuit 131 are inputted into the selector 132. The selector 132 selects one of the write data from the bus master and the ECC from the ECC generation circuit 131 and outputs the selected one to the internal memory 14.

When it is the first clock cycle in which the data/ECC signal (the value is "0" for example) is inputted from the wait signal generation circuit 112, the selector 132 selects the write data inputted from the bus master, and outputs the selected write data to the internal memory 14. On the other hand, when it is the second clock cycle in which the data/ECC signal (the value is "1" for example) is inputted from the wait signal generation circuit 112, the selector 132 selects the ECC inputted from the ECC generation circuit 131, and outputs the selected ECC to the internal memory 14.

Accordingly, when the write/read signal specifying the write of data is inputted, in the first clock cycle, the internal memory 14 stores the write data inputted from the bus master at the address indicated by the (N+1)-bit address signal. In the second clock cycle, the internal memory 14 stores the ECC inputted from the WDT conversion circuit 130 (to be exact, the data which includes a dummy bit and the ECC, as will be described later) at the address indicated by the (N+1)-bit address signal. The write/read signal outputted from the bus master is inputted to the internal memory 14 as it is, via the I/F conversion circuit 13.

On the other hand, when the write/read signal specifying the read of data is inputted, in the first clock cycle, the internal memory 14 outputs the data stored at the address indicated by the (N+1)-bit address signal to the RDT conversion circuit 140 as the read data. In the second clock cycle, the internal memory 14 outputs the ECC stored at the address indicated by the (N+1)-bit address signal to the RDT conversion circuit 140.

The RDT conversion circuit 140 determines whether an error has occurred in the read data based on the read data and the ECC which are inputted from the internal memory 14, when the bus master reads data from the internal memory 14. When no error has occurred in the read data, the RDT conversion circuit 140 outputs the read data inputted from the internal memory 14 to the bus master as it is. On the other hand, when an error has occurred in the read data, the RDT conversion circuit 140 corrects the error in the read data inputted from the internal memory 14 based on the ECC, and then outputs the corrected read data to the bus master.

The RDT conversion circuit 140 includes a data holding circuit 141, an ECC check circuit 142, and an error correction circuit 143.

When the bus master accesses the internal memory 14, the data holding circuit 141 fetches the read data inputted from the internal memory 14 in the first clock cycle, and outputs the read data held to the ECC check circuit 142 and the error correction circuit 143 in the second clock cycle, in synchronization with the clock signal. The data holding circuit 141 is an FF circuit, for example.

The ECC check circuit 142 does not operate in the first clock cycle; however, in the second clock cycle, the ECC check circuit 142 determines whether an error of the data has occurred, based on the read data inputted from the data holding circuit 141 and the ECC inputted from the internal memory 14.

That is, in the first clock cycle, the ECC check circuit 142 does not perform determining of fault, when the data/ECC signal (the value is "0" for example) is inputted from the wait signal generation circuit 112. On the other hand, in the second clock cycle, the ECC check circuit 142 determines whether an error of data has occurred, when the data/ECC signal (the value is "1" for example) is inputted from the wait signal generation circuit 112. In other words, the data/ECC signal functions as an enable signal to indicate whether to enable or to disenable the operation of the ECC check circuit 142.

When the ECC check circuit 142 determines that an error has occurred in any one bit of the data, the ECC check circuit 142 outputs an error correction signal indicating the position of the error bit to the error correction circuit 143. When the ECC check circuit 142 determines that an uncorrectable two or more bit-error has occurred in the data, the ECC check circuit 142 outputs an asserted error notification signal (the value is "1" for example) to the bus master as a signal notifying of occurrence of the error. On the other hand, when the ECC check circuit 142 determines that no uncorrectable two or more bit-error has occurred in the data, the ECC check circuit 142 outputs a deasserted error notification signal (the value is "0" for example) to the bus master as a signal notifying of no occurrence of the error.

When the error has not occurred in the data, the error correction circuit 143 outputs the read data inputted from the data holding circuit 141 in the second clock cycle to the bus master as it is. On the other hand, when the error has occurred in the data, the error correction circuit 143 corrects the error of the read data inputted from the data holding circuit 141 in the second clock cycle, and then outputs the corrected read data to the bus master. More specifically, the error correction circuit 143 outputs the data obtained by inverting the value at the position of the bit indicated by the error correction signal inputted from the ECC check circuit 142 in the read data inputted from the data holding circuit 141, to the bus master as the read data after the error correction. The error correction circuit 143 includes N XOR (exclusive OR) circuits, for example.

Figure 3:
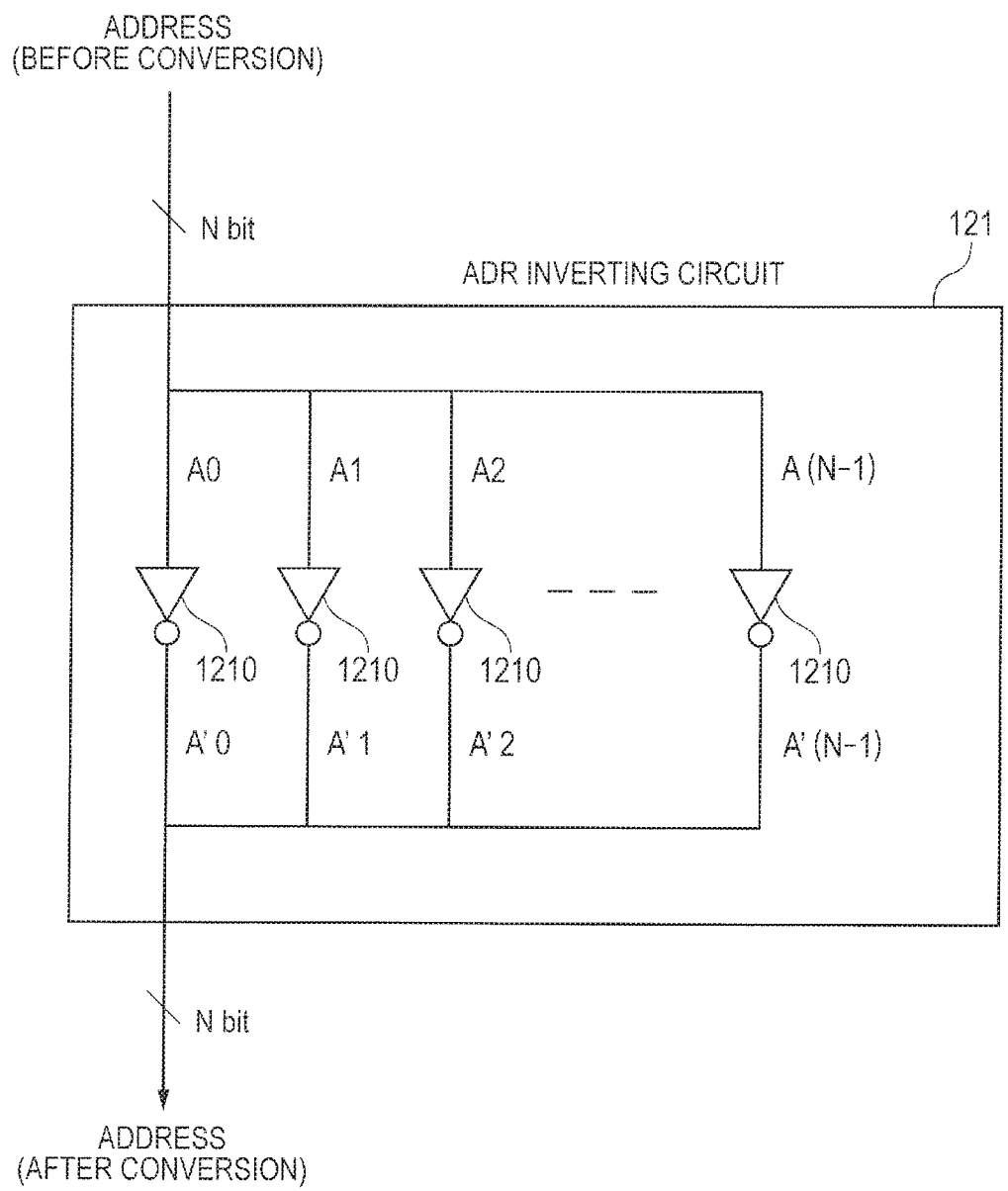
FIG. 3 is a block diagram illustrating the configuration of an ADR inverting circuit according to Embodiment 1.

With reference to FIG. 3, the following explains the configuration of the ADR inverting circuit 121 included in the ADR conversion circuit 120 according to Embodiment 1. As illustrated in FIG. 3, the ADR conversion circuit 120 includes N-piece bit value inverting circuits 1210. Here, an example of the address signal having N bits is explained.

Each of the N-piece bit value inverting circuits 1210 corresponds to each of bits A0, A1, A2, . . . , A(N−1) of the N-bit address signal. Each of the N-piece bit value inverting circuits 1210 inverts the value of the corresponding bit of the address signal, and outputs the value after the inversion. Each of the bits A'0, A'1, A'2, . . . , A'(N−1) outputted from each of the N-piece bit value inverting circuits 1210 are collected as the N-bit address signal, and are outputted to the internal memory 14. Here, the number following "A" indicates that it is a higher order bit as the number becomes greater. That is, in the N bits, "0" indicates that it is the lowest-order bit and "N−1" indicates that it is the highest-order bit. The same is true for the other bits. The bit value inverting circuit 1210 is a NOT (logical NOT) circuit, for example.

Figure 4:
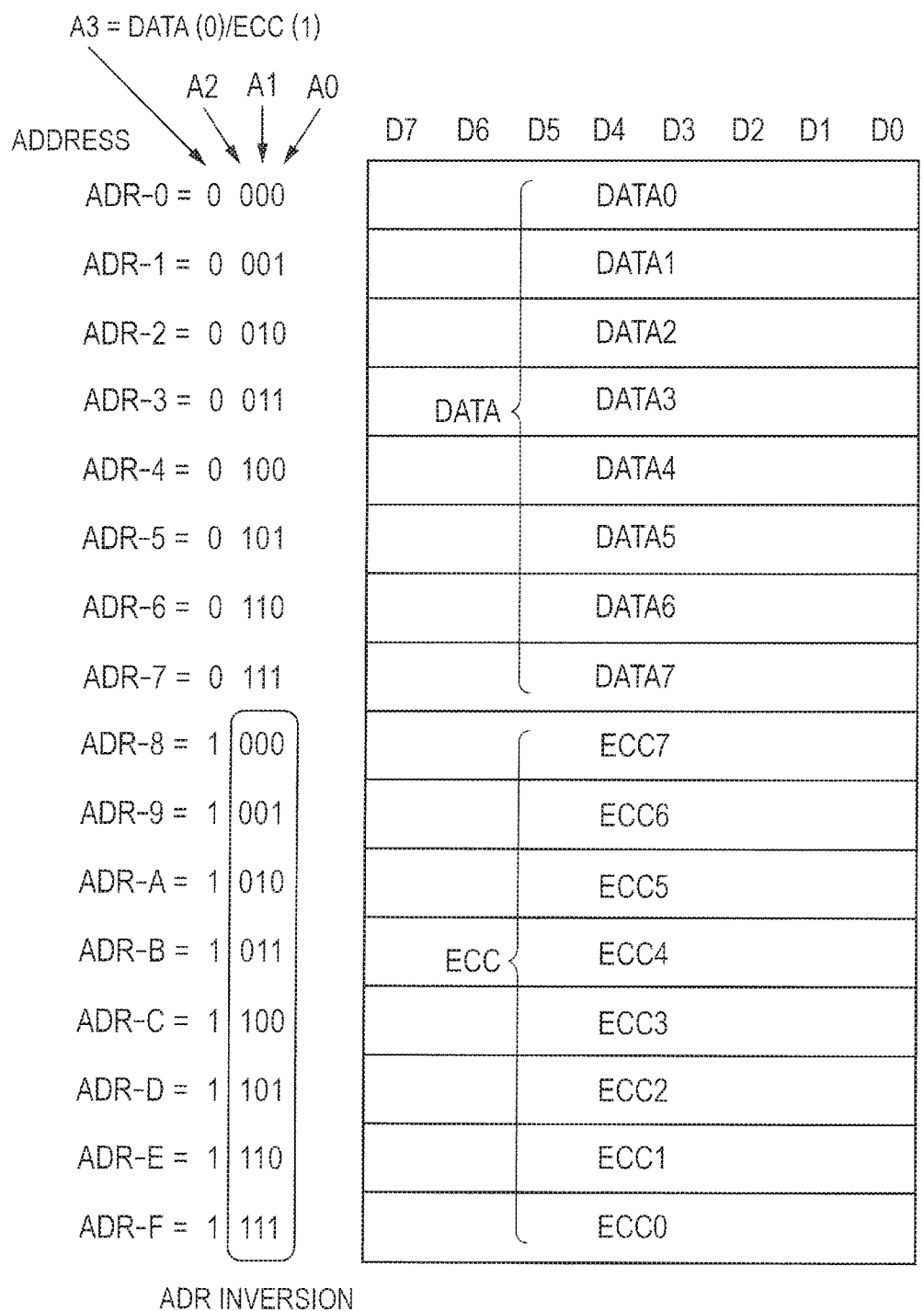
FIG. 4 is a conceptual drawing of a memory map of an internal memory according to Embodiment 1.

Next, with reference to FIG. 4, the memory map of the internal memory 14 according to Embodiment 1 is explained. Here, the explanation is made for the example in which the data width of the internal memory 14 is 8 bits, the address width of the internal memory 14 is (N+1) bits, the data volume of the internal memory 14 is $(8 \times 2^{(N+1)})$ bits, and N=3.

The internal memory 14 uses the lower-order half in FIG. 4 as an area to store the original data and the higher-order half as an area to store the ECC pairing with the original data. That is, the area in the internal memory 14 is distinguished as the area where the data is stored when the value of the highest-order bit of the address (A3 in FIG. 4) is set to "0" in the address space, and as the area where the ECC is stored when the value of the highest-order bit of the address is set to "1." In Embodiment 1, to the value of the lower-order N bits (A2 to A0 in FIG. 4) of the address at which the data is stored, the value of the lower-order N bits of the address at which the ECC pairing with the data is stored is the value obtained by inverting the bit value by the operation of the ADR inverting circuit 121 illustrated in FIG. 3 (the portion where the value of A2 to A0 is labeled as "ADR inversion" in FIG. 4).

That is, as illustrated in FIG. 4, the data ("DATA0") of the address ADR-0 ("0000") and the ECC ("ECC0") of the address ADR-F ("1111") make a pair. The data ("DATA1") of the address ADR-1 ("0001") and the ECC ("ECC1") of the address ADR-E ("1110") make a pair. The data ("DATA2") of the address ADR-2 ("0010") and the ECC ("ECC2") of the address ADR-D ("1101") make a pair. The data ("DATA3") of the address ADR-3 ("0011") and the ECC ("ECC3") of the address ADR-C ("1100") make a pair. The data ("DATA4") of the address ADR-4 ("0100") and the ECC ("ECC4") of the address ADR-B ("1011") make a pair. The data ("DATA5") of the address ADR-5 ("0101") and the ECC ("ECC5") of the address ADR-A ("1010") make a pair. The data ("DATA6") of the address ADR-6 ("0110") and the ECC ("ECC6") of the address ADR-9 ("1001") make a pair. The data ("DATA7") of the address ADR-7 ("0111") and the ECC ("ECC7") of the address ADR-8 ("1000") make a pair.

Here, the portion corresponding to "n" of "ADR-n" illustrated in FIG. 4 is the hexadecimal number notation of the address. That is, "ADR-0" designates that the address is "0000" and "ADR-F" designates that the address is "1111."

The ECC generated from the 8-bit data has 5 bits. Accordingly, the ECC is changed to 8-bit data by adding dummy bits (the value is "0" for example) to the higher order three bits, and stored in the internal memory 14.

The internal memory 14 is configured as explained above, and the I/F conversion circuit 13 provided corresponding to the internal memory 14 also operates as explained above. Therefore, when an error occurs in any bit of the data written in the internal memory 14, the error of the data is detected by the RDT conversion circuit 140 of the I/F conversion circuit 13 when the data is read. Then, when a one-bit error is detected, the error is corrected. When a two or more-bit error is detected, an error notification signal is issued indicating that the error is uncorrectable.

Accordingly, when a stuck-at fault (sticking to 0 or 1) occurs due to a fault (disconnection) of any one or more lines among eight signal lines of the write data (8 bits) to be outputted to the internal memory 14 from the WDT conversion circuit 130 of the I/F conversion circuit 13, in both the data and the ECC which make a pair mutually, the value at the position of a bit corresponding to the broken signal line becomes a different value from the original value (an inverted value). Therefore, when reading the data, the value change is certainly detected as a one-bit error or a two or more-bit error in the ECC check circuit 142. It is also true when a stuck-at fault (sticking to 0 or 1) occurs due to a fault (disconnection) of any one or more lines among eight signal lines of the read data (8 bits) which the RDT conversion circuit 140 of the I/F conversion circuit 13 inputs from the internal memory 14.

On the other hand, the following explains the case where a stuck-at fault (sticking to 0 or 1) occurs due to a fault (disconnection) of any one or more lines among the N signal lines of an address signal (N bits) to be inputted into the internal memory 14 from the ADR conversion circuit 120 of the I/F conversion circuit 13.

Figure 5:
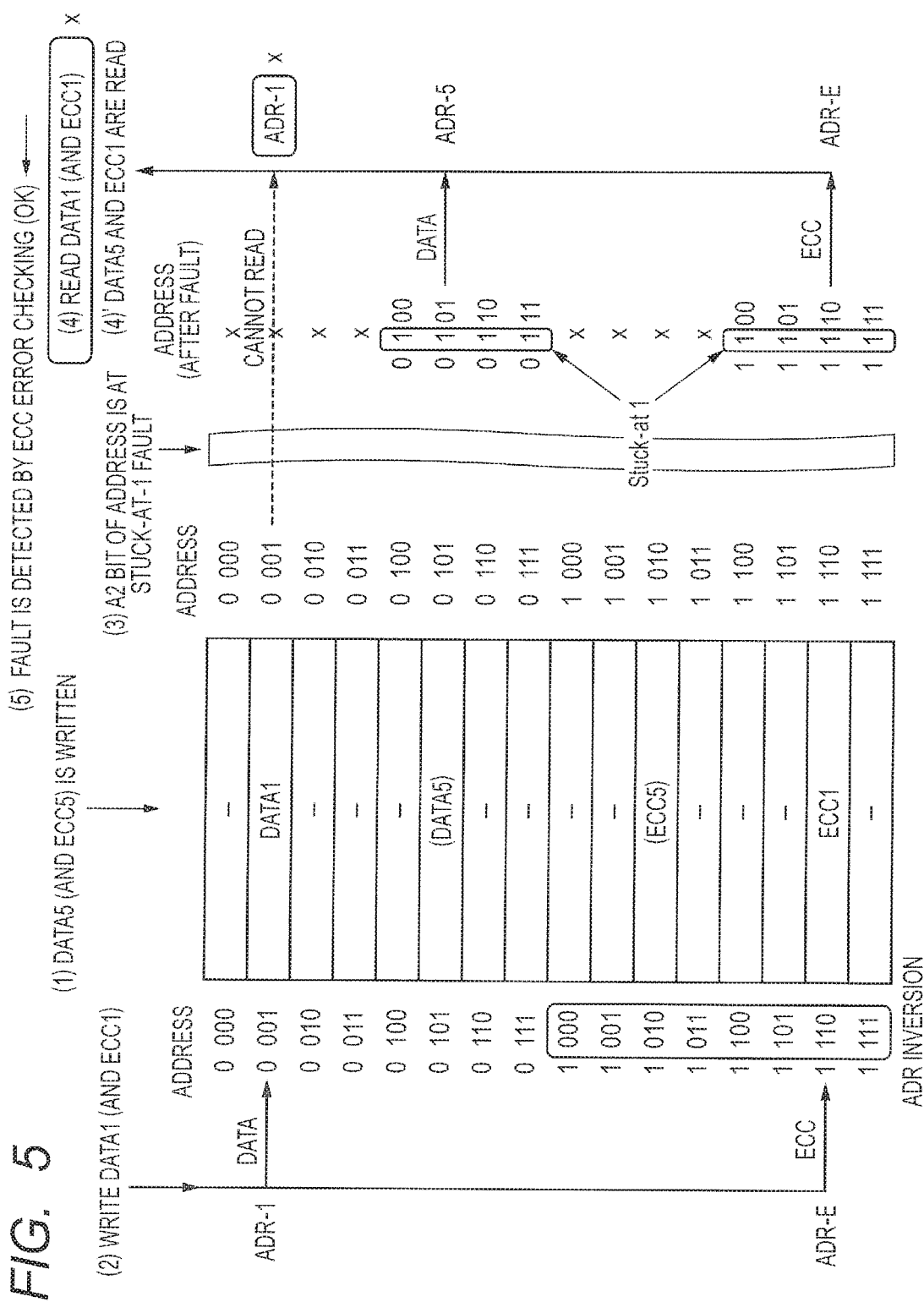
FIG. 5 is a conceptual diagram illustrating the operation of the I/F conversion circuit according to Embodiment 1.

With reference to FIG. 5, the following explains the operation in the case where a stuck-at-1 fault (sticking to 1) occurs in A2 bit of the address signal (N bits) to be inputted into the internal memory 14. It is assumed that the internal memory 14 has N=3, as illustrated in FIG. 4. Here, the explanation is made for the case where the write and read of data are performed by the following flows.

(1) The data ("DATA5") is written at the address ADR-5 ("0101") and the ECC ("ECC5") pairing with the data is written at the address ADR-A ("1010"). In the diagram, "DATA5" and "ECC5" are expressed in parentheses.

(2) The data ("DATA1") is newly written at the address ADR-1 ("0001"), and the ECC ("ECC1") paring with the data is written at the address ADR-E ("1110").

(3) Here, a stuck-at-1 fault occurs in the address signal line corresponding to A2 bit of the address. Therefore, it becomes impossible to access the addresses ADR-0 to ADR-3 and the addresses ADR-8 to ADR-B of the internal memory 14.

(4) It is aimed to read the data ("DATA1") and the ECC ("ECC1") pairing with the data, which have been written in (2).

(4)' At this time, in practice, due to the fault of the address signal line which has occurred in (3), the data ("DATA5") is read from the address ADR-5 ("0101") of the internal memory 14, not from the address ADR-1 ("0001") in which the data ("DATA1") is stored. On the other hand, the address ADR-E ("1110") in which the ECC ("ECC1") is stored is not influenced by the fault of the address signal line. Accordingly, the ECC ("ECC1") is read normally. That is, the data ("DATA5") which is not the data written in (2) and the ECC ("ECC1") of which the pairing with the data is lost are read.

(5) As a result, the stuck-at-1 fault is certainly detected as the one-bit error or the two or more-bit error by the ECC check circuit 142 included in the RDT conversion circuit 140. In this way, it is also possible to detect the fault in the address signal system; accordingly, Embodiment 1 is excellent from the viewpoint of functional safety.

Figure 6:
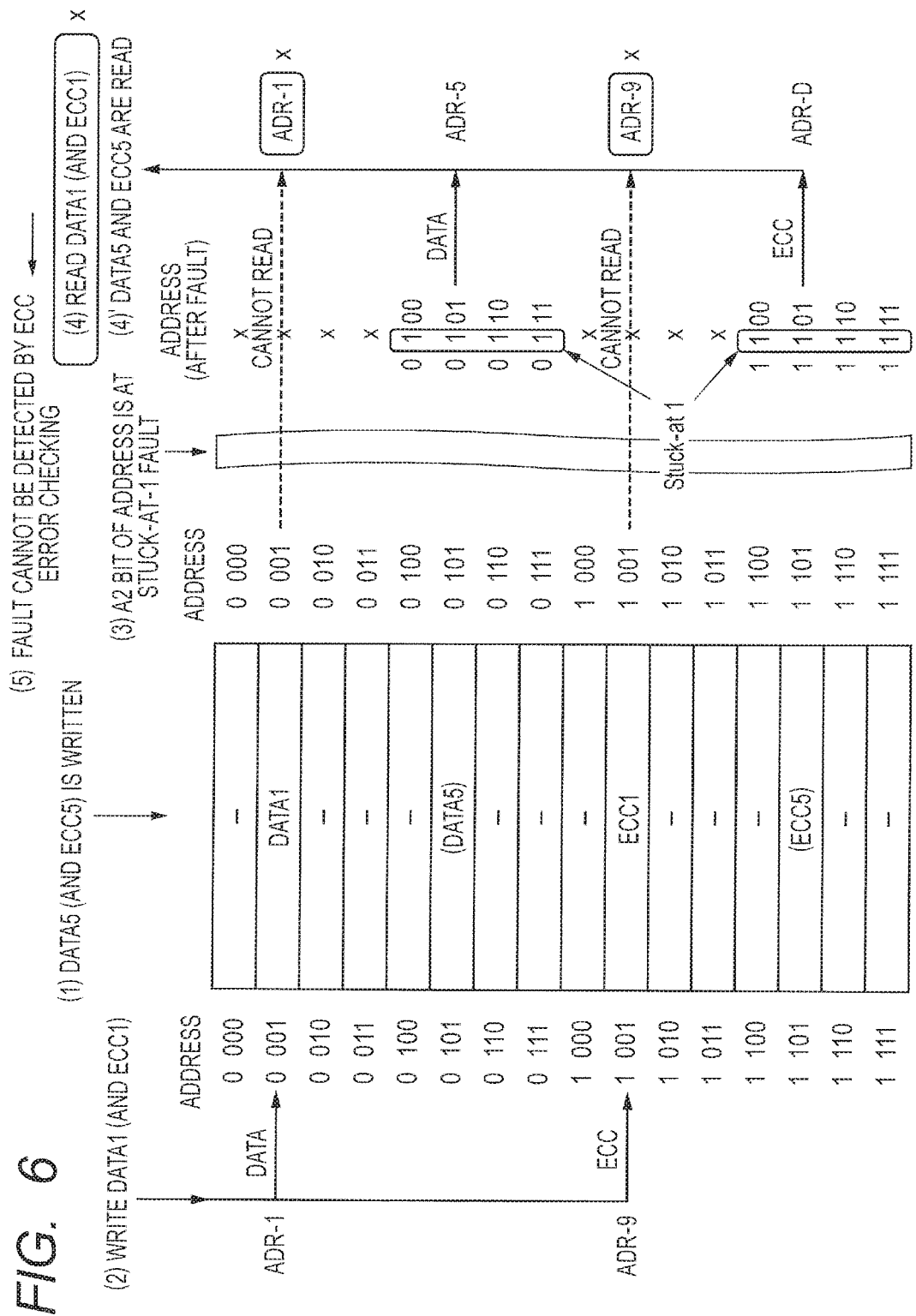
FIG. 6 is a conceptual diagram illustrating the operation when not performing an ADR inversion.

Moreover, with reference to FIG. 6, the following explains the operation when the write and read of data are performed in the same manner as in FIG. 5 in the case where "ADR inversion" is not performed to the area storing the ECC (the case where the ADR conversion circuit 120 in the I/F conversion circuit 13 illustrated in FIG. 2 is deleted).

(1) The data ("DATA5") is written at the address ADR-5 ("0101") and the ECC ("ECC5") pairing with the data is written at the address ADR-D ("1101"). In the diagram, "DATA5" and "ECC5" are expressed in parentheses.

(2) The data ("DATA1") is newly written to the address ADR-1 ("0001"), and the ECC ("ECC1") paring with the data is written at the address ADR-9 ("1001").

(3) Here, a stuck-at-1 fault occurs in the address signal line corresponding to A2 bit of the address. Therefore, it becomes impossible to access the addresses ADR-0 to ADR-3 and the addresses ADR-8 to ADR-B of the internal memory 14.

(4) It is aimed to read the data ("DATA1") and the ECC ("ECC1") pairing with the data, which have been written in (2).

(4)' At this time, in practice, due to the fault of the address signal line which has occurred in (3), the data ("DATA5") is read from the address ADR-5 ("0101") of the internal memory 14, not from the address ADR-1 ("0001") at which the data ("DATA1") is stored. The address ADR-9 ("1001") at which the ECC ("ECC1") is stored is influenced by the fault of the address signal line. Accordingly, the ECC ("ECC5") is read from the address ADR-D ("1101") of the internal memory 14. That is, the data ("DATA5") which is not the data written in (2) and the ECC ("ECC1") pairing with the data are read.

(5) In consequence, the ECC check circuit 142 included in the RDT conversion circuit 140 regards the data ("DATA5") and the ECC ("ECC5") as making a normal pair. Accordingly, as far as the bit error has not occurred in the data, it is impossible to detect the fault as a one-bit error or a two or more-bit error.

FIG. 5 illustrates the operation when the stuck-at-1 fault (sticking to 1) occurs in A2 bit of the address signal to be inputted into the internal memory 14. However, according to Embodiment 1, it is possible to detect the fault of the address signal line similarly, even when a stuck-at-0 fault (sticking to 0) occurs in the A2 bit, or when a stuck-at-1 fault or a stuck-at-0 fault occurs in other addresses (specifically, A1 bit and A0 bit).

As for the case of N=3 as illustrated in FIG. 4, FIG. 7 is a table illustrating the values of lower-order three bits A2 to A0 of the address signal over 8 rows (numbered as "0" to "7" in order from the top), about eight different pairs "DATA0" and "ECC0", "DATA1" and "ECC1", . . . , and "DATA7" and "ECC7." In FIG. 7, the address indicated by the address signal inputted into the internal memory 14 when reading the data is expressed as the "address (data)", and the address indicated by the address signal inputted into the internal memory 14 when reading the ECC is expressed as the "address (ECC)."

The following seven different cases are illustrated from the left to the right of this table:

(1) the case where no fault occurs in all the bits of the address;

(2) the case where a stuck-at-1 fault occurs in A2 bit of the address (this corresponds to the case illustrated in FIG. 5);

(3) the case where a stuck-at-0 fault occurs in A2 bit of the address;

(4) the case where a stuck-at-1 fault occurs in A1 bit of the address;

(5) the case where a stuck-at-0 fault occurs in A1 bit of the address;

(6) the case where a stuck-at-1 fault occurs in A0 bit of the address; and (7) the case where a stuck-at-0 fault occurs in A0 bit of the address.

Three values (0 or 1) at the position of each bit are arranged in order as the value of A2 to A0. The value at the position of a bit which has changed its value due to the fault is underlined.

The second row (numbered as 1) of the table illustrated in FIG. 7 is the row illustrating the addresses at which both of the data ("DATA1") to be written in (2) of FIG. 5 and the ECC ("ECC1") pairing with the data are stored. The address when no fault has occurred in all the bits of the address has the lower-order 3 bits ("001") of ADR-1, and the lower-order 3 bits ("110") of ADR-E, respectively, as illustrated in the leftmost. In the table illustrated in FIG. 7, the pair of these values of A2 to A0 is surrounded with a solid line.

Here, the address when a stuck-at-1 fault occurs in A2 bit is illustrated immediately to the right in the table, where ADR-1 of the address (data) becomes a different ADR-5 (the lower-order 3 bits are "101") by the influence of the fault, and ADR-E (the lower-order 3 bits are "110") of the address (ECC) remains as ADR-E, without the influence of the fault. In the table, the values after the influence of the fault of the pair of these values of A2 to A0 are surrounded with a dashed line, and at the same time, the address (data) and the address (ECC) which are actually accessed in each of the value after the influence of the fault of the pair of these values of A2 to A0 are surrounded with a solid line and coupled with a thick line in the table. Accordingly, the data ("DATA5") and the ECC ("ECC1") are accessed. That is, it is clear that the pairing of the data and the ECC has collapsed as explained in (4)' of FIG. 5.

Similarly, as other examples, the case where a stuck-at-1 fault occurs in A1 bit and the case where a stuck-at-1 fault occurs in A0 bit are illustrated to the further right in the table, where the pairs of the values of A2 to A0 are illustrated in the same manner as the above. It is clear that the pairing of the data and the ECC has collapsed.

As yet other examples, concerning the addresses at which both of the data ("DATA6") and the ECC ("ECC6") pairing with the data are stored, in the 7th row (numbered as 6) of the table illustrated in FIG. 7, similarly, the case where a stuck-at-0 fault occurs in A2 bit, the case where a stuck-at-0 fault occurs in A1 bit, and the case where a stuck-at-0 fault occurs in A0 bit are illustrated. In any case, the pairing of the data and the ECC is collapsed, as expected. From this table, it is clear that the fault can be certainly detected when the stuck-at fault occurs in any one of bits of the addresses.

Figure 8:
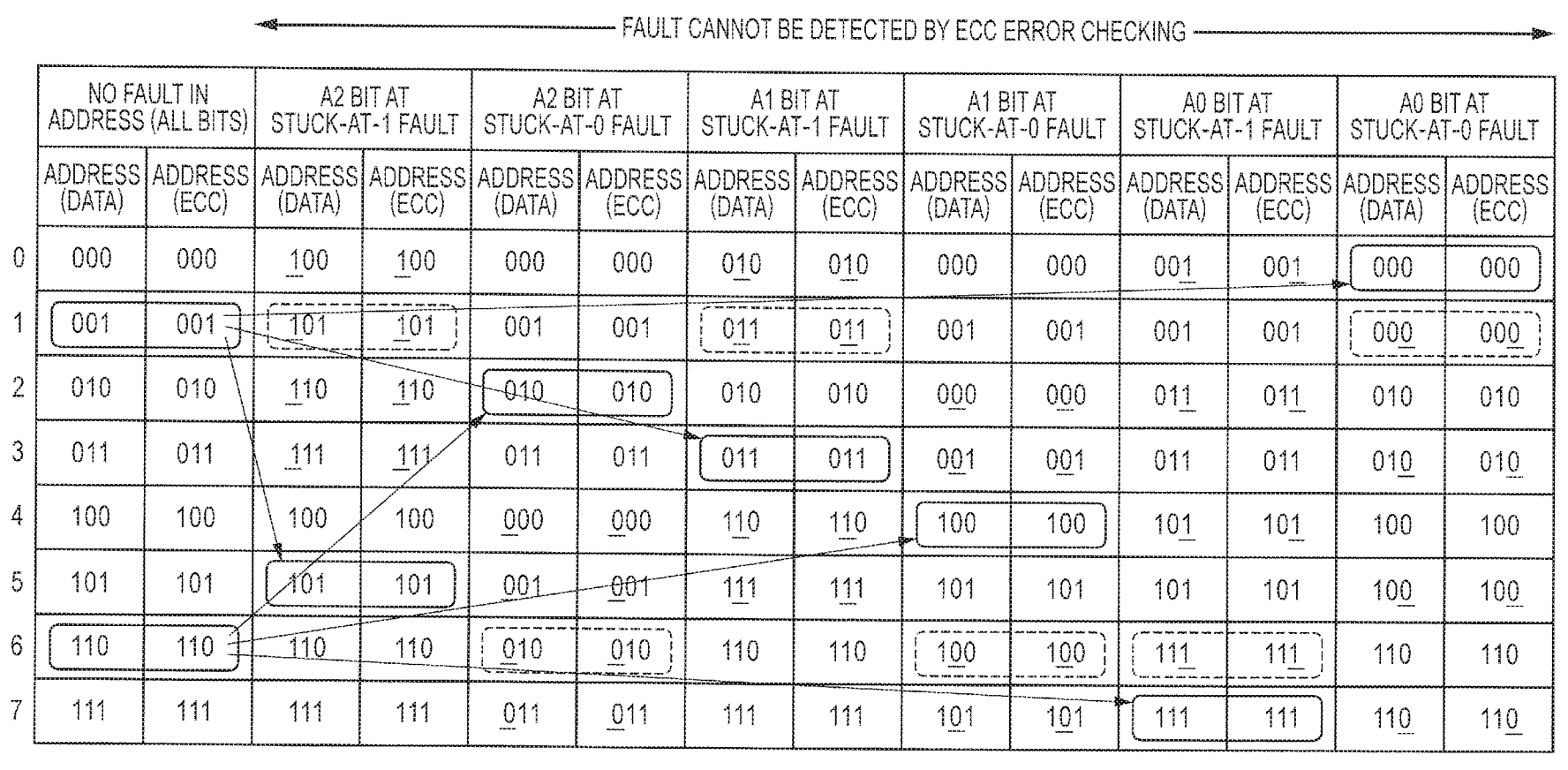

FIG. 8 is a table illustrating the values of lower-order 3 bits A2 to A0 of the address (data) and the address (ECC) in the similar manner as in FIG. 7, in the case where the "ADR inversion" is not performed to the area in which the ECC is stored (that is, the case where the ADR conversion circuit 120 of the I/F conversion circuit 13 illustrated in FIG. 2 is deleted). The case where a stuck-at-1 fault has occurred in the A2 bit of the address lying in the second fault example from the left in the second row (numbered as 1) of this table corresponds to what is illustrated in FIG. 6.

In this case, as seen from the table illustrated in FIG. 8, when a stuck-at fault occurs in any one of the bits of the address, the pair of the data and the ECC at the address which becomes impossible to access under the influence are recognized as a pair of the data and the ECC at another address (that is, the address becomes degenerate). Therefore, it is impossible to detect the fault of the address signal line when reading the data.

The above explanation is made for the example in which the value of all the bits of the N-bit address signal inputted from the bus master is inverted. However, the present invention is not restricted to this example. For example, a certain amount of effect is obtained by inverting the value of the prescribed number of bits (any number of N bits to one bit) of the N-bit address signal. This prescribed number of bits may be set as the prescribed number of bits from the highest-order bit of the N bits, or the prescribed number of bits from the lowest-order bit. This prescribed number of bits may be set as continuous bits or discontinuous bits of the N bits. However, as described above, it becomes possible to detect more faults, preferably by inverting the value of all the bits of the N-bit address signal.

As explained above, in Embodiment 1, the ADR conversion circuit 120 generates the second address for storing the error detecting code generated from the data, based on the first address for storing the data in the internal memory 14. When the write of the data at the first address is requested, the WDT conversion circuit 130 writes the data at the first address and writes the error detecting code at the second address. When the read of data from the first address is requested, the RDT conversion circuit 104 reads the data from the first address, reads the error detecting code from the second address, and detects an error based on the data and the error detecting code.

Here, the I/F control circuit 110 modifies the value of at least one bit (corresponding to the highest-order bit of the (N+1)-bit address) of the first address (corresponding to the (N+1)-bit address), and offsets the storing position of the error detecting code to the storing position of the data. The ADR conversion circuit 120 generates an address as the second address, by inverting the value of the prescribed number of bits of the other bits (corresponding to the lower-order N bits). In the above-described example, the ADR conversion circuit 120 generates the address as the second address by inverting the value of all the other bits (N bits).

Accordingly, when a stuck-at fault (sticking to 0 or 1) occurs in any one of the address signal lines leading to the internal memory 14 after the pair of the data and the ECC generated from the data have been written in the internal memory 14, it is possible to detect the fault of the address signal line when reading the written data.

This is effective similarly to the fault of two or more address signal lines. It is also possible to detect the fault which affects the value of the address, occurring in the ADR conversion circuit 120 to generate and output the address signal to be inputted into the internal memory 14, and in the address signal processing circuit (not shown) in the internal memory 14.

In Embodiment 1, the bus master outputs the enable signal to enable the write or read of data, to the internal memory 14 for the unit time (corresponding to the clock cycle) in which the write or read of data is carried out. In response to the enable signal outputted from the bus master to enable the write or read of data, the I/F control circuit 110 outputs the wait signal to suppress the operation of the bus master for the unit time, in lieu of the wait signal to permit the operation of the bus master.

In response to the wait signal outputted from the I/F control circuit 110 to suppress the operation of the bus master, the WDT conversion circuit 130 writes the data to the first address (corresponding to the first clock cycle). Subsequently, in response to the wait signal outputted from the I/F control circuit 110 to permit the operation of the bus master, the WDT conversion circuit 130 writes the error detecting code into the second address (corresponding to the second clock cycle).

In response to the wait signal outputted from the I/F control circuit 110 to suppress the operation of the bus master, the RDT conversion circuit 140 reads the data from the first address subsequently, and in response to the wait signal outputted from the I/F control circuit 110 to permit the operation of the bus master, the RDT conversion circuit 140 reads the error detecting code from the second address.

Accordingly, it is possible to maintain the request of the write or read of data by the bus master, and at the same time, it is possible to write the error detecting code into the internal memory 14, or to read the error detecting code from the internal memory 14, utilizing the continued time. It is also possible to divert the wait signal to realize, with a simpler configuration, the continuation of the request of the write of the data and the switching between the write of the data and the write of the error detecting code. It is further possible to divert the wait signal to realize, with a simpler configuration, the continuation of the request of the read of the data and the switching between the read of the data and the read of the error detecting code.

In Embodiment 1, the wait signal to suppress the operation of the bus master is utilized as a value of at least one bit of the first address. The wait signal to permit the operation of the bus master is utilized as a value of at least one bit of the first address after the modification.

Accordingly, it is possible to divert the wait signal to realize, with a simpler configuration, the continuation of the request of the write or read of data and the offset of the storing position of the error detecting code to the storing position of the data.

In Embodiment 1, in response to the wait signal from the I/F control circuit 110 to suppress the operation of the bus master, the RDT conversion circuit 140 holds the data read from the internal memory 14. Subsequently, in response to the wait signal outputted from the I/F control circuit 110 to permit the operation of the bus master, the RDT conversion circuit 140 detects an error based on the error detecting code read from the internal memory 14 and the held data.

Accordingly, it is possible to divert the wait signal to realize, with a simpler configuration, the continuation of the request of the write or read of data and the change of the operation for the error detection.

Embodiment 2

Next, the configuration and the operation of Embodiment 2 are explained with reference to drawings. The configuration and the operation of the CPU system 1 according to Embodiment 2 are fundamentally the same as the configuration and the operation of the CPU system 1 according to Embodiment 1 as illustrated in FIG. 1. Accordingly, the explanation thereof is omitted. However, in Embodiment 2, the configuration and the operation of a part of the I/F conversion circuit 13 included in the CPU system. 1 are different from those of the I/F conversion circuit 13 according to Embodiment 1.

Figure 9:
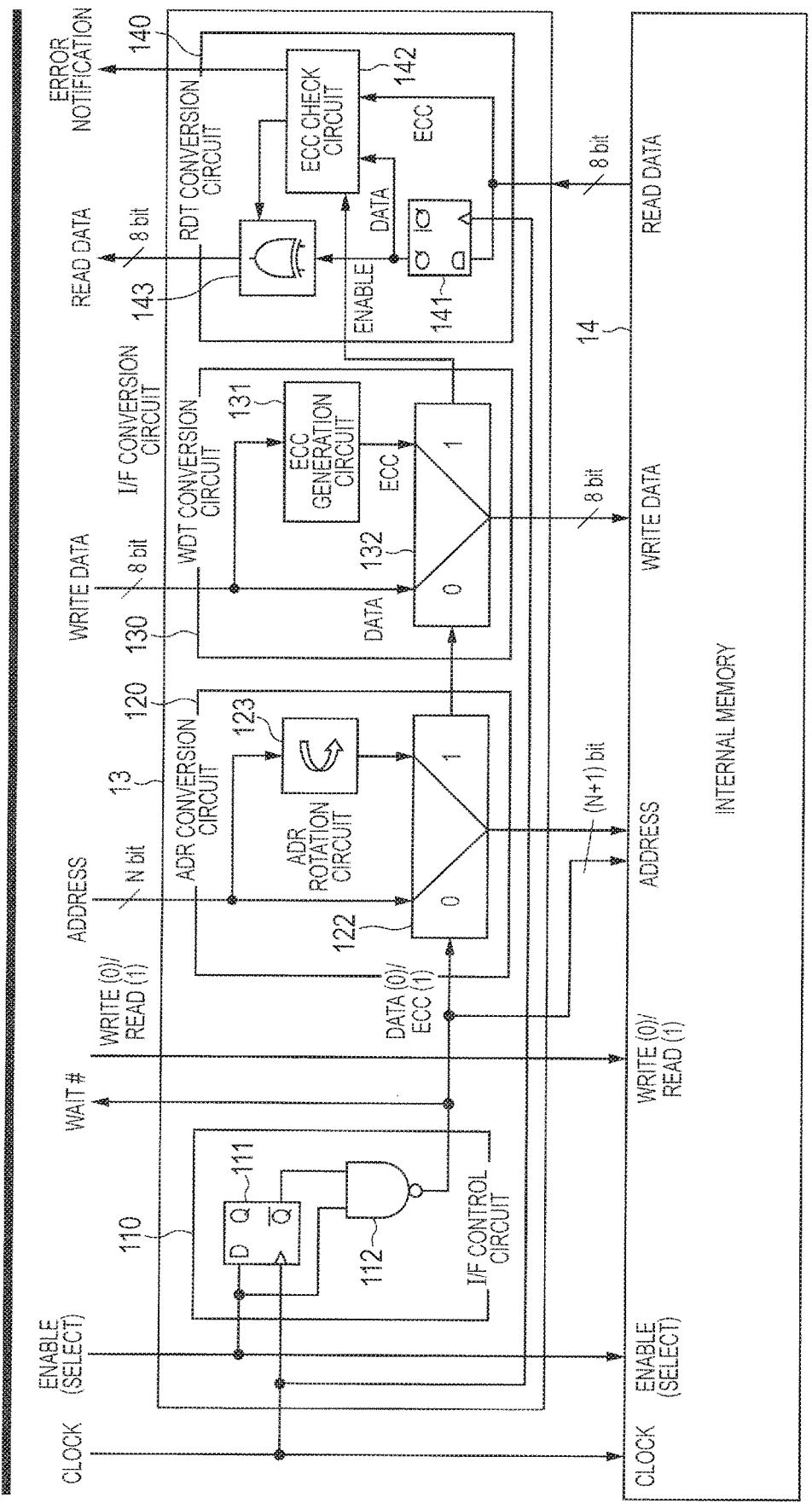
FIG. 9 is a block diagram illustrating the configuration of an I/F conversion circuit according to Embodiment 2.

Next, with reference to FIG. 9, the configuration of the I/F conversion circuit 13 according to Embodiment 2 is explained. As compared with the I/F conversion circuit 13 according to Embodiment 1, the I/F conversion circuit 13 according to Embodiment 2 includes an ADR rotation circuit 123 in lieu of the ADR inverting circuit 121 in the ADR conversion circuit 120. The configuration and the operation of the I/F control circuit 110, the WDT conversion circuit 130, and the RDT conversion circuit 140 according to Embodiment 2 are the same as the configuration and the operation of the counterparts according to Embodiment 1.

An address signal outputted from the bus master is inputted into the ADR rotation circuit 123. The ADR rotation circuit 123 rotates (shifts) all the bits of the address indicated by the inputted address signal and outputs the rotated address signal to the selector 122. Therefore, in Embodiment 2, the selector 122 selects one of the address signal outputted from the bus master and the address signal outputted from the ADR rotation circuit 123, and outputs the selected address signal to the internal memory 14.

Figure 10:
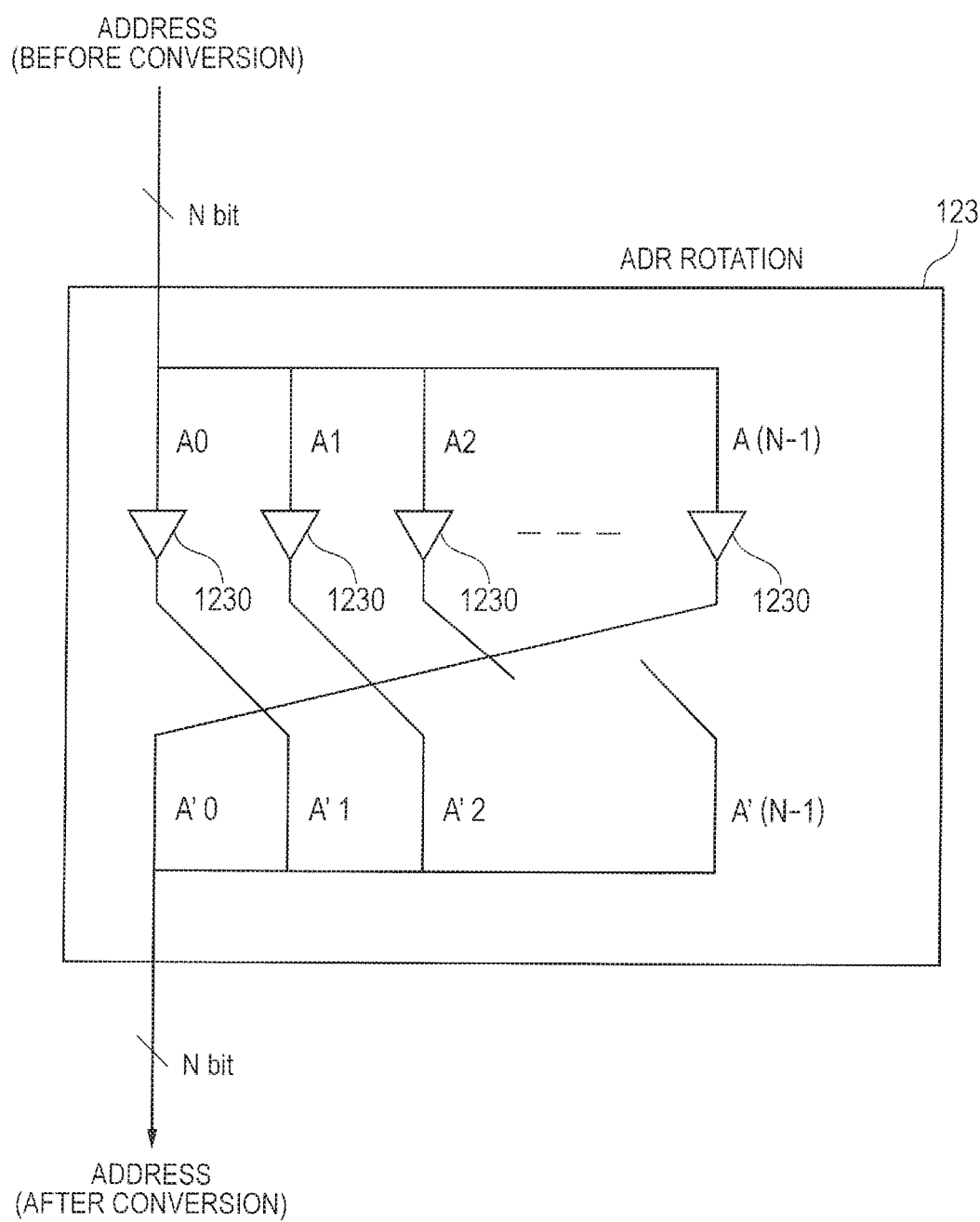
FIG. 10 is a block diagram illustrating the configuration of an ADR rotation circuit according to Embodiment 2.

Next, with reference to FIG. 10, the configuration of the ADR rotation circuit 123 included in the ADR conversion circuit 120 according to Embodiment 2 is explained. Here, an example of the address signal having N bits is explained.

As illustrated in FIG. 10, the ADR rotation circuit 123 rotates left (to the higher-order bit direction) the address indicated by the address signal by one bit, in order to permutate the position of each bit of the N-bit address signal. That is, the ADR rotation circuit 123 shifts left the N bits of the address signal by one bit, and moves the overflowed highest-order bit to the lowest-order bit.

As illustrate in FIG. 10, this is realized by shifting and coupling each bit position of the N-bit address signal line in an input stage and an output stage in the ADR rotation circuit 123. That is, each of bits A0, A1, A2, . . . , A(N−1) of the N-bit address signal inputted into the ADR rotation circuit 123 is set as each of bits A'1, A'2, . . . , A'(N−1), A'0 of the N-bit address signal to be outputted from the ADR rotation circuit 123. In this ADR rotation circuit 123, the signal of each bit of the N-bit address signal lines is received by each of N buffers 1230, and the bit position of the connection destination is shifted.

Figure 11:
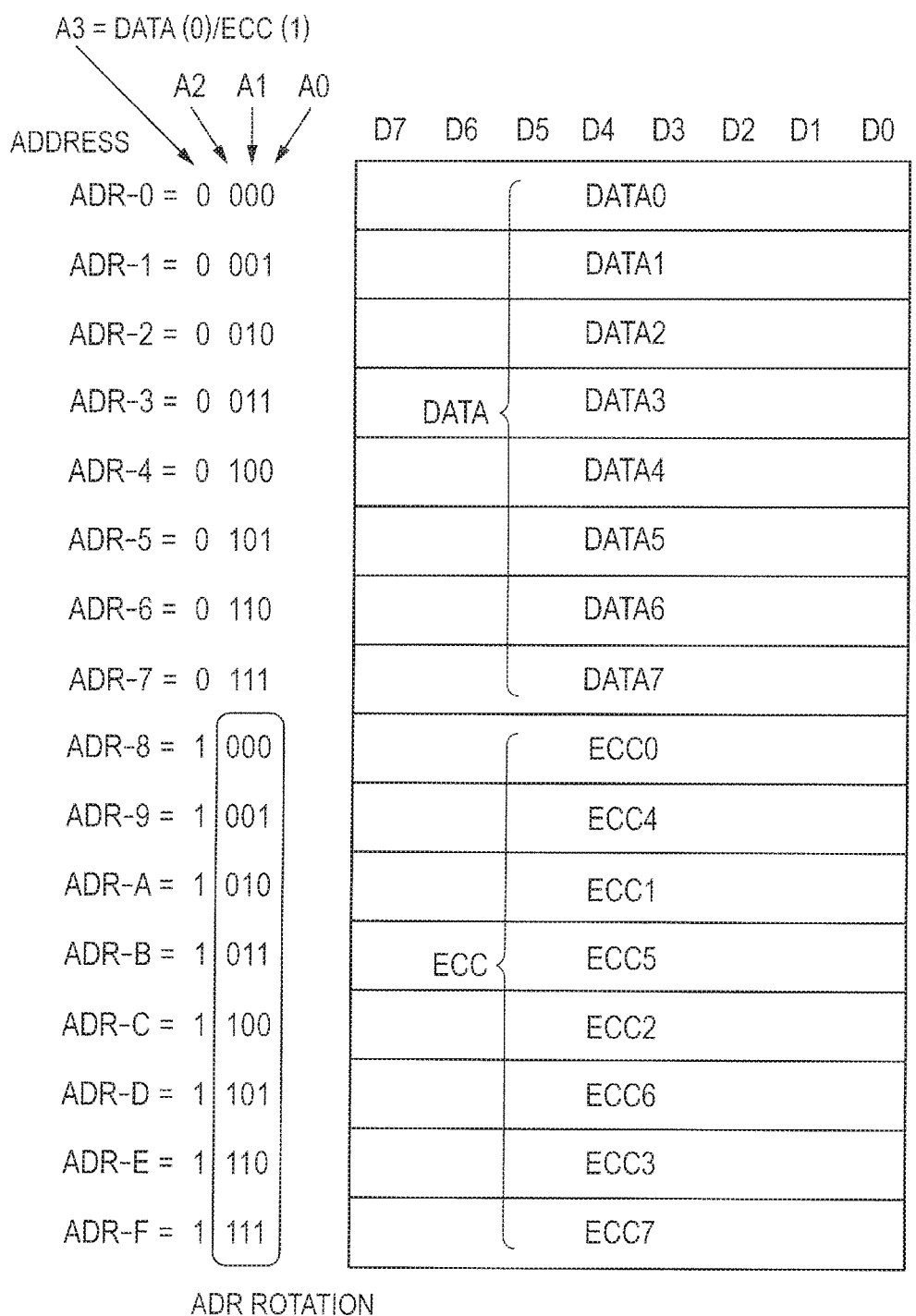
FIG. 11 is a conceptual drawing of a memory map of an internal memory according to Embodiment 2.

Next, with reference to FIG. 11, the memory map of the internal memory 14 according to Embodiment 2 is explained. As is the case with the internal memory 14 according to Embodiment 1 illustrated in FIG. 4, here, the explanation is made for the example in which the data width of the internal memory 14 is 8 bits, the address width of the internal memory 14 is (N+1) bits, the data volume of the internal memory 14 is $(8 \times 2^{(N+1)})$ bits, and N=3.

In Embodiment 2, to the value of the lower-order N bits (A2 to A0 in FIG. 11) of the address at which the data is stored, the value of the lower-order N bits of the address at which the ECC pairing with the data is stored is changed to the arrangement in which each bit is permutated by the operation of the ADR rotation circuit 123 illustrated in FIG. 10 (the portion where the value of A2 to A0 is labeled as "ADR rotation" in FIG. 11).

That is, as illustrated in FIG. 11, the data ("DATA0") of the address ADR-0 ("0000") and the ECC ("ECC0") of the address ADR-8 ("1000") make a pair. The data ("DATA1") of the address ADR-1 ("0001") and the ECC ("ECC1") of the address ADR-A ("1010") make a pair. The data ("DATA2") of the address ADR-2 ("0010") and the ECC ("ECC2") of the address ADR-C ("1100") make a pair. The data ("DATA3") of the address ADR-3 ("0011") and the ECC ("ECC3") of the address ADR-E ("1110") make a pair. The data ("DATA4") of the address ADR-4 ("0100") and the ECC ("ECC4") of the address ADR-9 ("1001") make a pair. The data ("DATA5") of the address ADR-5 ("0101") and the ECC ("ECC5") of the address ADR-B ("1011") make a pair. The data ("DATA6") of the address ADR-6 ("0110") and the ECC ("ECC6") of the address ADR-D ("1101") make a pair. The data ("DATA7") of the address ADR-7 ("0111") and the ECC ("ECC7") of the address ADR-F ("1111") make a pair.

As is the case with Embodiment 1, the ECC is changed to the 8-bit data by adding dummy bits (the value is "0" for example) to the higher order three bits, and stored in the internal memory 14. As is the case with Embodiment 1, when a stuck-at fault (sticking to 0 or 1) occurs due to a fault (disconnection) of any one or more lines among eight signal lines of the write data (8 bits) to be outputted to the internal memory 14 from the WDT conversion circuit 130 of the I/F conversion circuit 13, in both the data and the ECC which form a pair mutually, the value at the position of a bit corresponding to the broken signal line becomes a different value from the original value (an inverted value). Therefore, when reading the data, the value change is certainly detected as a one-bit error or a two or more-bit error in the ECC check circuit 142. It is also the same when a stuck-at fault (sticking to 0 or 1) occurs due to a fault (disconnection) of any one or more lines among eight signal lines of the read data (8 bits) which the RDT conversion circuit 140 of the I/F conversion circuit 13 inputs from the internal memory 14.

On the other hand, the following explains the case where a stuck-at fault (sticking to 0 or 1) occurs due to a fault (disconnection) of any one or more lines among the N signal lines of an address signal (N bits) to be inputted into the internal memory 14 from the ADR conversion circuit 120 of the I/F conversion circuit 13.

Figure 12:
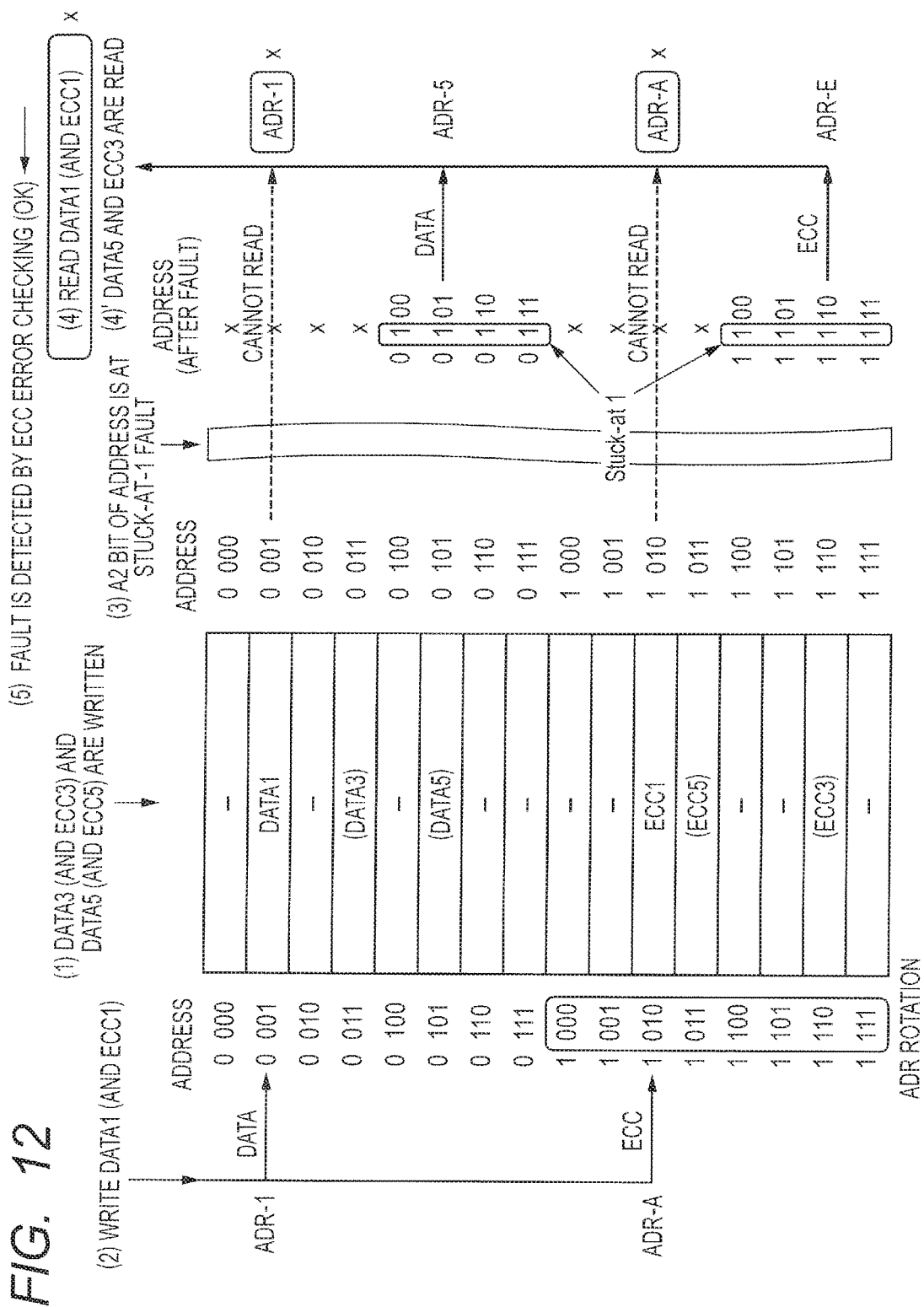
FIG. 12 is a conceptual diagram illustrating the operation of an I/F conversion circuit according to Embodiment 2 (a first example)

With reference to FIG. 12, as is the case with FIG. 5 of Embodiment 1, the following explains the operation in the case where a stuck-at-1 fault (sticking to 1) occurs in A2 bit of the address signal (N bits) to be inputted into the internal memory 14. It is assumed that the internal memory 14 has N=3, as illustrated in FIG. 11. Here, the explanation is made for the case where the write and read of data are performed by the following flows.

(1) The data ("DATA3") is written at the address ADR-3 ("0011") and the ECC ("ECC3") pairing with the data is written at the address ADR-E ("1110"). The data ("DATA5") is written at the address ADR-5 ("0101") and the ECC ("ECC5") pairing with the data is written at the address ADR-B ("1011"). In the diagram, they are expressed in parentheses.

(2) The data ("DATA1") is newly written at the address ADR-1 ("0001") and the ECC ("ECC1") pairing with the data is written at the address ADR-A ("1010").

(3) Here, a stuck-at-1 fault occurs in the address signal line corresponding to A2 bit of the address. Therefore, it becomes impossible to access the addresses ADR-0 to ADR-3 and the addresses ADR-8 to ADR-B of the internal memory 14.

(4) It is aimed to read the data ("DATA1") and the ECC ("ECC1") pairing with the data, which have been written in (2).

(4)' At this time, in practice, due to the fault of the address signal line which has occurred in (3), the data ("DATA5") is read from the address ADR-5 ("0101") of the internal memory 14, not from the address ADR-1 ("0001") at which the data ("DATA1") is stored. The ECC ("ECC3") is read from the address ADR-E ("1110"), not from the address ADR-A ("1010") at which the ECC ("ECC1") is stored. That is, the data ("DATA5") which is not the data written in (2) and the ECC ("ECC3") of which the pairing with the data is collapsed are read.

(5) As a result, the stuck-at-1 fault is certainly detected as the one-bit error or the two or more-bit error by the ECC check circuit 142 included in the RDT conversion circuit 140. In this way, it is also possible to detect the fault in the address signal system; accordingly, Embodiment 2 is excellent from the viewpoint of functional safety.

FIG. 12 illustrates the operation when the stuck-at-1 fault (sticking to 1) occurs in A2 bit of the address signal to be inputted into the internal memory 14. However, according to Embodiment 2, it is possible to detect the fault of the address signal line similarly, even when a stuck-at-0 fault (sticking to 0) occurs in the A2 bit, or when a stuck-at-1 fault or a stuck-at-0 fault occurs in other addresses (specifically, A1 bit and A0 bit).

Figure 13:
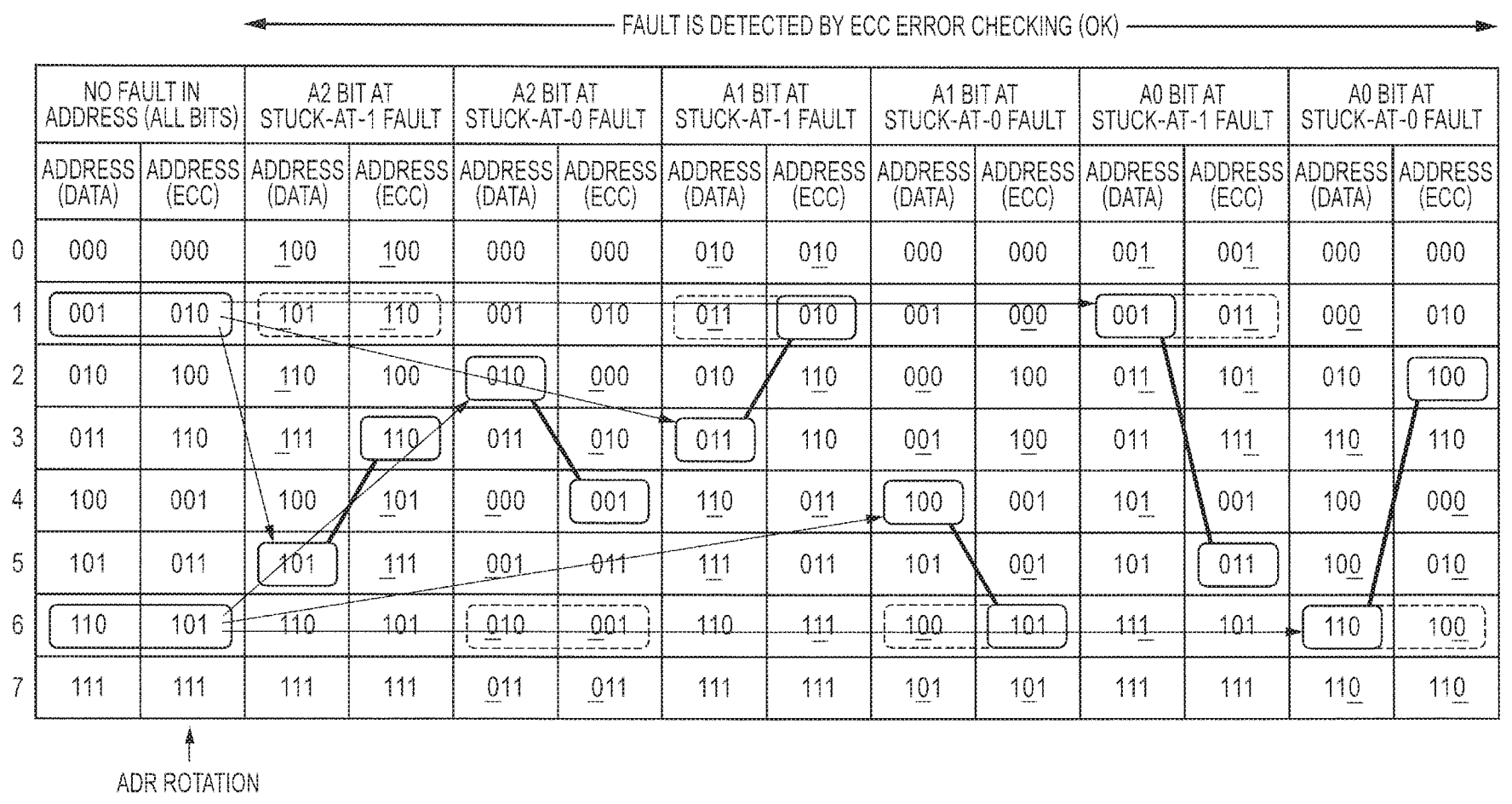

As for the case of N=3 as illustrated in FIG. 11, FIG. 13 is a table illustrating the values of lower-order three bits A2 to A0 of the address signal over 8 rows (numbered as "0" to "7" in order from the top), about eight different pairs "DATA0" and "ECC0", "DATA1" and "ECC1", . . . , and "DATA7" and "ECC7." In FIG. 13, the address indicated by the address signal inputted into the internal memory 14 when reading the data is expressed as the "address (data)", and the address indicated by the address signal inputted into the internal memory 14 when reading the ECC is expressed as the "address (ECC)."

The following seven different cases are illustrated from the left to the right of this table:

(1) the case where no fault occurs in all the bits of the address;

(2) the case where a stuck-at-1 fault occurs in A2 bit of the address (this corresponds to the case illustrated in FIG. 12);

(3) the case where a stuck-at-0 fault occurs in A2 bit of the address;

(4) the case where a stuck-at-1 fault occurs in A1 bit of the address;

(5) the case where a stuck-at-0 fault occurs in A1 bit of the address;

(6) the case where a stuck-at-1 fault occurs in A0 bit of the address; and (7) the case where a stuck-at-0 fault occurs in A0 bit of the address.

Three values (0 or 1) at the position of each bit are arranged in order as the value of A2 to A0. The value at the position of a bit which has changed its value due to the fault is underlined.

The second row (numbered as 1) of the table illustrated in FIG. 13 is the row illustrating the addresses at which both of the data ("DATA1") to be written in (2) of FIG. 12 and the ECC ("ECC1") pairing with the data are stored. The address when no fault has occurred in all the bits of the address has the lower-order 3 bits ("001") of ADR-1, and the lower-order 3 bits ("110") of ADR-E, respectively, as illustrated in the leftmost. In the table illustrated in FIG. 13, the pair of these values of A2 to A0 is surrounded with a solid line.

Here, the address when a stuck-at-1 fault occurs in A2 bit is illustrated immediately to the right in the table, where ADR-1 of the address (data) becomes a different ADR-5 (the lower-order 3 bits are "101") by the influence of the fault, and ADR-A of the address (ECC) becomes a different ADR-E (the lower-order 3 bits are "110") by the influence of the fault. In the table, the values after the influence of the fault of the pair of these values of A2 to A0 are surrounded with a dashed line, and at the same time, the address (data) and the address (ECC) which are actually accessed in each of the value after the influence of the fault of the pair of these values of A2 to A0 are surrounded with a solid line and coupled with a thick line in the table. Accordingly, the data ("DATA5") and the ECC ("ECC3") are accessed. That is, it is understood that the pairing of the data and the ECC has collapsed as explained in (4)' of FIG. 12.

Similarly, as other examples, the case where a stuck-at-1 fault occurs in A1 bit and the case where a stuck-at-1 fault occurs in A0 bit are illustrated to the further right in the table, where the pair of the values of A2 to A0 is illustrated in the same manner as the above. It is clear that the pairing of the data and the ECC has collapsed.

As yet other examples, concerning the addresses at which both of the data ("DATA6") and the ECC ("ECC6") pairing with the data are stored, in the 7th row (numbered as 6) of the table illustrated in FIG. 13, similarly, the case where a stuck-at-0 fault occurs in A2 bit, the case where a stuck-at-0 fault occurs in A1 bit, and the case where a stuck-at-0 fault occurs in A0 bit are illustrated. In any case, the pairing of the data and the ECC is collapsed, as expected. From this table, it is clear that the fault can be certainly detected when the stuck-at fault occurs in any one of bits of the addresses.

Furthermore, in Embodiment 2, even when the write and read of data are performed after a stuck-at fault (sticking to 0 or 1) occurs due to a fault (disconnection) of any one of the N signal lines of an address signal (N bits) to be inputted into the internal memory 14 from the ADR conversion circuit 120 of the I/F conversion circuit 13, it is possible to detect the fault as will be explained in the following.

Figure 14:
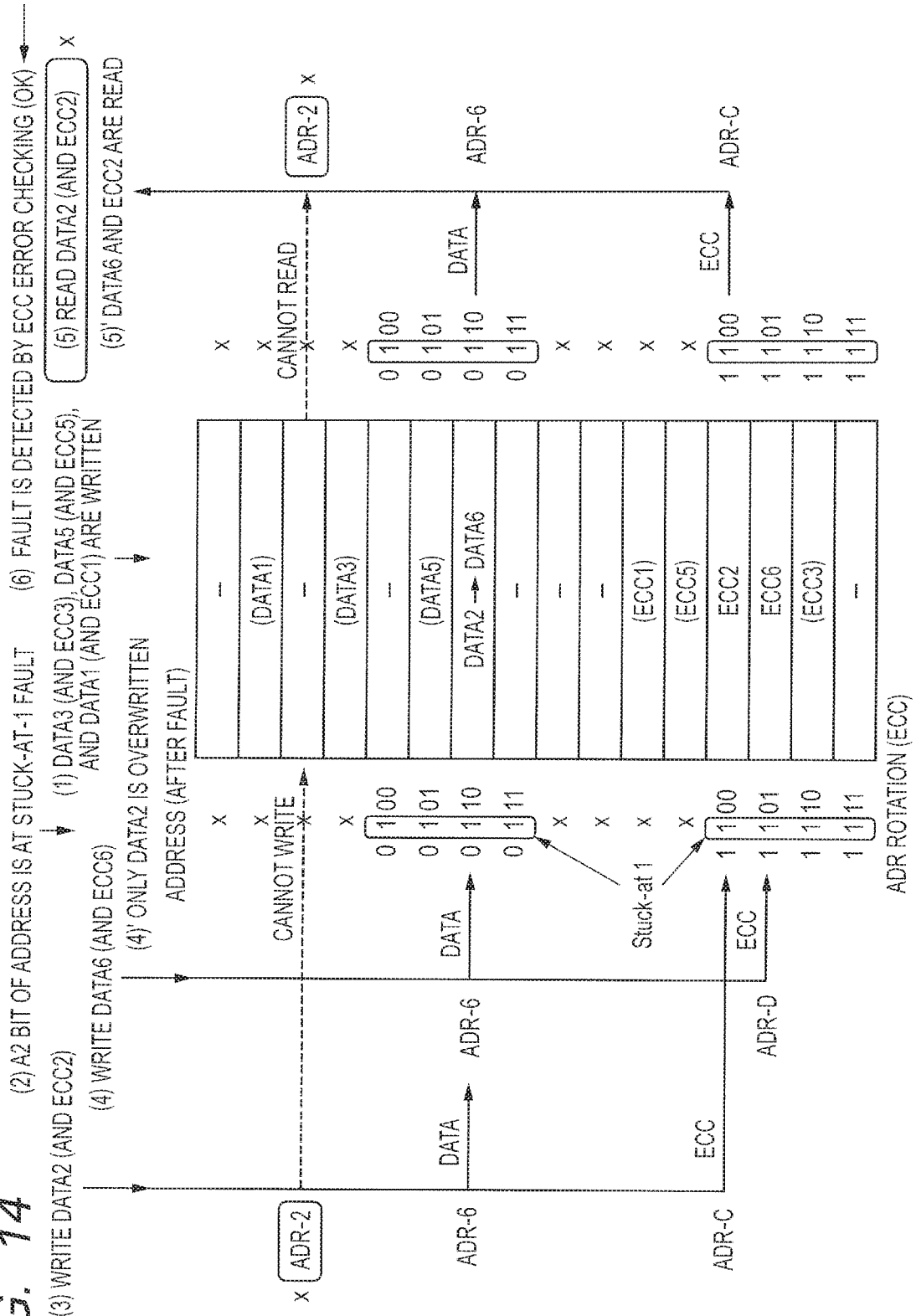
FIG. 14 is a conceptual diagram illustrating the operation of the I/F conversion circuit according to Embodiment 2 (a second example)

With reference to FIG. 14, the following explains the operation in the case where the write and read of data are performed after a stuck-at-1 fault (sticking to 1) occurs in A2 bit of the address signal (N bits) to be inputted into the internal memory 14. It is assumed that the internal memory 14 has N=3, as illustrated in FIG. 11. Here, the explanation is made for the case where the write and read of data are performed by the following flows.

(1) The data ("DATA3") is written at the address ADR-3 ("0011") and the ECC ("ECC3") pairing with the data is written at the address ADR-E ("1110"). The data ("DATA5") is written at the address ADR-5 ("0101") and the ECC ("ECC5") pairing with the data is written at the address ADR-B ("1011"). The data ("DATA1") is written at the address ADR-1 ("0001") and the ECC ("ECC1") pairing with the data is written at the address ADR-A ("1010"). In the diagram, they are expressed in parentheses.

(2) Here, a stuck-at-1 fault occurs in the address signal line corresponding to A2 bit of the address. Therefore, it becomes impossible to access the addresses ADR-0 to ADR-3 and the addresses ADR-8 to ADR-B of the internal memory 14.

(3) It is newly aimed to write the data ("DATA2") at the address ADR-2 ("0010") and the ECC ("ECC2") pairing with the data at the address ADR-C ("1100"). At this time, in practice, the data ("DATA2") is written at the address ADR-6 ("0110"), not the address ADR-2 ("0010") of the internal memory 14 due to the fault of the address signal line which has occurred in (2). On the other hand, the ECC ("ECC2") is normally written at the address ADR-C ("1100").

(4) Next, it is aimed to write the data ("DATA6") at the address ADR-6 ("0110") and the ECC ("ECC6") pairing with the data at the address ADR-D ("1101"). At this time, without influenced by the fault of the address signal line which has occurred in (2), both the data ("DATA6") and the ECC ("ECC6") are written at the normal address.

(4)' At this time, the data ("DATA2") which has been written at the address ADR-6 ("0110") in (3) is overwritten by the data ("DATA6").

(5) It is aimed to read the data ("DATA2") and the ECC ("ECC2") pairing with the data which have been written in (3).

(5)' At this time, in practice, the data ("DATA6") is read from the address ADR-6 ("0110") of the internal memory 14, not from the address ADR-2 ("0010") at which the data ("DATA2") should have been stored. This is because at this address ADR-6 ("0110"), the data ("DATA2") is once written in (3) and then the data ("DATA6") is overwritten in (4)'. The ECC ("ECC2") is read normally from the address ADR-C ("1100") at which the ECC ("ECC2") is stored. Therefore, the data ("DATA6") and the ECC ("ECC2") of which pairing with the data is collapsed is read.

(6) As a result, the stuck-at-1 fault is certainly detected as the one-bit error or the two or more-bit error by the ECC check circuit 142 included in the RDT conversion circuit 140.

In this way, it is also possible to detect the fault in the address signal system; accordingly, Embodiment 2 is excellent from the viewpoint of functional safety.

With reference to FIG. 15, in the case of Embodiment 1 in which the "ADR inversion" is performed to the area storing the ECC, the explanation is made for the operation when the write and read of data are performed in the same manner as in FIG. 14.

(1) The data ("DATA5") is written at the address ADR-5 ("0101") and the ECC ("ECC5") pairing with the data is written at the address ADR-A ("1010"). The data ("DATA1") is written at the address ADR-1 ("0001") and the ECC ("ECC1") pairing with the data is written at the address ADR-E ("1110"). In the diagram, they are expressed in parentheses.

(2) Here, a stuck-at-1 fault occurs in the address signal line corresponding to A2 bit of the address. Therefore, it becomes impossible to access the addresses ADR-0 to ADR-3 and the addresses ADR-8 to ADR-B of the internal memory 14.

(3) It is newly aimed to write the data ("DATA2") at the address ADR-2 ("0010") and the ECC ("ECC2") pairing with the data at the address ADR-D ("1101"). At this time, in practice, the data ("DATA2") is written at the address ADR-6 ("0110"), not the address ADR-2 ("0010") of the internal memory 14 due to the fault of the address signal line which has occurred in (2). On the other hand, the ECC ("ECC2") is normally written at the address ADR-D ("1101").

(4) Next, it is aimed to write the data ("DATA6") at the address ADR-6 ("0110") and the ECC ("ECC6") pairing with the data at the address ADR-9 ("1001"). At this time, in practice, the ECC ("ECC6") is written at the address ADR-D ("1101"), not the address ADR-9 ("1001") of the internal memory 14 due to the fault of the address signal line which has occurred in (2). On the other hand, the data ("DATA6") is normally written at the address ADR-6 ("0110").

(4)' At this time, the data ("DATA2") which has been written at the address ADR-6 ("0110") in (3) is overwritten by the data ("DATA6"). The ECC ("ECC2") written at the address ADR-D ("1101") is overwritten by the ECC ("ECC6").

(5) It is aimed to read the data ("DATA2") and the ECC ("ECC2") pairing with the data which have been written in (3).

(5)' At this time, in practice, the data ("DATA6") is read from the address ADR-6 ("0110") of the internal memory 14, not from the address ADR-2 ("0010") at which the data ("DATA2") should have been stored. This is because at this address ADR-6 ("0110"), the data ("DATA2") is once written in (3) and then the data ("DATA6") is overwritten in (4)'. The ECC ("ECC6") is read from the address ADR-D ("1101") at which the ECC ("ECC2") should have been stored. This is because at this address ADR-D ("1101"), the ECC ("ECC2") is once written in (3) and then the ECC ("ECC6") is overwritten in (4)'. Therefore, the data ("DATA6") which is not the data written in (3) and the ECC ("ECC6") pairing with the data are read.

(6) As a result, the ECC check circuit 142 included in the RDT conversion circuit 140 regards the data ("DATA6") and the ECC ("ECC6") as forming a normal pair. Accordingly, as far as the bit error has not occurred in the data, it is impossible to detect the fault as a one-bit error or a two or more-bit error.

FIG. 14 illustrates the operation when the stuck-at-1 fault (sticking to 1) occurs in A2 bit of the address signal to be inputted into the internal memory 14. However, according to Embodiment 2, it is possible to detect the fault of the address signal line similarly, even when a stuck-at-0 fault (sticking to 0) occurs in the A2 bit, or when a stuck-at-1 fault or a stuck-at-0 fault occurs in other addresses (specifically, A1 bit and A0 bit).

As for the case of N=3 as illustrated in FIG. 11, FIG. 16 is a table illustrating the values of lower-order three bits A2 to A0 of the address signal over 8 rows (numbered as "0" to "7" in order from the top), about eight different pairs "DATA0" and "ECC0", "DATA1" and "ECC1", . . . , and "DATA7" and "ECC7." In FIG. 16, the address indicated by the address signal inputted into the internal memory 14 when reading the data is expressed as the "address (data)", and the address indicated by the address signal inputted into the internal memory 14 when reading the ECC is expressed as the "address (ECC)." As is the case with FIG. 13, the cases where seven different faults (1) to (7) occur are illustrated from the left to the right of this table. The case where a stuck-at-1 fault has occurred in the A2 bit of the address lying in the second fault example from the left in the third row (numbered as 2) of this table corresponds to what is illustrated in FIG. 14.

Three values (0 or 1) at the position of each bit are arranged in order as the value of A2 to A0. The value at the position of a bit which has changed its value due to the fault is underlined.

The third row (numbered as 2) of the table illustrated in FIG. 16 is the row illustrating the addresses at which both of the data ("DATA2") to be written in (3) of FIG. 14 and the ECC ("ECC2") pairing with the data are stored. The address when no fault has occurred in all the bits of the address has the lower-order 3 bits ("010") of ADR-2, and the lower-order 3 bits ("100") of ADR-C, respectively, as illustrated in the leftmost. In the table illustrated in FIG. 16, the pair of these values of A2 to A0 is surrounded with a dotted line.

Here, the address when a stuck-at-1 fault occurs in A2 bit is illustrated immediately to the right in the table, where ADR-2 of the address (data) becomes a different ADR-6 (the lower-order 3 bits are "110") by the influence of the fault, and ADR-C (the lower-order 3 bits are "100") of the address (ECC) remains as ADR-C, without the influence of the fault. In the table, the values after the influence of the fault of the pair of these values of A2 to A0 are surrounded with a dashed line, and at the same time, the address (data) and the address (ECC) which are actually accessed in each of the value after the influence of the fault of the pair of these values of A2 to A0 are surrounded with a solid line and coupled with a thick line in the table. Accordingly, the data ("DATA6") and the ECC ("ECC2") are accessed. That is, it is understood that the pairing of the data and the ECC has collapsed as explained in (5)' of FIG. 14.

In addition to the value after the influence of the fault of the pair of the values of A2 to A0 in the third row, the values after the influence of the fault of the pair of the values of A2 to A0 in the first row, the 5th row, and the 7th row in the table are surrounded with dashed lines as well. However, the pairs of two of the values of A2 to A0 illustrated in these four rows are a combination of four kinds of the address (data) of ADR-6 (the lower-order 3 bits are "110") or ADR-4 (the lower-order 3 bits are "100"), and the address (ECC) of ADR-C (the lower-order 3 bits are "100") or ADR-D (the lower-order 3 bits are "101"). Therefore, as explained in (4)' of FIG. 14, even when a pair of the data and the ECC is written at the address (data) and the address (ECC) which are different from the original pair, one of the data and the ECC of the original pair may be overwritten; however, both of the data and the ECC are not overwritten.

To the right of the same third row, as another example, the pair of the values of A2 to A0 is illustrated in the same manner as above, in the case where a stuck-at-1 fault occurs in A1 bit and the case where a stuck-at-1 fault occurs in A0 bit. It is clear that the pairing of the data and the ECC has collapsed in both cases. It is also clear that the overwrite to both the data and the ECC does not take place.

As yet other examples, in the 6th row (numbered as 5) of the table illustrated in FIG. 16, concerning the address at which each of the data ("DATA5") and the ECC ("ECC5") pairing with the data are stored, the case where a stuck-at-0 fault occurs in A2 bit, the case where a stuck-at-0 fault occurs in A1 bit, and the case where a stuck-at-0 fault occurs in A0 bit are illustrated similarly. In any of the cases, the pairing of the data and the ECC has collapsed. The overwrite to both the data and the ECC of the original pair does not take place. From this table, it is clear that the fault can be certainly detected when the stuck-at fault occurs in any one of bits of the addresses.

About the case of Embodiment 1 in which the "ADR inversion" is performed to the area storing the ECC, FIG. 17 is a table illustrating the value of A2 to A0 as the lower-order 3 bits of the address (data) and the address (ECC) as is the case with FIG. 16. The case where a stuck-at-1 fault has occurred in the A2 bit of the address lying in the second fault example from the left in the third row (numbered as 2) of this table corresponds to what is illustrated in FIG. 15.

In the present case, from the table illustrated in FIG. 17, when the write and read of data are performed after a stuck-at fault occurs in any bit of the address, the pair of the address (data) and the address (ECC) becomes different from the original pair but coincides with another different pair of the address (data) and the address (ECC) (that is, the address becomes degenerate). Therefore, it may be unable to detect the fault of the address signal line when reading the data.

In this case, it is clear that the fault of the address signal line may be overlooked because of the fact that two kinds of pairs of the address (data) and the address (ECC) degenerates to one. However, when the 3-bit address parity of A2 to A0 of each of two kinds of pairs of the address (data) and the address (ECC) before the degeneration is calculated, the value of one kind becomes "0" and the value of the other kind becomes "1." Therefore, it is possible to distinguish both kinds by utilizing this fact. That is, it is possible to devise so that the fault can certainly be detected even in this case.

For example, 3 bits made of three address parity values in series (000 or 111) may be employed as a higher-order 3-bit dummy appended to the 5-bit ECC. That is, in the 3-bit address of A2 to A0 of the address (data), "111" is generated as the dummy bits when the odd number of "1" is included, and "000" is generated as the dummy bits when the even number of "1" is included. When reading the ECC, the ECC check circuit 142 determines that the most frequent value by majority in the value of each of the 3 bits is the value of the address parity. Then, depending on whether the determined value is "0" or "1", the ECC check circuit 142 distinguishes between the fact that the pair of the data and the ECC is right and the fact that both the data and the ECC in the original pair have been overwritten due to the fault of the address signal line. In this way, the ECC check circuit 142 detects the fault of the address signal line.

More specifically, when this fault detection method is employed, the address signal inputted from the bus master is inputted also in the ECC generation circuit 131 and the ECC check circuit 142. Then, the ECC generation circuit 131 generates the dummy bits based on the address indicated by the inputted address signal. The ECC check circuit 142 generates an address parity based on the address indicated by the inputted address signal, and determines whether the generated address parity coincides with the address parity determined from the dummy bits appended to the ECC inputted from the internal memory 14. Then, when the compared address parities do not coincide, the ECC check circuit 142 determines that the address signal line is at fault, and outputs an error notification signal (the value is "1" for example) notifying of the error.

Here, the ECC generation circuit 131 may set the value of the address parity to one bit or two bits, not to all 3 bits of the dummy bit. Then, the ECC check circuit 142 may determine the value of the address parity with reference to the value of either the one bit or the two bits. In this case, however, although it is possible to correct the data, an error notification signal (the value is "1" for example) notifying of the occurrence of the uncorrectable error is issued when the one-bit error occurs and changes the value of the address parity. Therefore, as described above, it is preferable to set the value of the address parity to all 3 bits of the dummy bit.

The above explanation is made for the example in which all the bits of the N-bit address signal inputted from the bus master are rotated (shifted). The present invention is not restricted to this example. For example, a certain amount of effect is obtained if the prescribed number of bits (any number of N bits to one bit) of the N-bit address signal are rotated. This prescribed number of bits may be set as higher-order bits, lower-order bits, continuous bits, or discontinuous bits, as is the case described above. However, as described above, it becomes possible to detect more faults, preferably by rotating all the bits of the N-bit address signal.

As explained above, in Embodiment 2, the ADR conversion circuit 120 generates the address as the second address, by permutating the prescribed number of bits of the bits (corresponding to the lower-order N bits) other than the value of at least one bit of the first address (corresponding to the (N+1)-bit address). In the above-described example, the ADR conversion circuit 120 generates the address as the second address, by permutating all bits (N bits) other than the value of at least one bit of the first address. More specifically, the ADR conversion circuit 120 generates the address as the second address, by shifting all bits (N bits) other than the value of at least one bit of the first address in the higher order direction by the prescribed number of bits (one bit in the above-described example).

Accordingly, when a stuck-at fault (sticking to 0 or 1) occurs in any one of the address signal lines leading to the internal memory 14 after the pair of the data and the ECC generated from the data have been written in the internal memory 14, it is possible to detect the fault of the address signal line when reading the written data.

This is effective similarly to the fault of two or more address signal lines. It is also possible to detect the fault which affects the value of the address, occurring in the ADR conversion circuit 120 to generate and output the address signal to be inputted into the internal memory 14, and in the address signal processing circuit in the internal memory 14.

Furthermore, according to Embodiment 2, even when the write and read of data are performed after a stuck-at fault (sticking to 0 or 1) occurs in any one of the address signal lines, it is possible to detect the fault certainly without overlooking the fault of the address signal line due to the overwriting of both the data and the ECC.

Embodiment 3

Next, the configuration and the operation of Embodiment 3 are explained with reference to drawings. The configuration and the operation of the CPU system 1 according to Embodiment 3 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 3 are fundamentally the same as the configuration and the operation of the I/F conversion circuit 13 according to Embodiment 2 as illustrated in FIG. 9. Accordingly, the explanation thereof is omitted. However, in Embodiment 3, the configuration and the operation of an ADR rotation circuit 123 included in the ADR conversion circuit 120 in the I/F conversion circuit 13 is different from the ADR rotation circuit 123 according to Embodiment 2.

Figure 18:
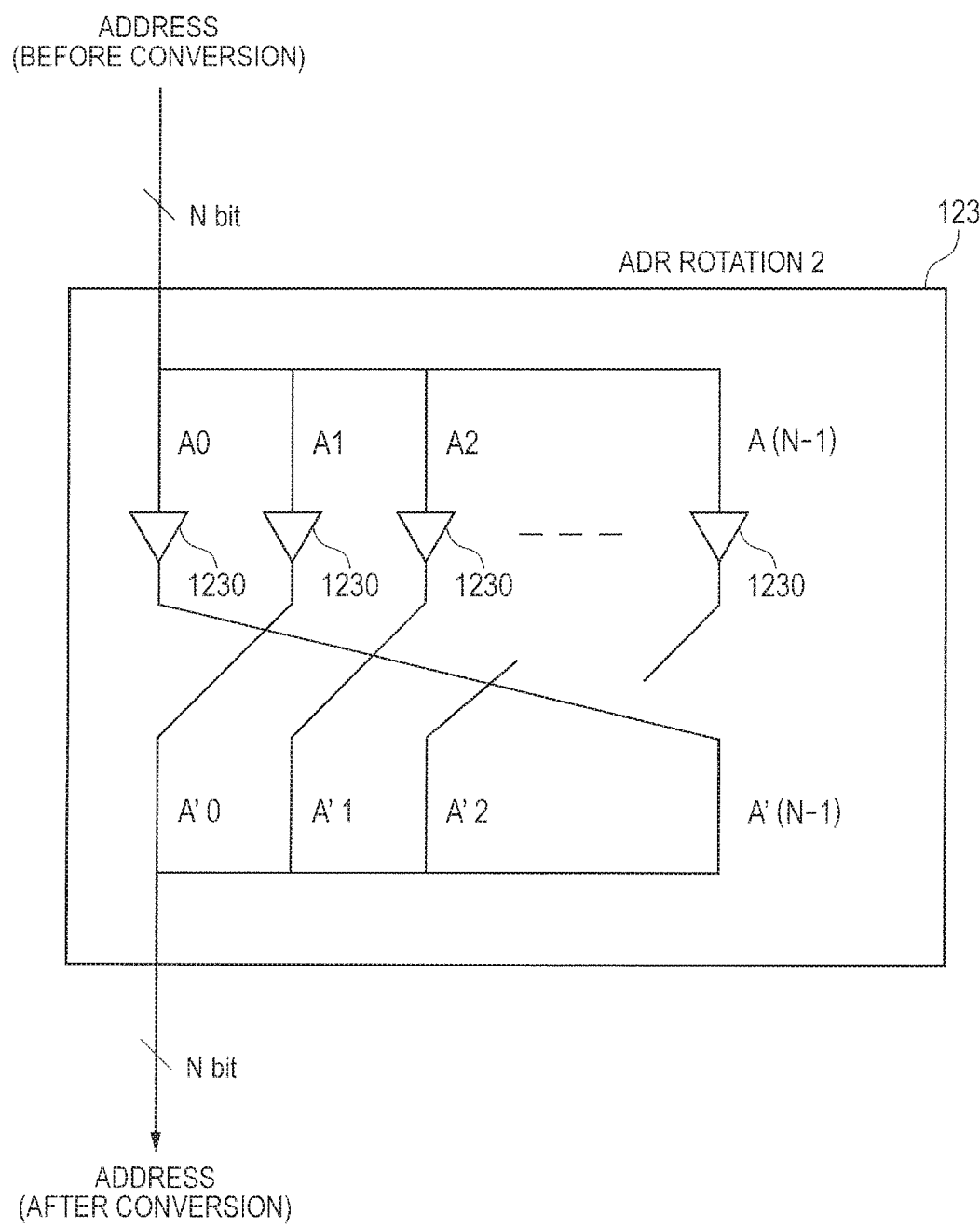
FIG. 18 is a block diagram illustrating the configuration of an ADR rotation circuit according to Embodiment 3.

Next, with reference to FIG. 18, the configuration of the ADR rotation circuit 123 according to Embodiment 3 is explained. Here, an example of the address signal having N bits is explained. Hereinafter, in order to distinguish the rotation of the address in Embodiment 2 and Embodiment 3, the rotation of the bits of the address in Embodiment 3 is expressed as "ADR rotation 2", and the rotation of the bits of the address in Embodiment 2 is expressed as "ADR rotation."

The ADR rotation circuit 123 according to Embodiment 2 rotates left (to the higher-order bit direction) the address indicated by the address signal by one bit, in order to permutate the position of each bit of the N-bit address signal line. As opposed to that, in Embodiment 3, the address is rotated to the opposite direction. That is, the ADR rotation circuit 123 according to Embodiment 3 rotates right (to the lower bit direction) the address by one bit.

As illustrate in FIG. 18, this is realized by shifting and coupling each bit position of the N-bit address signal line in an input stage and an output stage in the ADR rotation circuit 123. That is, each bit A0, A1, A2, . . . , A (N−1) of the N-bit address signal inputted into the ADR rotation circuit 123 is set as each bit A'(N−1), A'0, A'1, . . . , A'(N−2) of the N-bit address signal to be outputted from the ADR rotation circuit 123. Also in this ADR rotation circuit 123, the signal of each bit of the N-bit address signal lines is received by each of N buffers 1230, and the bit position of the connection destination is shifted.

Figure 19:
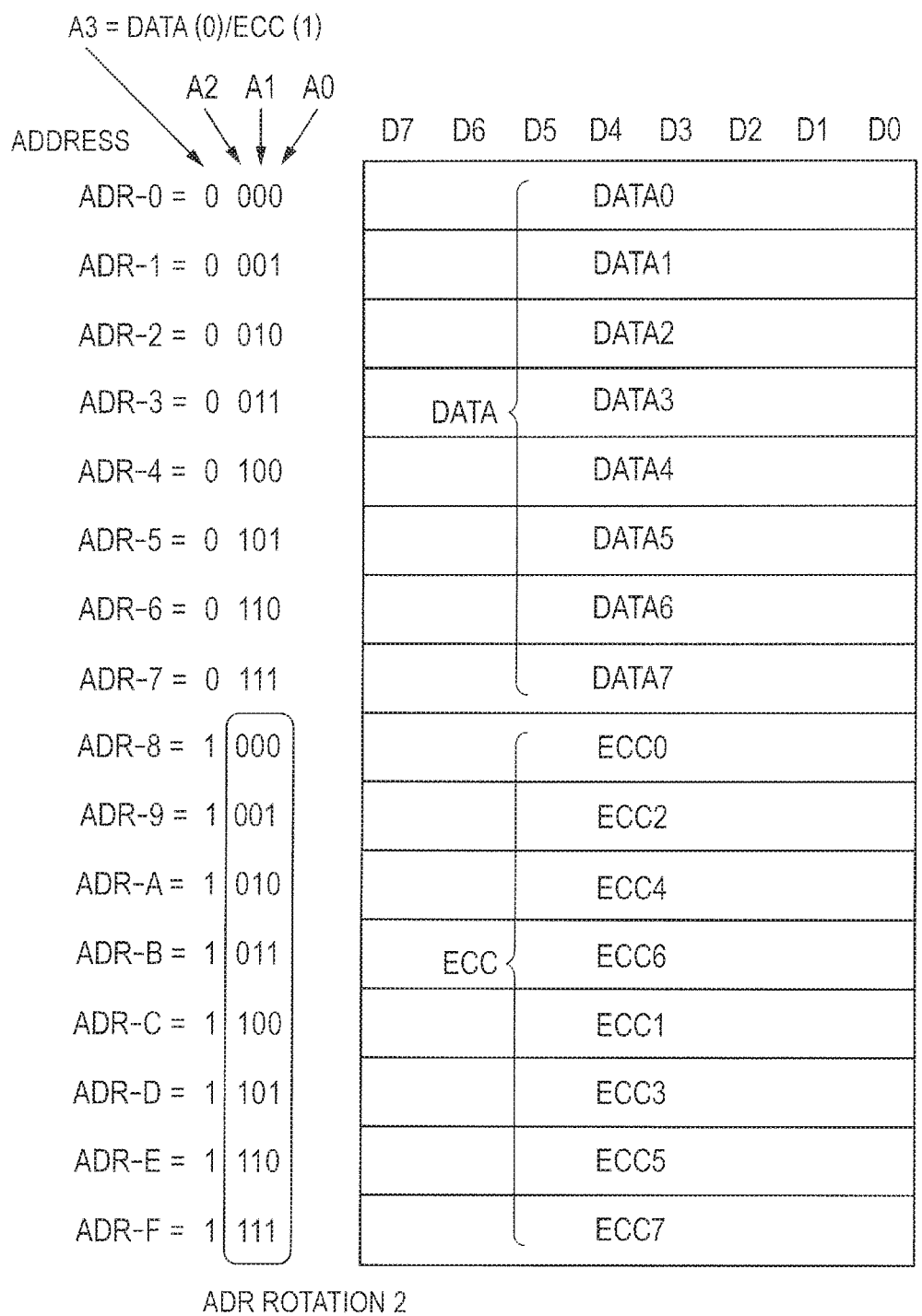
FIG. 19 is a conceptual drawing of a memory map of an internal memory according to Embodiment 3.

Next, with reference to FIG. 19, the memory map of the internal memory 14 according to Embodiment 3 is explained. As is the case with the internal memory 14 according to Embodiment 2 illustrated in FIG. 11, here, the explanation is made for the example in which the data width of the internal memory 14 is 8 bits, the address width of the internal memory 14 is (N+1) bits, the data volume of the internal memory 14 is $(8 \times 2^{(N+1)})$ bits, and N=3.

In Embodiment 3, to the value of the lower-order N bits (A2 to A0 in FIG. 19) of the address at which the data is stored, the value of the lower-order N bits of the address at which the ECC pairing with the data is stored is the value obtained by permutating each bit value by the operation of the ADR rotation circuit 123 illustrated in FIG. 18 (the portion where the value of A2 to A0 is labeled as "ADR rotation 2" in FIG. 19).

That is, as illustrated in FIG. 19, the data ("DATA0") of the address ADR-0 ("0000") and the ECC ("ECC0") of the address ADR-8 ("1000") make a pair. The data ("DATA1") of the address ADR-1 ("0001") and the ECC ("ECC1") of the address ADR-C ("1100") make a pair. The data ("DATA2") of the address ADR-2 ("0010") and the ECC ("ECC2") of the address ADR-9 ("1001") make a pair. The data ("DATA3") of the address ADR-3 ("0011") and the ECC ("ECC3") of the address ADR-D ("1101") make a pair.

The data ("DATA4") of the address ADR-4 ("0100") and the ECC ("ECC4") of the address ADR-A ("1010") make a pair. The data ("DATA5") of the address ADR-5 ("0101") and the ECC ("ECC5") of the address ADR-E ("1110") make a pair. The data ("DATA6") of the address ADR-6 ("0110") and the ECC ("ECC6") of the address ADR-B ("1011") make a pair. The data ("DATA7") of the address ADR-7 ("0111") and the ECC ("ECC7") of the address ADR-F ("1111") make a pair.

As is the case with Embodiments 1 and 2, the ECC is changed to the 8-bit data by adding dummy bits (the value is "0" for example) to the higher order three bits, and stored in the internal memory 14. As is the case with Embodiments 1 and 2, when reading the data, the value change due to the fault (disconnection) of any one or more lines among eight signal lines of the write data (8 bits) is certainly detected, as a one-bit error or a two or more-bit error in the ECC check circuit 142. Same applies to the fault (disconnection) of eight signal lines of the read data (8 bits).

Figure 20:
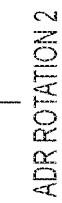
FIG. 20 is a drawing illustrating a value change of an address signal at the time of occurrence of a stuck-at fault according to Embodiment 3.

As for the case of N=3 as illustrated in FIG. 19, FIG. 20 is a table illustrating the values of lower-order three bits A2 to A0 of the address signal over 8 rows (numbered as "0" to "7" in order from the top), about eight different pairs "DATA0" and "ECC0", "DATA1" and "ECC1", . . . , and "DATA7" and "ECC7." In FIG. 20, the address indicated by the address signal inputted into the internal memory 14 when reading the data is expressed as the "address (data)", and the address indicated by the address signal inputted into the internal memory 14 when reading the ECC is expressed as the "address (ECC)."

The following seven different cases are illustrated from the left to the right of this table:

(1) the case where no fault occurs in all the bits of the address;

(2) the case where a stuck-at-1 fault occurs in A2 bit of the address;

(3) the case where a stuck-at-0 fault occurs in A2 bit of the address;

(4) the case where a stuck-at-1 fault occurs in A1 bit of the address;

(5) the case where a stuck-at-0 fault occurs in A1 bit of the address;

(6) the case where a stuck-at-1 fault occurs in A0 bit of the address; and (7) the case where a stuck-at-0 fault occurs in A0 bit of the address.

Three values (0 or 1) at the position of each bit are arranged in order as the value of A2 to A0. The value at the position of a bit which has changed its value due to the fault is underlined.

The second row (numbered as 1) of the table illustrated in FIG. 20 is the row illustrating the addresses at which both of the data ("DATA1") and the ECC ("ECC1") pairing with the data are stored. The address when no fault has occurred in all the bits of the address has the lower-order 3 bits ("001") of ADR-1, and the lower-order 3 bits ("100") of ADR-C, respectively, as illustrated in the leftmost. In the table illustrated in FIG. 20, the pair of these values of A2 to A0 is surrounded with a solid line.

Here, the address when a stuck-at-1 fault occurs in A2 bit is illustrated immediately to the right in the table, where ADR-1 of the address (data) becomes a different ADR-5 (the lower-order 3 bits are "101") by the influence of the fault, and ADR-C (the lower-order 3 bits are "100") of the address (ECC) is not influenced by the fault. In the table, the values after the influence of the fault of the pair of these values of A2 to A0 are surrounded with a dashed line, and at the same time, the address (data) and the address (ECC) which are actually accessed in each of the value after the influence of the fault of the pair of these values of A2 to A0 are surrounded with a solid line and coupled with a thick line in the table. Accordingly, the data ("DATA5") and the ECC ("ECC1") are accessed. That is, it is clear that the pairing of the data and the ECC has collapsed.

Similarly, as other examples, the case where a stuck-at-1 fault occurs in A1 bit and the case where a stuck-at-1 fault occurs in A0 bit are illustrated to the further right in the table, where the pair of the values of A2 to A0 is illustrated in the same manner as the above. However, it is clear that the pairing of the data and the ECC has collapsed in both cases.

As yet other examples, concerning the addresses at which both of the data ("DATA6") and the ECC ("ECC6") pairing with the data are stored, in the 7th row (numbered as 6) of the table illustrated in FIG. 20, similarly, the case where a stuck-at-0 fault occurs in A2 bit, the case where a stuck-at-0 fault occurs in A1 bit, and the case where a stuck-at-0 fault occurs in A0 bit are illustrated. In any of the cases, the pairing of the data and the ECC has collapsed. From this table, it is clear that the fault can be certainly detected when the stuck-at fault occurs in any one of bits of the addresses.

Figure 21:
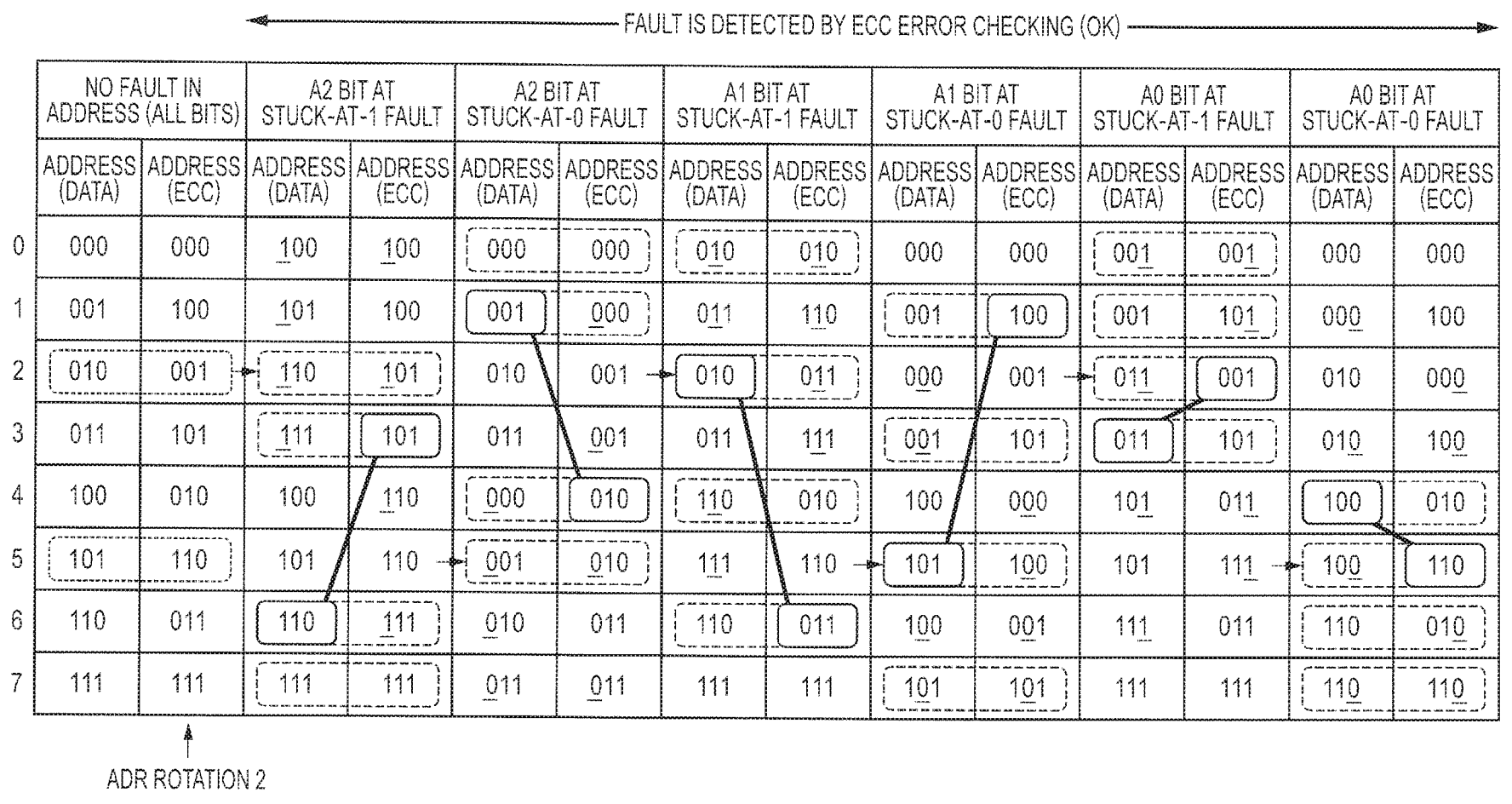

As for the case of N=3 as illustrated in FIG. 19, FIG. 21 is a table illustrating the values of lower-order three bits A2 to A0 of the address signal over 8 rows (numbered as "0" to "7" in order from the top), about eight different pairs "DATA0" and "ECC0", "DATA1" and "ECC1", . . . , and "DATA7" and "ECC7." In FIG. 21, the address indicated by the address signal inputted into the internal memory 14 when reading the data is expressed as the "address (data)", and the address indicated by the address signal inputted into the internal memory 14 when reading the ECC is expressed as the "address (ECC)." As is the case with FIG. 20, the cases where seven different faults (1) to (7) occur are illustrated from the left to the right of this table.

The third row (numbered as 2) of the table illustrated in FIG. 21 is the row illustrating the addresses at which both of the data ("DATA2") and the ECC ("ECC2") pairing with the data are stored. The address when no fault has occurred in all the bits of the address is the lower-order 3 bits ("010") of ADR-2, and the lower-order 3 bits ("001") of ADR-9, respectively, as illustrated in the leftmost. In the table illustrated in FIG. 21, the pair of two of these values of A2 to A0 are surrounded with a dotted line.

Here, the address when a stuck-at-1 fault occurs in A2 bit is illustrated immediately to the right in the table, where ADR-2 of the address (data) becomes a different ADR-6 (the lower-order 3 bits are "110") by the influence of the fault, and ADR-9 (the lower-order 3 bits are "001") of the address (ECC) becomes also a different ADR-D (the lower-order 3 bits are "101") by the influence of the fault. In the table, the values after the influence of the fault of the pair of these values of A2 to A0 are surrounded with a dashed line, and at the same time, the address (data) and the address (ECC) which are actually accessed in each of the value after the influence of the fault of the pair of these values of A2 to A0 are surrounded with a solid line and coupled with a thick line in the table. Accordingly, the data ("DATA6") and the ECC ("ECC3") are accessed. That is, it is clear that the pairing of the data and the ECC has collapsed.

In addition to the value after the influence of the fault of the pair of the values of A2 to A0 in the third row, the values after the influence of the fault of the pair of the values of A2 to A0 in the fourth row, the 7th row, and the 8th row in the table are surrounded with dashed lines as well. However, the pairs of two of the values of A2 to A0 illustrated in these four rows are a combination of four kinds of the address (data) of ADR-6 (the lower-order 3 bits are "110") or ADR-7 (the lower-order 3 bits are "111"), and the address (ECC) of ADR-D (the lower-order 3 bits are "101") or ADR-F (the lower-order 3 bits are "111"). Therefore, even when a pair of the data and the ECC is written at the address (data) and the address (ECC) which are different from the original pair, one of the data and the ECC of the original pair may be overwritten; however, both of the data and the ECC are not overwritten.

To the right of the same third row, as other examples, the case where a stuck-at-1 fault occurs in A1 bit and the case where a stuck-at-1 fault occurs in A0 bit are illustrated, where the pair of two of the values of A2 to A0 is illustrated in the same manner as the above. It is clear that the pairing of the data and the ECC has collapsed in both cases. It is also clear that the overwrite to both the data and the ECC does not take place.

As yet other examples, concerning the addresses at which both of the data ("DATA5") and the ECC ("ECC5") pairing with the data are stored, in the 6th row (numbered as 5) of the table illustrated in FIG. 21, similarly, the case where a stuck-at-0 fault occurs in A2 bit, the case where a stuck-at-0 fault occurs in A1 bit, and the case where a stuck-at-0 fault occurs in A0 bit are illustrated. In any of the cases, the pairing of the data and the ECC has collapsed. The overwrite to both the data and the ECC of the original pair does not take place. From this table, it is clear that the fault can be certainly detected when the stuck-at fault occurs in any one of bits of the addresses.

Also in Embodiment 3, the prescribed number of bits (N bits to one bit) of the N-bit address signal may be rotated, as explained in Embodiment 2.

As explained above, in Embodiment 3, the ADR conversion circuit 120 generates the address as the second address, by permutating the prescribed number of bits of the bits (corresponding to the lower-order N bits) other than the value of at least one bit of the first address (corresponding to the (N+1)-bit address). In the above-described example, the ADR conversion circuit 120 generates the address as the second address, by permutating all bits (N bits) other than the value of at least one bit of the first address. More specifically, the ADR conversion circuit 120 generates the address as the second address, by shifting all bits (N bits) other than the value of at least one bit of the first address in the higher order direction by the prescribed number of bits (one bit in the above-described example).

Accordingly, the same effect as in Embodiment 2 is obtained. That is, when a stuck-at fault (sticking to 0 or 1) occurs in any one of the address signal lines leading to the internal memory 14 after the pair of the data and the ECC generated from the data have been written in the internal memory 14, it is possible to detect the fault of the address signal line when reading the written data.

Furthermore, according to Embodiment 3, even when the write and read of data are performed after a stuck-at fault (sticking to 0 or 1) occurs in any one of the address signal line, it is possible to detect the fault certainly without overlooking the fault of the address signal line due to the overwriting of both the data and the ECC.

Embodiment 4

Next, the configuration and the operation of Embodiment 4 are explained with reference to drawings. The configuration and the operation of the CPU system 1 according to Embodiment 4 are fundamentally the same as the configuration and the operation of the CPU system 1 according to Embodiment 1 as illustrated in FIG. 1. Accordingly, the explanation thereof is omitted. However, in Embodiment 4, the configuration and the operation of a part of the I/F conversion circuit 13 included in the CPU system. 1 are different from those of the I/F conversion circuit 13 according to Embodiment 1.

Figure 22:
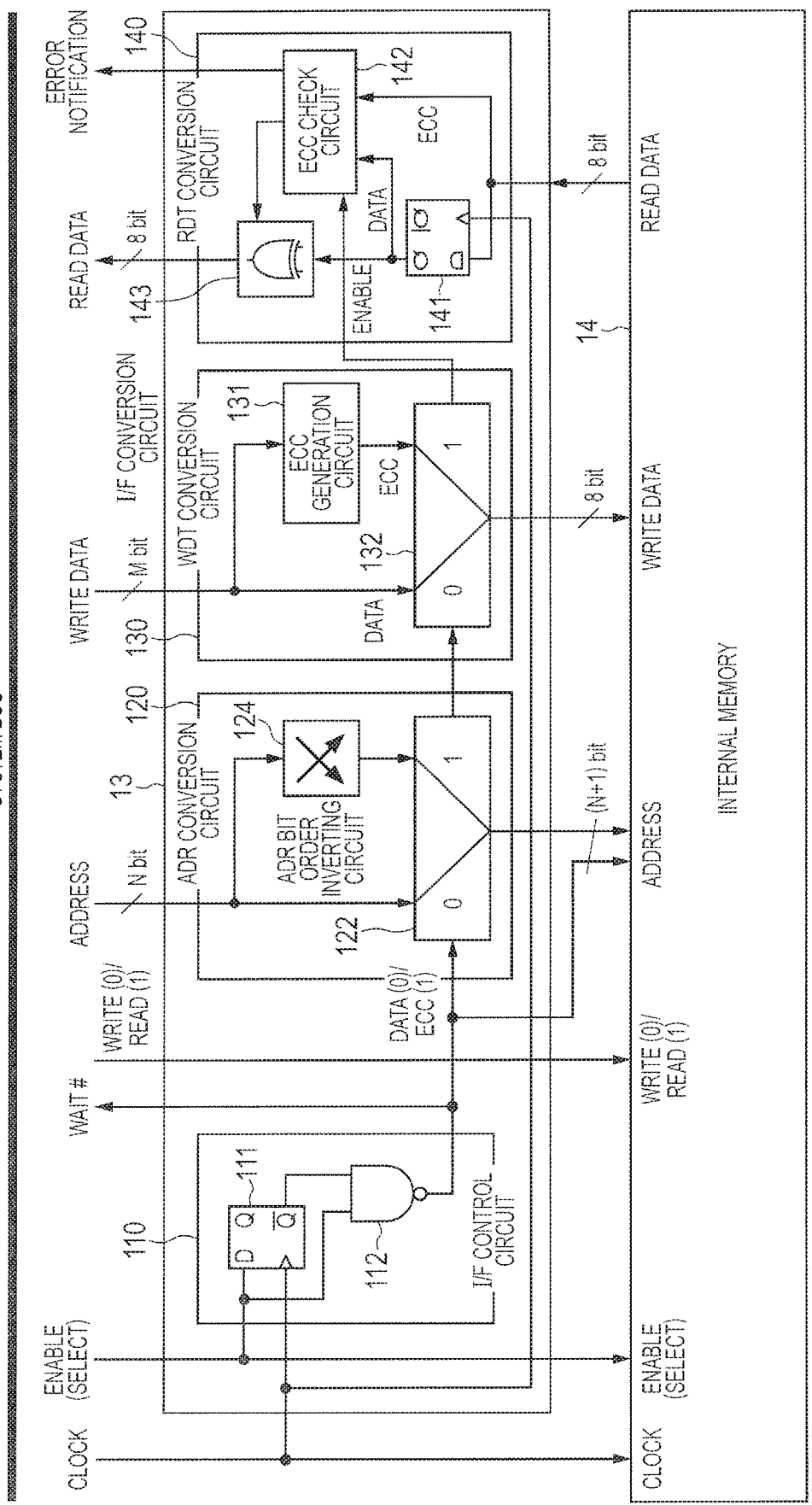
FIG. 22 is a block diagram illustrating the configuration of an I/F conversion circuit according to Embodiment 4.

Next, with reference to FIG. 22, the configuration of the I/F conversion circuit 13 according to Embodiment 4 is explained. As compared with the I/F conversion circuit 13 according to Embodiment 1, the I/F conversion circuit 13 according to Embodiment 4 includes an ADR bit order inverting circuit 124 in lieu of the ADR inverting circuit 121 in the ADR conversion circuit 120. The configuration and the operation of the I/F control circuit 110, the WDT conversion circuit 130, and the RDT conversion circuit 140 according to Embodiment 4 are the same as the configuration and the operation of the counterparts according to Embodiment 1.

The address signal outputted from the bus master is inputted into the ADR bit order inverting circuit 124. The ADR bit order inverting circuit 124 inverts the arrangement order of all the bits of the address indicated by the inputted address signal, and outputs the inverted address to the selector 122. Therefore, in Embodiment 4, the selector 122 selects one of the address signal outputted from the bus master and the address signal outputted from the ADR bit order inverting circuit 124, and outputs the selected address signal to the internal memory 14.

Figure 23:
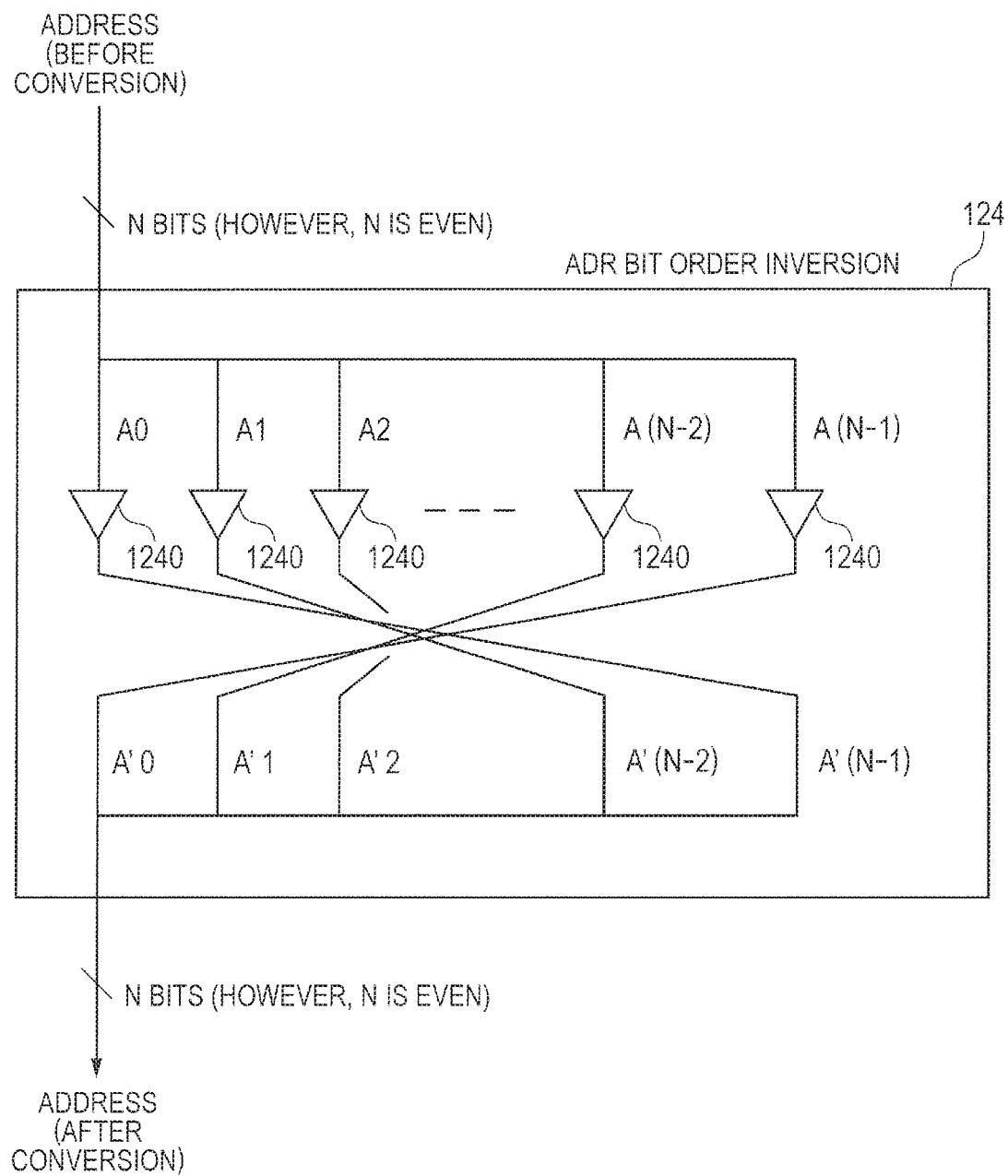
FIG. 23 is a block diagram illustrating the configuration of an ADR bit order inverting circuit according to Embodiment 4.

With reference to FIG. 23, the following explains the configuration of the ADR bit order inverting circuit 124 included in the ADR conversion circuit 120 according to Embodiment 4. Here, an example of the address signal having N bits is explained.

In Embodiment 2, in order to permutate the bits of the N-bit address signal, the address is rotated left (to the higher-order bit direction) by one bit, and in Embodiment 3, the address is rotated right (to the lower-order bit direction) by one bit. As opposed to that, in Embodiment 4, the position of each bit of the address signal is permutated in the upside down direction, to invert the order of bits. That is, the ADR bit order inverting circuit 124 inverts the arrangement order of N bits of the address signal.

As illustrate in FIG. 23, this is realized by shifting and coupling each bit position of the N-bit address signal lines in an input stage and an output stage in the ADR bit order inverting circuit 124. That is, each bit A0, A1, A2, . . . , A(N−2), and A(N−1) of the N-bit address signal inputted into the ADR bit order inverting circuit 124 is set as each bit A'(N−1), A'(N−2), . . . , A'2, A'1, and A'0 of the N-bit address signal to be outputted from the ADR bit order inverting circuit 124. In this ADR bit order inverting circuit 124, the signal of each bit of the N-bit address signal lines is received by each of N buffers 1240, and the bit position of the connection destination is shifted.

Figure 24:
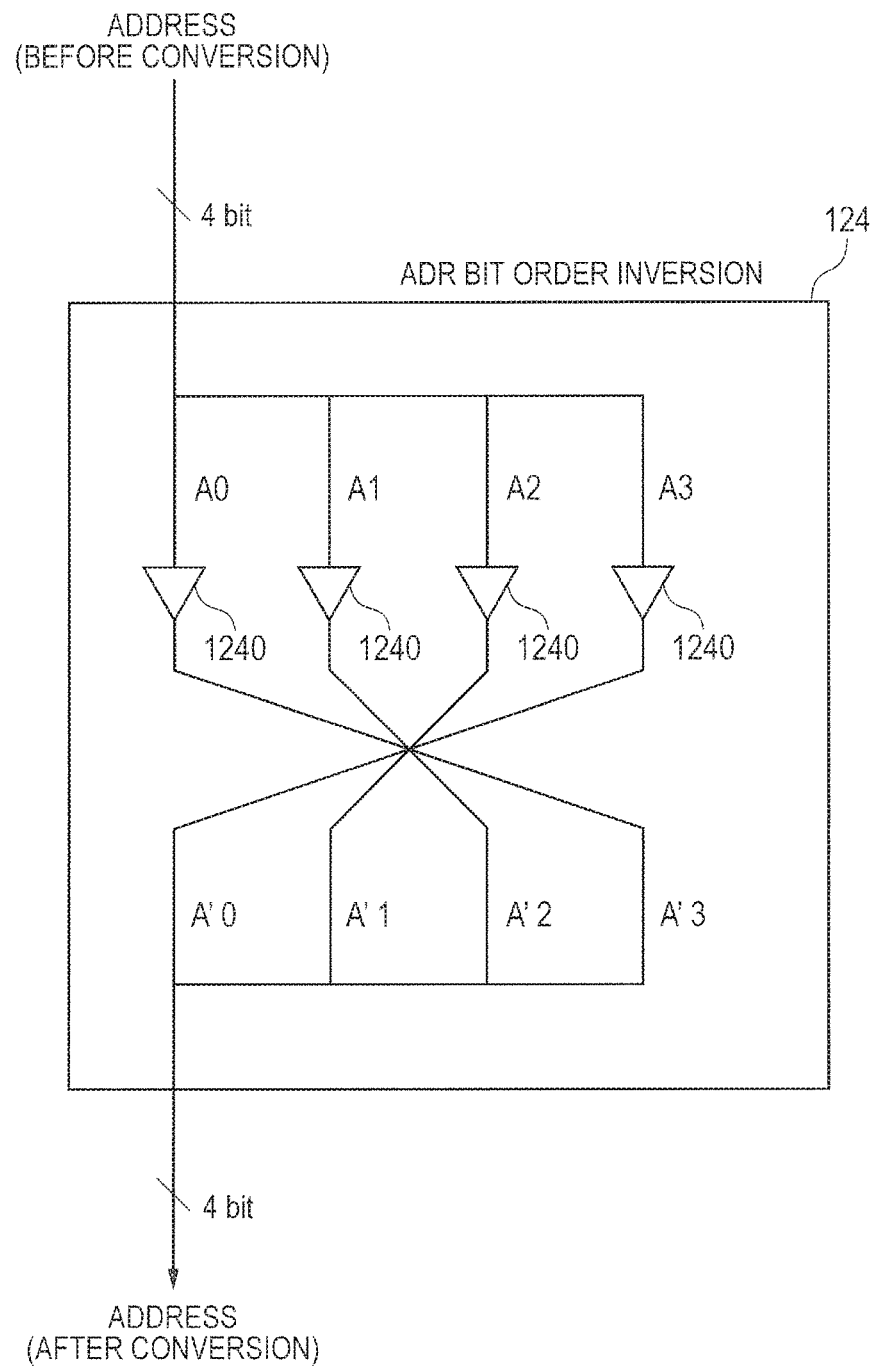
FIG. 24 is a block diagram illustrating the configuration of another ADR bit order inverting circuit according to Embodiment 4.

However, it is necessary to permutate the position of all the bits of the N-bit address. Therefore, in Embodiment 4, it is assumed that N is an even number. For example, in the case of N=4, the configuration of the ADR bit order inverting circuit 124 is as illustrated in FIG. 24.

Also in Embodiment 4, as explained in Embodiment 2 and Embodiment 3, it is also preferable to permutate the prescribed number of bits (one of N bits to one bit) of the N-bit address signal.

As explained above, in Embodiment 4, the ADR conversion circuit 120 generates the address as the second address, by permutating the prescribed number of bits of the bits (corresponding to the lower-order N bits) other than the value of at least one bit of the first address (corresponding to the (N+1)-bit address). In the above-described example, the ADR conversion circuit 120 generates the address as the second address, by permutating all bits (N bits) other than the value of at least one bit of the first address.

More specifically, the ADR conversion circuit 120 generates the address as the second address, by inverting the arrangement order of all bits (N bits) other than the value of at least one bit of the first address.

Accordingly, it is clear that the completely same effect as in Embodiment 2 and Embodiment 3 is obtained. Therefore, the detailed explanation thereof is omitted.

In Embodiment 2, Embodiment 3, and Embodiment 4 explained in the above, the common point is that the address of the ECC pairing with the data is converted by an address permutation circuit such as the ADR rotation circuit 123 or the ADR bit order inverting circuit 124.

Figure 25:
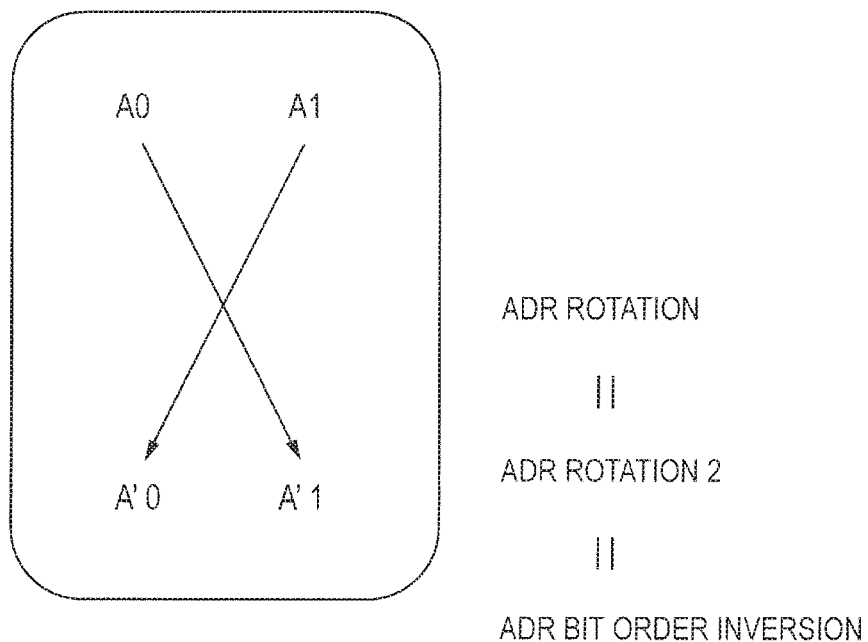
FIG. 25 is a drawing illustrating an address bit permutation pattern of a 2-bit address.

There are several patterns of address permutation methods to permutate the position of all the bits of the N-bit address. Here, it is assumed that the number of patterns is SN ("N" in SN is the number of bits of the address signal inputted into the I/F conversion circuit 13 described above). In the case of N=2, there is only one pattern (S2=1) as illustrated in FIG. 25. In the case of N=3, there are two patterns (S3=2) as illustrated in FIG. 26. The first pattern from the top illustrated in FIG. 26 corresponds to the "ADR rotation" illustrated in Embodiment 2. The second pattern illustrated in FIG. 26 corresponds to the "ADR rotation 2" illustrated in Embodiment 3.

In the case of N=4, there are nine patterns (S4=9) as illustrated in FIG. 27. The first pattern from the top of the left-hand side column corresponds to the "ADR rotation" illustrated in Embodiment 2, the second pattern corresponds to the "ADR rotation 2" illustrated in Embodiment 3, and the third pattern corresponds to the "ADR bit order inversion" in Embodiment 4. Here, three patterns illustrated in the lowermost row of FIG. 26 are two sets of the address bits which are permutated every two bits. Therefore, there are restrictions that the fault detection cannot be performed, if a fault occurs in both the 2-bit address signal lines included in one of the two sets.

Figures 28, 29:
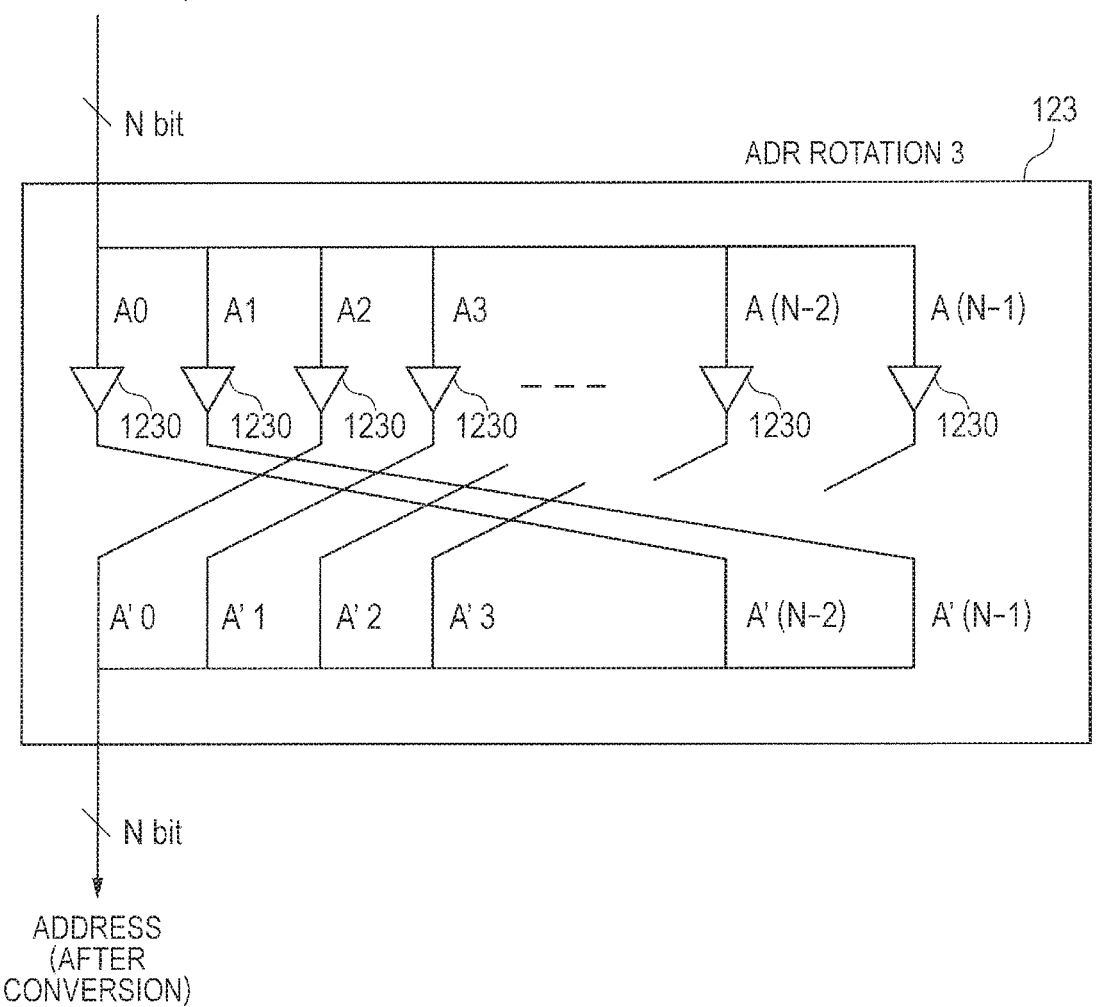
FIG. 28 is a drawing illustrating an equation to calculate the number of address bit permutation patterns.
FIG. 29 is a block diagram illustrating the configuration of an ADR rotation circuit according to Embodiment 5.

Generally, the number of the address permutation methods for the N-bit address (N≥3) is given by Equation 1 illustrated in FIG. 28.

That is, as exemplified in FIG. 27, the permutation of the position of the bits of the address performed by the ADR conversion circuit 120 is not restricted to the "ADR rotation", the "ADR rotation 2", and the "ADR bit order inversion", explained in Embodiments 2 to 4. In the following Embodiment 5, the address permutation method by the "ADR rotation 3" in the middle of the lowermost row of FIG. 27 is explained.

Embodiment 5

Furthermore, the configuration and the operation of Embodiment 5 are explained with reference to drawings. The configuration and the operation of the CPU system 1 according to Embodiment 5 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 5 are fundamentally the same as the configuration and the operation of the I/F conversion circuit 13 according to Embodiment 2 as illustrated in FIG. 9. Accordingly, the explanation thereof is omitted. However, in Embodiment 5, the configuration and the operation of the ADR rotation circuit 123 included in the ADR conversion circuit 120 in the I/F conversion circuit 13 is different from the configuration and the operation of the ADR rotation circuit 123 according to Embodiment 2 and Embodiment 3.

Next, with reference to FIG. 29, the configuration of the ADR rotation circuit 123 according to Embodiment 5 is explained. Here, an example of the address signal having N bits is explained. Hereinafter, the rotation of the address according to Embodiment 5 is expressed as the "ADR rotation 3."

The ADR rotation circuit 123 according to Embodiment 2 rotates left (to the higher-order bit direction) the address indicated by the address signal by one bit, in order to permutate the position of each bit of the N-bit address signal lines. In Embodiment 3, the address is rotated right (to the lower-order bit direction) by one bit. However, in Embodiment 5, the address is rotated right (to the higher-order bit direction) by two bits.

As illustrate in FIG. 29, this is realized by shifting and coupling each bit position of the N-bit address signal lines in an input stage and an output stage in the ADR rotation circuit 123. That is, each bit A0, A1, A2, . . . , A(N−1) of the N-bit address signal inputted into the ADR rotation circuit 123 is set as each bit A'(N−2), A'(N−1), A'0, A'1, . . . , A'(N−3) of the N-bit address signal to be outputted from the ADR rotation circuit 123. Also in this ADR rotation circuit 123, the signal of each bit of the N-bit address signal lines is received by each of N buffers 1230, and the bit position of the connection destination is shifted.

Figure 30:
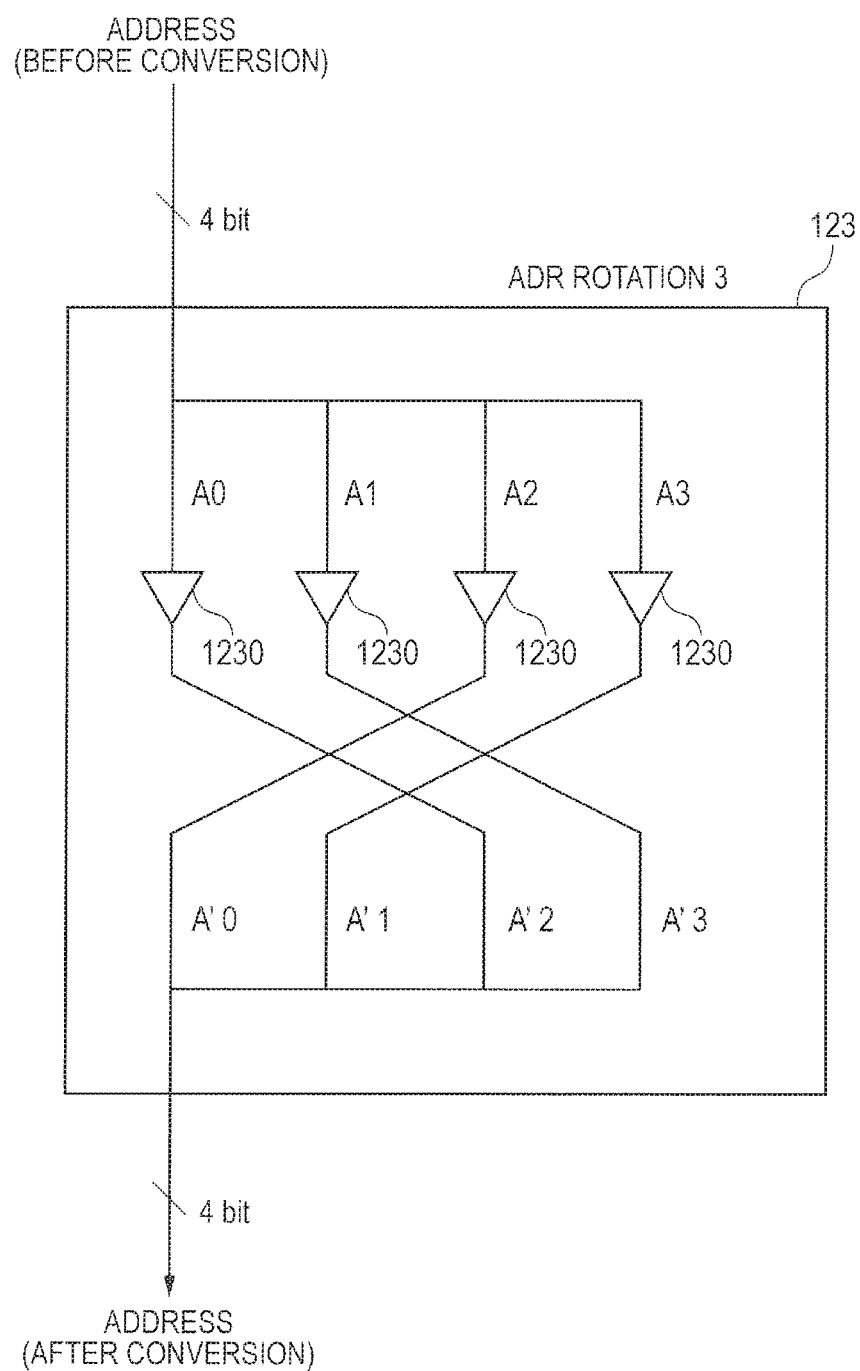
FIG. 30 is a block diagram illustrating the configuration of another ADR rotation circuit according to Embodiment 5.

Here, in the case of N=4, the configuration is as illustrated in FIG. 30. As it is clear from FIG. 30, in the case of N=4, it is equivalent to rotate left (to the lower-order bit direction) the address by two bits. This corresponds exactly to what is illustrated as the "ADR rotation 3" in the middle of the lowermost row of FIG. 27.

Next, with reference to FIG. 31, the memory map of the internal memory 14 according to Embodiment 5 is explained. Here, the explanation is made for the example in which the data width of the internal memory 14 is 8 bits, the address width of the internal memory 14 is (N+1) bits, the data volume of the internal memory 14 is $(8 \times 2^{(N+1)})$ bits, and N=4.

The internal memory 14 uses the left half in FIG. 31 as an area to store the original data, and the right half as an area to store the ECC pairing with the original data. That is, the area in the internal memory 14 is distinguished as an area where the data is stored when the value of the highest-order bit of the address (A4 in FIG. 31) is set to "0", and as an area where the ECC is stored when the value of the highest-order bit of the address is set to "1."

In Embodiment 5, to the value of the lower-order N bits (A3 to A0 in FIG. 31) of the address at which the data is stored, the value of the lower-order N bits of the address at which the ECC pairing with the data is stored is changed to the arrangement in which each bit is permutated by the operation of the ADR rotation circuit 123 illustrated in FIG. 30 (in FIG. 31, the portion where the values of A3 to A0 is labeled as "ADR rotation 3", that is the area illustrated in the right half as A4=1).

That is, as illustrated in FIG. 31, the data ("DATA0") of the address ADR-00 ("00000") and the ECC ("ECC0") of the address ADR-10 ("10000") make a pair. The data ("DATA1") of the address ADR-01 ("00001") and the ECC ("ECC1") of the address ADR-14 ("10100") make a pair. The data ("DATA2") of the address ADR-02 ("00010") and the ECC ("ECC2") of the address ADR-18 ("11000") make a pair. The data ("DATA3") of the address ADR-03 ("00011") and the ECC ("ECC3") of the address ADR-1C ("11100") make a pair. The data ("DATA4") of the address ADR-04 ("00100") and the ECC ("ECC4") of the address ADR-11 ("10001") make a pair. The data ("DATA5") of the address ADR-05 ("00101") and the ECC ("ECC5") of the address ADR-15 ("10101") make a pair. The data ("DATA6") of the address ADR-06 ("00110") and the ECC ("ECC6") of the address ADR-19 ("11001") make a pair. The data ("DATA7") of the address ADR-07 ("00111") and the ECC ("ECC7") of the address ADR-1D ("11101") make a pair. The correspondence relation making a pair in each of the data ("DATA8") to the data ("DATAF") of the other addresses and each of the ECC ("ECC8") to the ECC ("ECCF") of the other addresses can be understood in a similar way from FIG. 31. Accordingly, the detailed explanation thereof is omitted.

In Embodiment 2 and Embodiment 3, assuming that N=3, as illustrated in FIG. 11 and FIG. 19, the explanation is made for an example in which the internal memory 14 includes eight addresses (the combination of the lower-order 3 bits A2 to A0 of the address) to store each of the data and the corresponding ECC. As opposed to that, in Embodiment 5, assuming that N=4, FIG. 31 illustrates the example in which the internal memory 14 includes 16 addresses (twice as many) to store each of the data and the corresponding ECC.

As explained in Embodiment 2 and Embodiment 3, also in Embodiment 5, it is also preferable to rotate the prescribed number of bits (one of N bits to one bit) of the N-bit address signal.

As explained above, in Embodiment 5, the ADR conversion circuit 120 generates the address as the second address, by permutating the prescribed number of bits of the bits (corresponding to the lower-order N bits) other than the value of at least one bit of the first address (corresponding to the (N+1)-bit address). In the above-described example, the ADR conversion circuit 120 generates the address as the second address, by permutating all bits (N bits) other than the value of at least one bit of the first address. More specifically, the ADR conversion circuit 120 generates the address as the second address by shifting all bits (N bits) other than the value of at least one bit of the first address, in the higher order direction by the prescribed number of bits (2 bits in the above-described example).

Accordingly, it is clear that the completely same effect as in Embodiment 2 to Embodiment 4 is obtained. Therefore, the detailed explanation thereof is omitted.

Embodiment 6

Next, the configuration and the operation of Embodiment 6 are explained with reference to drawings. The configuration and the operation of the CPU system 1 according to Embodiment 6 are fundamentally the same as the configuration and the operation of the CPU system 1 according to Embodiment 1 as illustrated in FIG. 1. Accordingly, the explanation thereof is omitted. However, in Embodiment 6, the configuration and the operation of a part of the I/F conversion circuit 13 included in the CPU system 1 are different from those of the I/F conversion circuit 13 according to Embodiment 1.

Figure 32:
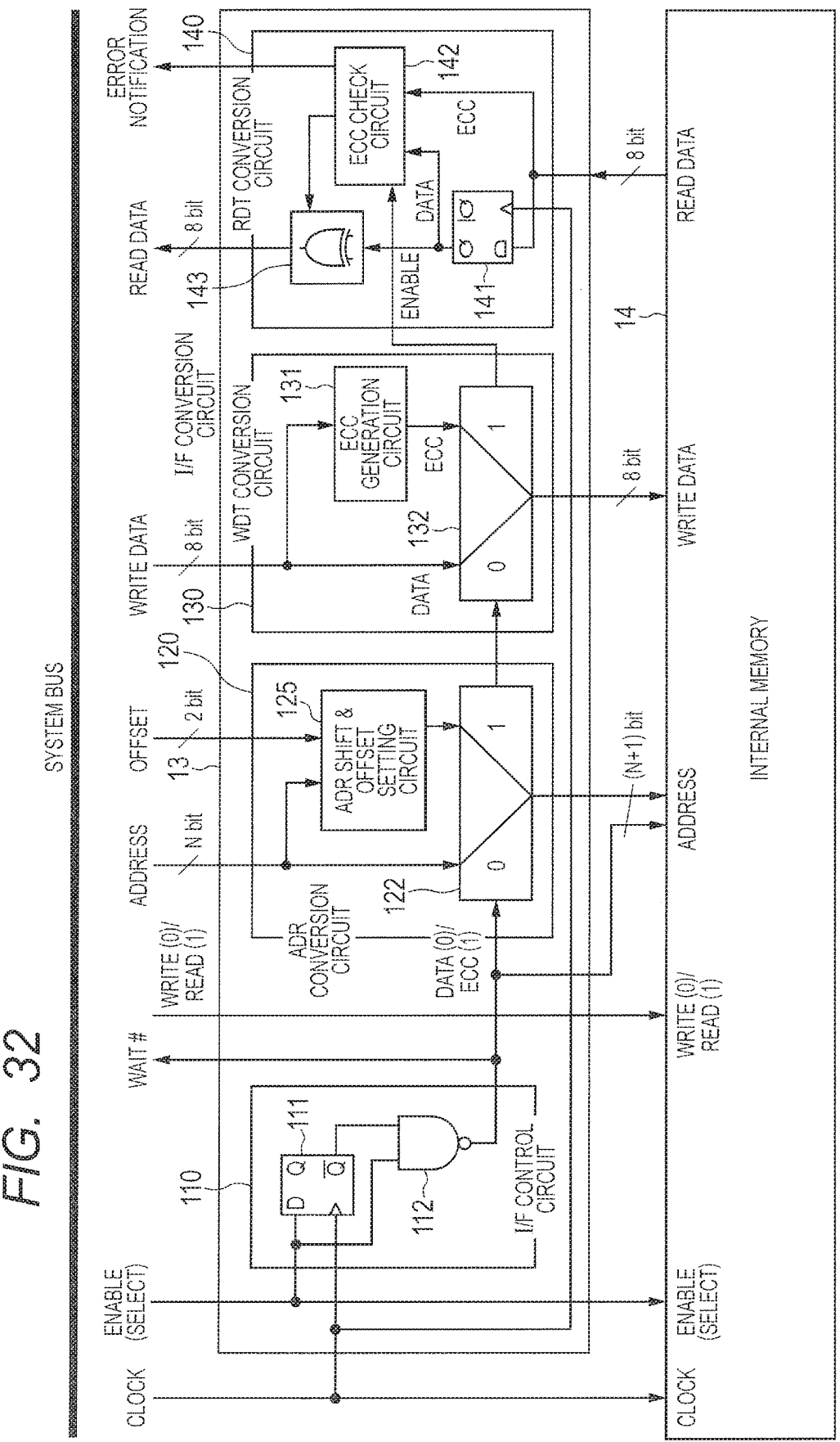
FIG. 32 is a block diagram illustrating the configuration of an I/F conversion circuit according to Embodiment 6.

Next, with reference to FIG. 32, the configuration of the I/F conversion circuit 13 according to Embodiment 6 is explained. As compared with the I/F conversion circuit 13 according to Embodiment 1, the I/F conversion circuit 13 according to Embodiment 6 includes an ADR shift & offset setting circuit 125 in lieu of the ADR inverting circuit 121 of the ADR conversion circuit 120. The configuration and the operation of the I/F control circuit 110, the WDT conversion circuit 130, and the RDT conversion circuit 140 according to Embodiment 6 are the same as the configuration and the operation of the counterparts according to Embodiment 1.

An address signal and a 2-bit offset signal which are outputted from the bus master are inputted into the ADR shift & offset setting circuit 125. The ADR shift & offset setting circuit 125 shifts prescribed plural bits of the inputted address signal, modifies the other bits to an offset value indicated by the offset signal, and outputs the modified address signal to the selector 122. Therefore, in Embodiment 6, the selector 122 selects one of the address signal outputted from the bus master and the address signal outputted from the ADR shift & offset setting circuit 125, and outputs the selected address signal to the internal memory 14.

Figure 33:
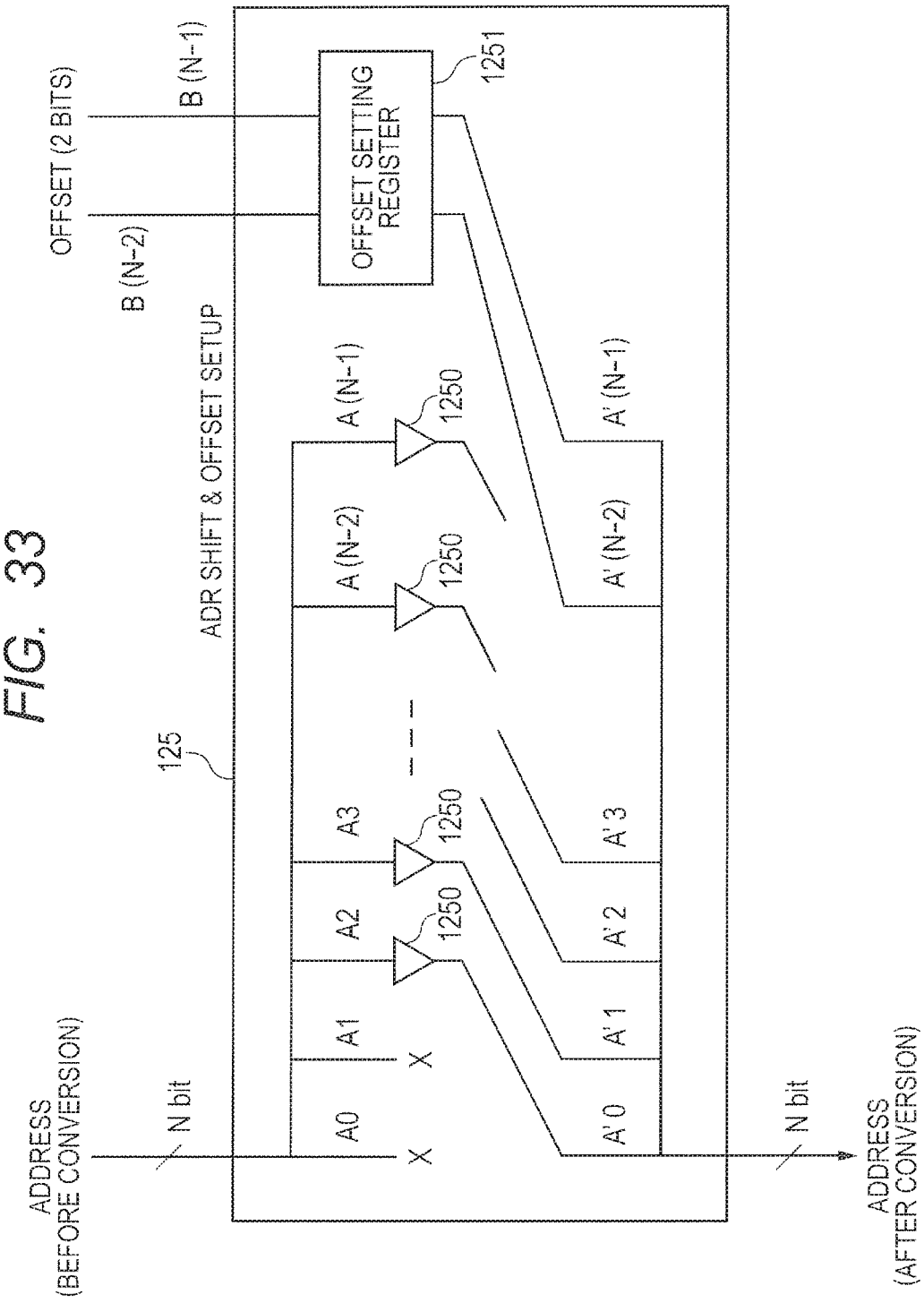
FIG. 33 is a block diagram illustrating the configuration of an ADR shift & offset setting circuit according to Embodiment 6.

Next, with reference to FIG. 33, the configuration of the ADR shift & offset setting circuit 125 included in the ADR conversion circuit 120 according to Embodiment 6 is explained. Here, the explanation is made for an example in which it is assumed that the address signal is N bits and the offset signal is M bits (M=2).

As illustrated in FIG. 33, the ADR shift & offset setting circuit 125 according to Embodiment 6 is different from the ADR rotation circuit 123 according to Embodiment 5 illustrated in FIG. 29 in that 2 bits indicated by the offset signal are employed for the higher order 2 bits, instead of employing the lower order 2 bits (A1 and A0) which are otherwise shifted to the higher order 2 bits.

That is, the ADR shift & offset setting circuit 125 includes an offset setting register 1251. A 2-bit offset signal is fetched into the offset setting register 1251 as an offset value. Each of the 2-bit offset value stored in the offset setting register 1251 is outputted from the ADR shift & offset setting circuit 125 as the higher order 2 bits of the N-bit address signal.

Accordingly, A2, . . . , A(N−1) of the higher order (N−M) bits of the address indicated by the N-bit address signal inputted into the ADR shift & offset setting circuit 125 are respectively set as A'0, A'1, . . . , A'(N−3) of the lower order (N−M) bits of the N-bit address signal to be outputted from the ADR shift & offset setting circuit 125. B(N−2) and B(N−1) of the offset value indicated by the offset signal inputted into the ADR shift & offset setting circuit 125 are respectively set as A'(N−2) and A'(N−1) of the remaining higher order M bits of the N-bit address signal to be outputted from the ADR shift & offset setting circuit 125.

Also in the ADR shift & offset setting circuit 125, the signal of each bit of the (N−M)-bit address signal lines from A2 to A(N−1) is received by each of the (N−M) buffers 1250, and the bit position of the connection destination is shifted.

Figure 34:
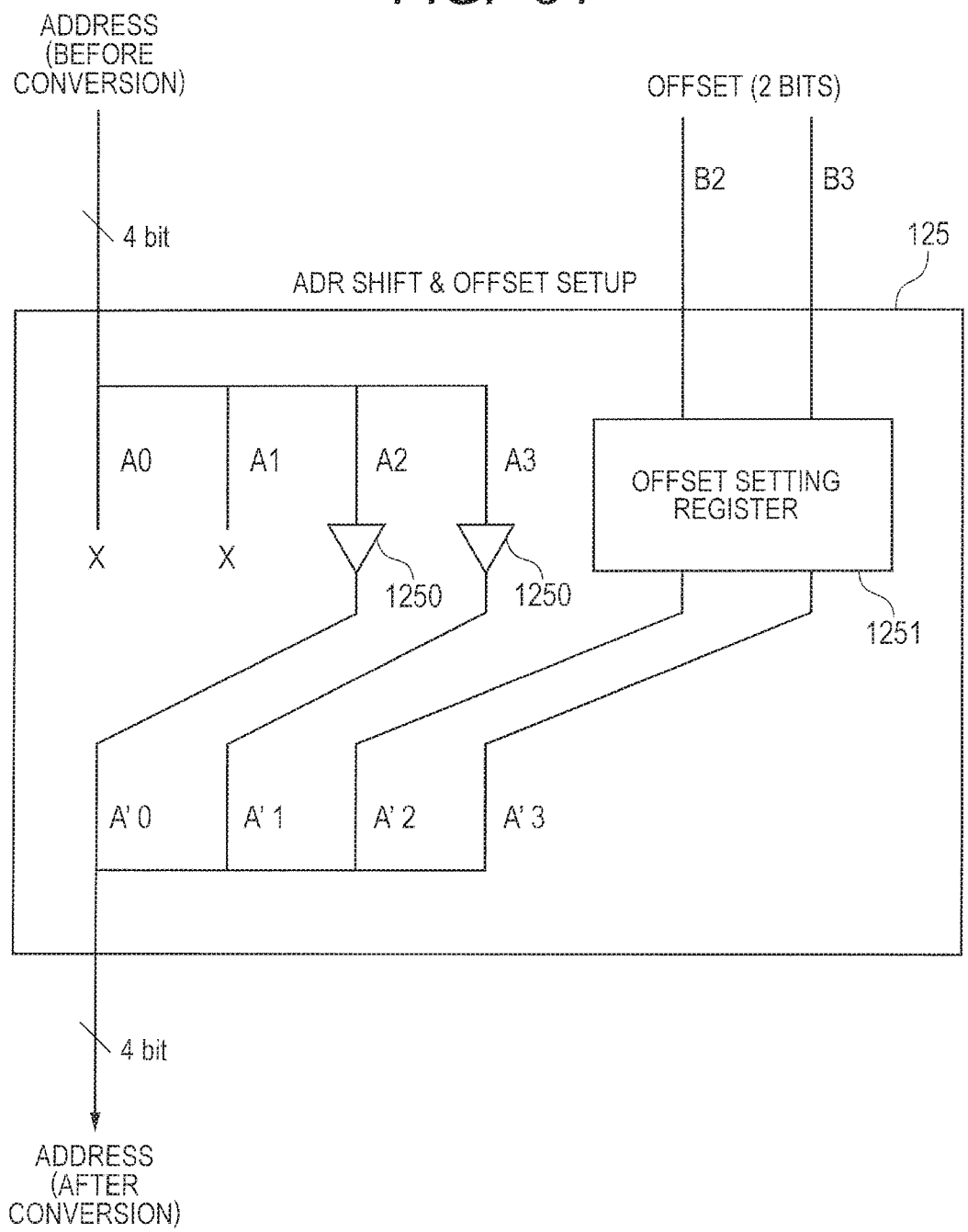
FIG. 34 is a block diagram illustrating the configuration of the ADR shift & offset setting circuit when N=4 bits.

Here, in the case of N=4, the ADR shift & offset setting circuit 125 is configured as illustrated in FIG. 34. That is, the higher order 2 bits, A2 and A3, of the address signal inputted into the ADR shift & offset setting circuit 125 are respectively set as the lower order 2 bits, A'0 and A'1, of the address signal to be outputted from the ADR shift & offset setting circuit 125. The 2 bits, B2 and B3, of the offset signal inputted into the ADR shift & offset setting circuit 125 are set as the higher order 2 bits, A'2 and A'3, of the address signal to be outputted from the ADR shift & offset setting circuit 125.

Figure 35:
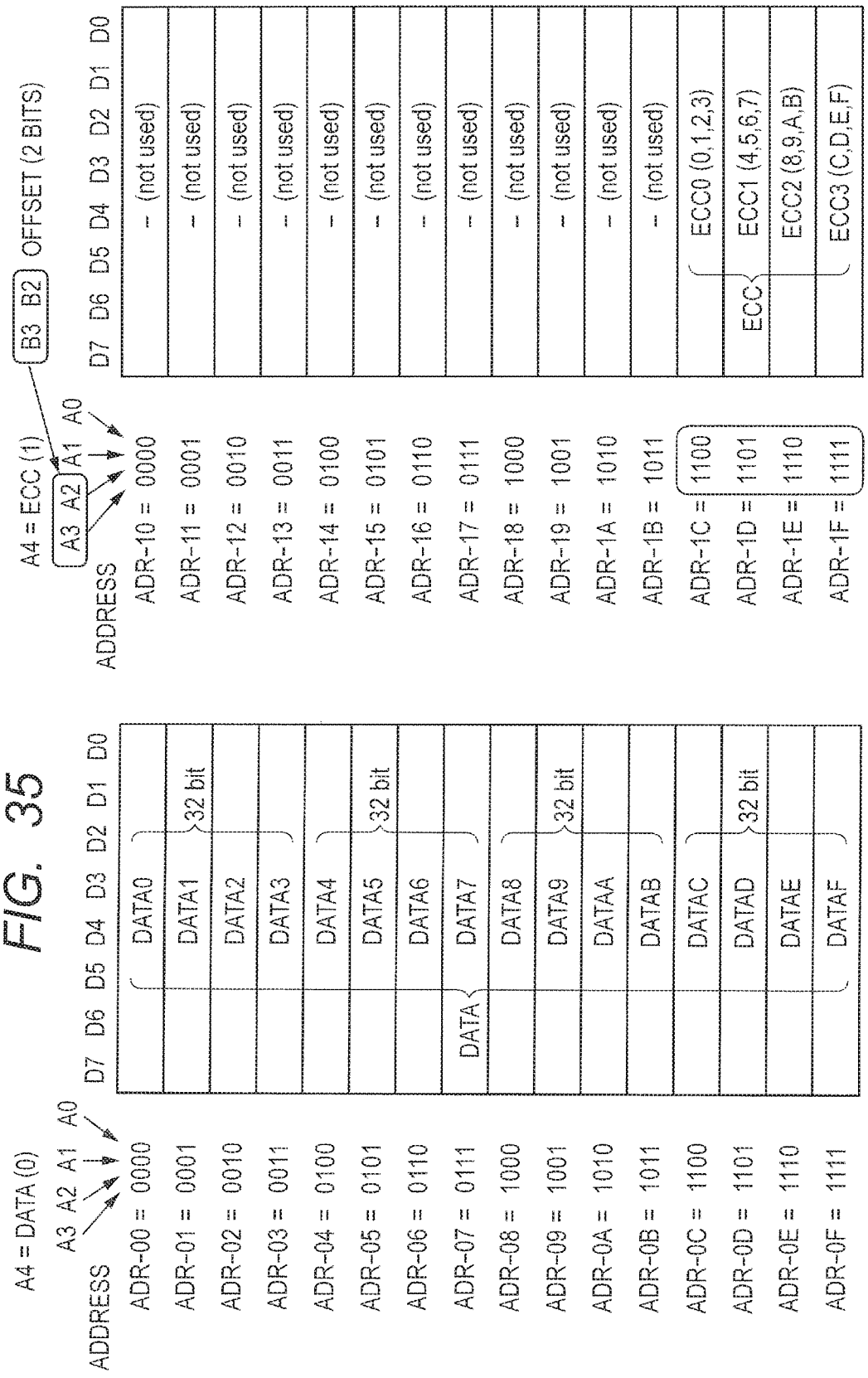
FIG. 35 is a conceptual drawing of a memory map of an internal memory according to Embodiment 6.

Next, with reference to FIG. 35, the memory map of the internal memory 14 according to Embodiment 6 is explained. Here, the explanation is made for the example in which the data width of the internal memory 14 is 8 bits, the address width of the internal memory 14 is (N+1) bits, the data volume of the internal memory 14 is $(8 \times 2^{(N+1)})$ bits, and N=4.

The internal memory 14 uses the left half in FIG. 35 as an area to store the original data, and a part of the right half as an area to store the ECC pairing with the original data. That is, the area in the internal memory 14 is distinguished as an area where the data is stored when the value of the highest-order bit of the address (A4 in FIG. 35) is set to "0", and as an area where the ECC is stored when the value of the highest-order bit of the address is set to "1."

In Embodiment 6, to the value of the lower-order N bits (A3 to A0 in FIG. 35) of the address at which the data is stored, the value of the lower-order N bits of the address at which the ECC pairing with the data is stored is changed to the bit value converted by the operation of the ADR shift & offset setting circuit 125 illustrated in FIG. 34 (the portion where the value of A3 to A0 is labeled as "ADR shift & offset setup" in FIG. 35, or the area where A3=1 and A2=1 among the area illustrated in a part of the right half as A4=1). That is, the example in which both bits B2 and B3 of the 2-bit offset value indicated by the offset signal are set as "1" is illustrated.

That is, as illustrated in FIG. 35, the data ("DATA0" to "DATA3") of the addresses ADR-00 ("00000") to ADR-03 ("00011") and the ECC ("ECC0 (0, 1, 2, 3)") of the address ADR-1C ("11100") make a pair. The data ("DATA4" to "DATA7") of the addresses ADR-04 ("00100") to ADR-07 ("00111") and the ECC ("ECC1 (4, 5, 6, 7)") of the address ADR-1D ("11101") make a pair. The data ("DATA8" to "DATAB") of the addresses ADR-08 ("01000") to ADR-0B ("01011") and the ECC ("ECC2 (8, 9, A, B)") of the address ADR-1E ("11110") make a pair. The data ("DATAC" to "DATAF") of the addresses ADR-0C ("01100") to ADR-0F ("01111") and the ECC ("ECC3 (C, D, E, F)") of the address ADR-1F ("11111") make a pair. That is, 2 bits of the offset value are both set as "1"; accordingly, 12 addresses of ADR-10 ("10000") to ADR-1B ("11011") are not used.

Here, in Embodiment 1 to Embodiment 5, the 5-bit ECC is generated from the 8-bit data, and changed to the 8-bit data by appending a dummy bit (the value is 0) to the higher order 3 bits, then stored in the internal memory 14. However, in Embodiment 6, the 7-bit ECC is generated from the 32-bit (four-address) data, and changed to the 8-bit data by appending a dummy bit (the value is 0) to the highest order one bit, then stored in the internal memory 14.

Therefore, in Embodiment 6, when writing 32-bit data in the internal memory 14, the bus master writes the 32-bit data in four steps of every 8 bits, specifying the continuous addresses. For example, when the 32-bit data ("DATA0" to "DATA3") is written in the internal memory 14, in the first time, the bus master outputs the address signal indicating the address ADR-00 ("00000") and the write data ("DATA0") to the I/F conversion circuit 13. In the second time, the bus master outputs the address signal indicating the address ADR-01 ("00001") and the write data ("DATA1") to the I/F conversion circuit 13. In the third time, the bus master outputs the address signal indicating the address ADR-02 ("00010") and the write data ("DATA2") to the I/F conversion circuit 13. In the fourth time, the bus master outputs the address signal indicating the address ADR-03 ("00011") and the write data ("DATA3") to the I/F conversion circuit 13.

The ECC generation circuit 131 combines four pieces of the write data inputted by the four-time write to generate the 32-bit data, and generates the ECC based on the 32-bit data generated. The ECC generation circuit 131 writes the generated ECC in the internal memory 14 by outputting the generated ECC concerned at the time of the last write (in the fourth time). Therefore, even if an indefinite value is written at the address ADR-1C ("11100") in the first time to the third time, it is overwritten by the ECC generated from the 32-bit data at the time of the fourth write. Therefore, there arises no problem.

In Embodiment 6, when reading the 32-bit data from the internal memory 14, the bus master reads the 32-bit data in four steps of every 8 bits, by specifying the continuous addresses. For example, when the 32-bit data ("DATA0" to "DATA3") is read from the internal memory 14, in the first time, the bus master outputs the address signal indicating the address ADR-00 ("00000") to the I/F conversion circuit 13. In the second time, the bus master outputs the address signal indicating the address ADR-01 ("00001") to the I/F conversion circuit 13. In the third time, the bus master outputs the address signal indicating the address ADR-02 ("00010") to the I/F conversion circuit 13. In the fourth time, the bus master outputs the address signal indicating the address ADR-03 ("00011") to the I/F conversion circuit 13.

The ECC check circuit 142 and the error correction circuit 143 combine four pieces of the read data inputted by four-time read and generate the 32-bit data. The ECC check circuit 142 generates an ECC based on the generated 32-bit data, and detects an error of the 32-bit data based on the generated ECC and the ECC read in the fourth time. Then, according to the determination result by the ECC check circuit 142, the error correction circuit 143 outputs the 32-bit data as it is or after correcting it, to the bus master as the read data. However, in Embodiment 6, the 32-bit read data to be outputted from the error correction circuit 143 is outputted to the bus master in four steps of every 8 bits.

As for the case of N=4 illustrated in FIG. 35, FIG. 36 illustrates a table of the values of the lower-order 4 bits, A3 to A0, of the address signal about four kinds of pairs: "DATA0" to "DATA3" and "ECC0"; "DATA4" to "DATA7" and "ECC1"; "DATA8" to "DATAB" and "ECC2"; and "DATAC" to "DATAF" and "ECC3." In FIG. 36, the address indicated by the address signal inputted into the internal memory 14 when reading the data is expressed as the "address (data)", and the address indicated by the address signal inputted into the internal memory 14 when reading the ECC is expressed as the "address (ECC)."

The following seven different cases are illustrated from the left to the right of this table:

(1) the case where no fault occurs in all the bits of the address;

(2) the case where a stuck-at-1 fault occurs in A3 bit of the address;

(3) the case where a stuck-at-0 fault occurs in A3 bit of the address;

(4) the case where a stuck-at-1 fault occurs in A2 bit of the address;

(5) the case where a stuck-at-0 fault occurs in A2 bit of the address;

(6) the case where a stuck-at-1 fault occurs in A1 bit of the address; and (7) the case where a stuck-at-0 fault occurs in A1 bit of the address.

Each of the case where a stuck-at-1 fault occurs in A0 bit of the address and the case where a stuck-at-0 fault occurs in A0 bit of the address are similar to each of the case where a stuck-at-1 fault occurs in A1 bit of the address and the case where a stuck-at-0 fault occurs in A1 bit of the address. Accordingly, they are omitted from this table. Four values (0 or 1) at the position of each bit are arranged in order as the value of A3 to A0. The value at the position of a bit which has changed its value due to the fault is underlined.

The second row (numbered as 4 to 7) of the table illustrated in FIG. 36 is the row illustrating the addresses at which both of the data ("DATA4" to "DATA7") and the ECC ("ECC1") pairing with the data are stored. The address when no fault has occurred in all the bits of the address has the lower-order 4 bits ("0100" to "0111") of ADR-04 to ADR-07, and the lower-order 4 bits ("1101") of ADR-A, respectively as illustrated in the leftmost. In the table illustrated in FIG. 36, the pair of the four addresses of the address (data) and the single address of the address (ECC) is surrounded with a solid line.

Here, in the address when a stuck-at-1 fault occurs in A3 bit, the addresses ADR-04 to ADR-07 (the lower-order 4 bits are "0100" to "0111") become a different addresses ADR-0C to ADR-0F (the lower-order 4 bits are "1100" to "1111") by the influence of the fault, and the address ADR-1D (the lower-order 4 bits are "1101") is not influenced by the fault. In the table, the values after the influence of the fault of the pair of the values of A3 to A0 are surrounded with a dashed line, and at the same time, the address (data) and the address (ECC) which are actually accessed in each of the value after the influence of the fault of the pair of the values of A3 to A0 are surrounded with a solid line and coupled with a thick line in the table. As illustrated here, the data ("DATAC"-"DATAF") of the fourth row and the ECC ("ECC2") of the second row are accessed. That is, it is clear that the pairing of the data and the ECC has collapsed.

As another example, the case where a stuck-at-0 fault occurs in A3 bit is illustrated to the further right in the table, where the pair of the values of A3 to A0 is illustrated in the same manner as the above. In this case, the address ADR-1D (the lower-order bits are "1101") becomes a different address ADR-15 (the lower-order 4 bits are "0101") by the influence of the fault, and the address is not used for storing the ECC. Therefore, it is clear that the pairing of the data and the ECC has collapsed.

As further another example, the case where a stuck-at-0 fault occurs in A1 bit is illustrated at the rightmost of the same second row, where the pair of the values of A3 to A0 is illustrated in the same manner as the above. In this case, the addresses ADR-04 to ADR-07 (the lower-order 4 bits are "0100" to "0111") degenerate to two addresses ADR-04 and ADR-05 (the lower-order 4 bits are "0100" and "0101"). Therefore, it becomes impossible to read the data ("DATA6") and the data ("DATA7") which are stored at the addresses ADR-06 and ADR07, respectively. Accordingly, it is clear that the pairing of the data and the ECC has collapsed.

As yet another example, concerning the addresses at which both of the data ("DATA8" to "DATAB") and the ECC ("ECC2") pairing with the data are stored, in the third row of the table illustrated in FIG. 36, the case where a stuck-at-1 fault occurs in A2 bit, the case where a stuck-at-0 fault occurs in A2 bit, and the case where a stuck-at-1 fault occurs in A1 bit are shown similarly. In any of the cases, the pairing of the data and the ECC has collapsed. From this table, it is clear that the fault can be certainly detected when the stuck-at fault occurs in any one of bits of the addresses. The case where the offset (2 bits) are both set as "1" is explained. However, even in the case where the offset is set to the other value "0", it is clear that the same as the above is obtained. Accordingly, the detailed explanation thereof is omitted.

Furthermore, when the write and read of data are performed after a stuck-at fault occurs in any one of bits of the address, the pair of the address (data) and the address (ECC) becomes a different pair from the original pair. However, it is clear that this different pair does not coincide with another different pair of the address (data) and the address (ECC) (that is, the address does not become degenerate). Therefore, the overwrite to both the data and the ECC does not occur. Accordingly, it is clear that the fault can be certainly detected even after the stuck-at fault occurs in any one of bits of the address.

As explained above, in Embodiment 6, the address as the second address is generated by shifting the bits except the bits of the prescribed offset bit number from the lower order among the bits (corresponding to the lower-order N bits) other than at least one bit of the first address (corresponding to the (N+1)-bit address) to the lower-order direction by the offset bit number, and at the same time, by modifying the offset bits of the offset bit number (corresponding to M bits) from the higher order, to the set-up offset value.

According to this, it is clear that the completely same effect as in Embodiment 2 to Embodiment 5 is obtained. Accordingly, the detailed explanation thereof is omitted.

Embodiment 7

Next, the configuration and the operation of Embodiment 7 are explained with reference to drawings. The configuration and the operation of the CPU system 1 according to Embodiment 7 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 7 are fundamentally the same as the configuration and the operation of the I/F conversion circuit 13 according to Embodiment 6 as illustrated in FIG. 32. Accordingly, the explanation thereof is omitted. However, in the I/F conversion circuit 13 according to Embodiment 7, the configuration and the operation of a part of the ADR conversion circuit 120 is different from the configuration and the operation of the ADR conversion circuit 120 according to Embodiment 6. The configuration and the operation of the I/F control circuit 110, the WDT conversion circuit 130, and the RDT conversion circuit 140 according to Embodiment 7 are the same as the configuration and the operation of the counterparts according to Embodiment 6.

Figure 37:
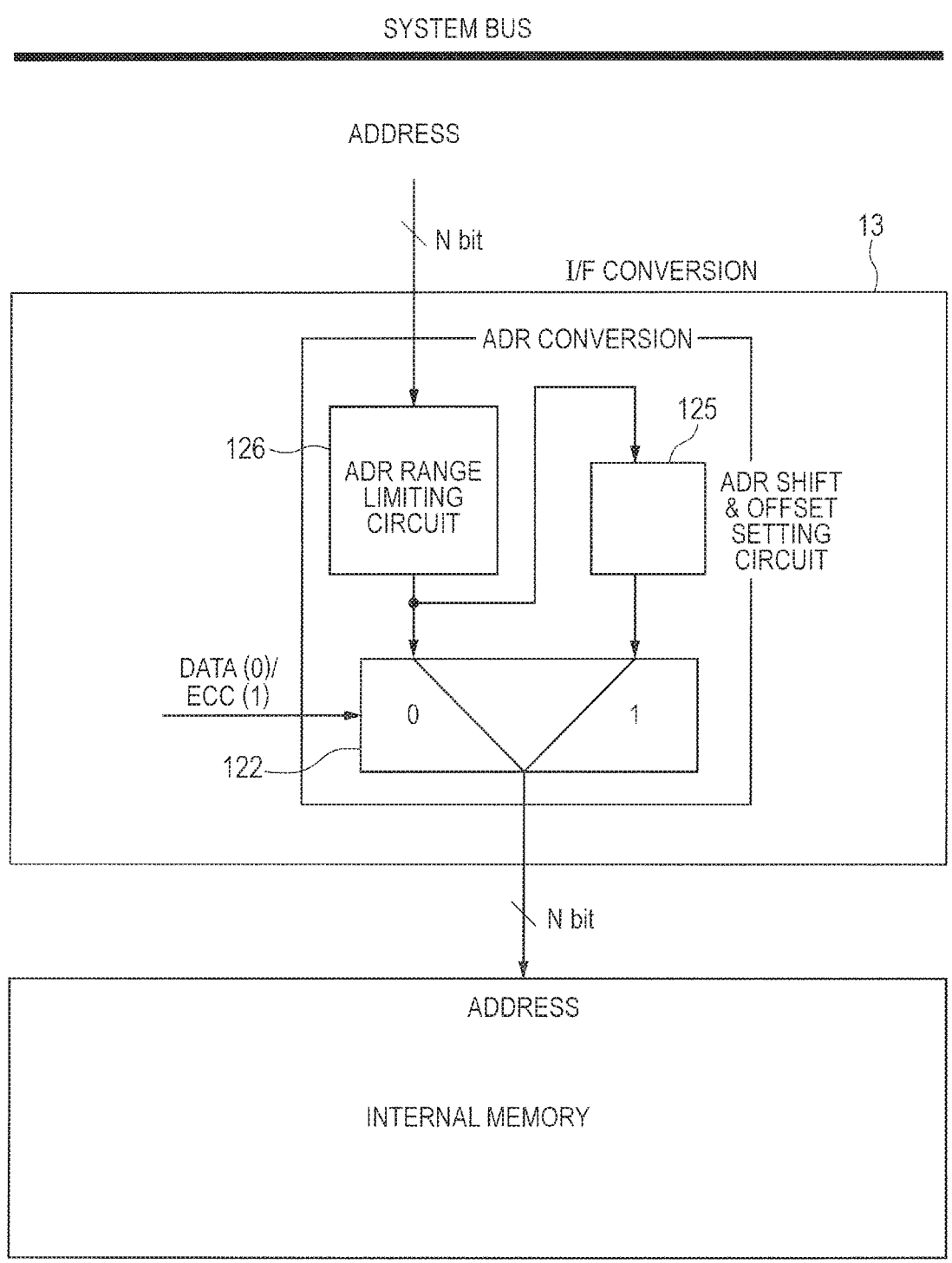
FIG. 37 is a block diagram illustrating the configuration of an ADR converting circuit in an I/F conversion circuit according to Embodiment 7.

Next, with reference to FIG. 37, the configuration of the ADR conversion circuit 120 according to Embodiment 7 is explained.

As illustrated in FIG. 37, the ADR conversion circuit 120 according to Embodiment 7 further includes an ADR range limiting circuit 126 as compared with the ADR conversion circuit 120 according to Embodiment 6.

The ADR range limiting circuit 126 limits the address (data). The address signal inputted from the bus master is inputted into the ADR range limiting circuit 126. When the address indicated by the inputted address signal is not included in the range determined in advance to be capable of storing the data, the ADR range limiting circuit 126 modifies the address so that it may fall within the range, and outputs the address signal indicating the modified address to the selector 122 and the ADR shift & offset setting circuit 125. On the other hand, when the address indicated by the inputted address signal is included in the range determined in advance to be capable of storing the data, the ADR range limiting circuit 126 outputs the address signal indicating the modified address as it is to the selector 122 and the ADR shift & offset setting circuit 125.

Figure 38:
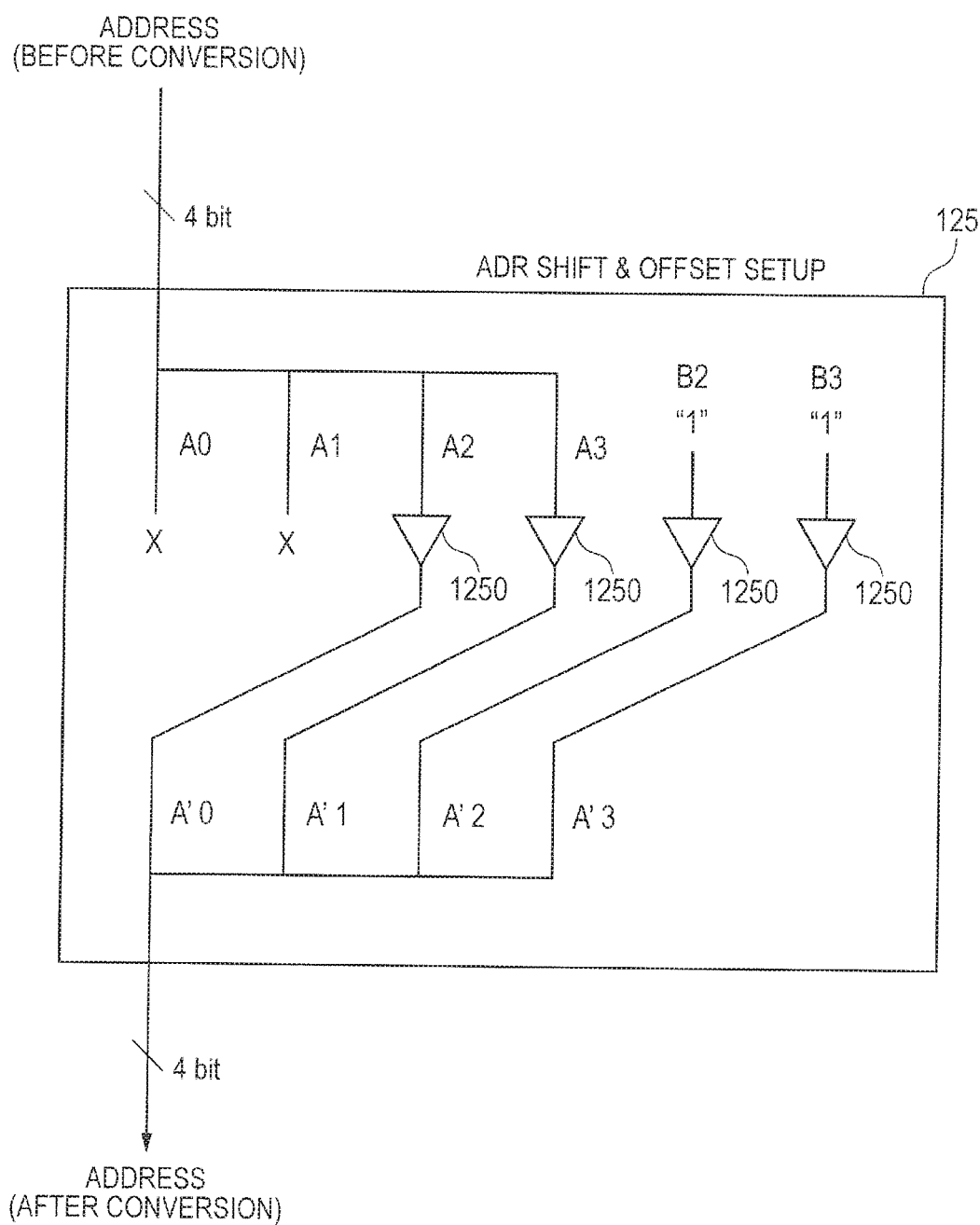
FIG. 38 is a block diagram illustrating the configuration of an ADR shift & offset setting circuit according to Embodiment 7.

Next, with reference to FIG. 38, the configuration of the ADR shift & offset setting circuit 125 according to Embodiment 7 is explained. Here, an example of the N-bit address signal is explained.

As illustrated in FIG. 38, the ADR shift & offset setting circuit 125 according to Embodiment 7 is different from the ADR shift & offset setting circuit 125 according to Embodiment 6 illustrated in FIG. 34 in that the offset setting register 1251 is deleted. That is, the ADR shift & offset setting circuit 125 according to Embodiment 7 fixes each bit value of the offset (2 bits) which is set arbitrarily in Embodiment 6, to a value (assuming as "1" here) determined in advance.

Therefore, the higher order (N−M) bits, A2 and A3, of the address indicated by the N-bit address signal inputted into the ADR shift & offset setting circuit 125 are set respectively as the lower order (N−M) bits, A'0 and A'1, of the address indicated by the N-bit address signal to be outputted from the ADR shift & offset setting circuit 125. The bits B2 and B3 (the value is both "1") of the prescribed offset value are respectively set as the remaining higher order M bits, A'(N−2)=A'2 and A'(N−1)=A'3, of the N-bit address signal to be outputted from the ADR shift & offset setting circuit 125.

Figure 39:
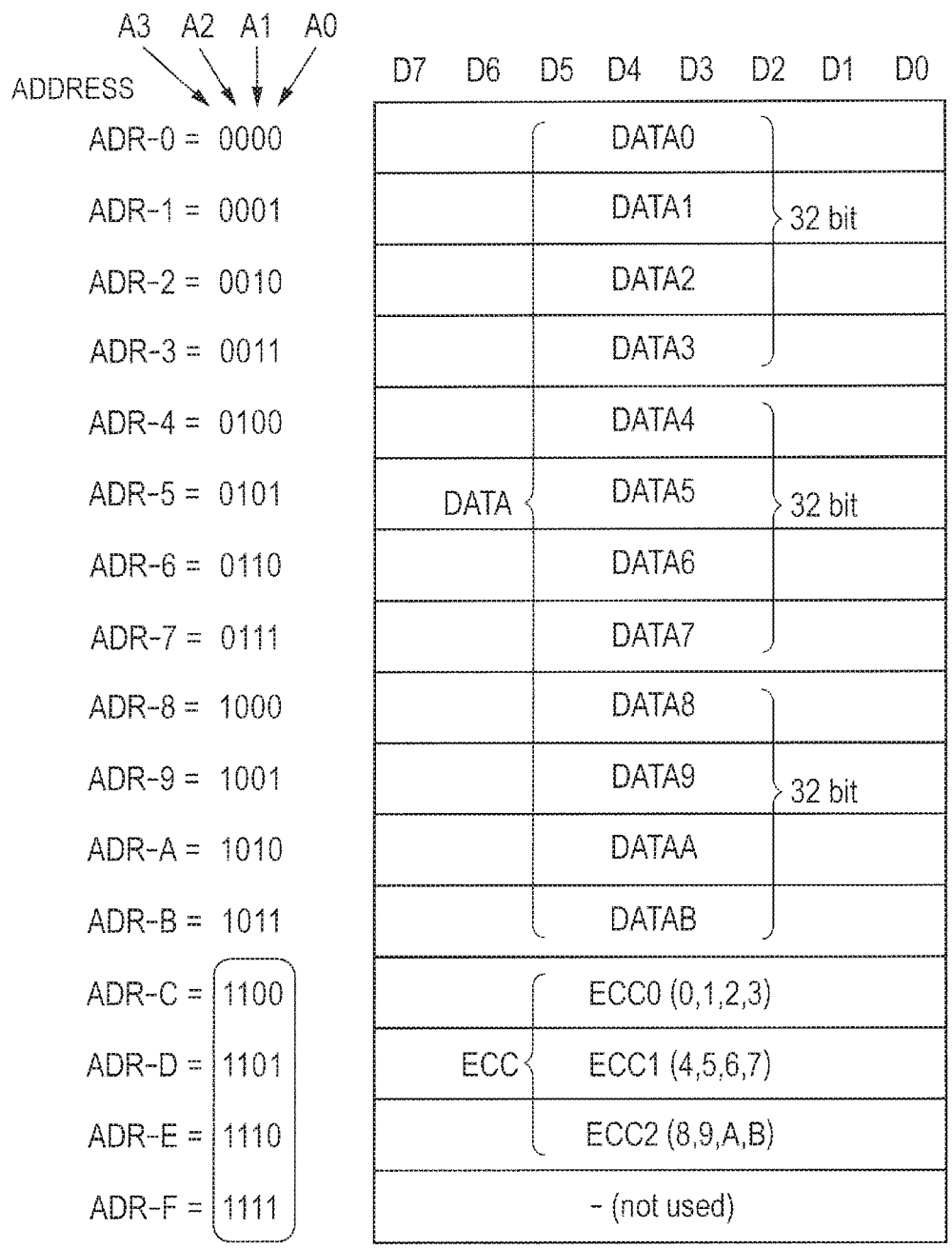
FIG. 39 is a conceptual drawing of a memory map of an internal memory according to Embodiment 7.

Next, with reference to FIG. 39, the memory map of the internal memory 14 according to Embodiment 7 is explained. Here, the explanation is made for the example in which the data width of the internal memory 14 is 8 bits, the address width of the internal memory 14 is N bits, the data volume of the internal memory 14 is $(8 \times 2^N)$ bits, and N=4. That is, in Embodiment 7, the wait #signal is not utilized as a signal which indicates the highest-order bit of the address.

The internal memory 14 uses 12 addresses from the top in FIG. 39 as an area to store the data, and the following four addresses as an area to store the ECC. That is, in the area of the internal memory 14, to the value of N bits (A3 to A0 in FIG. 39) of the address to store the data, the value of N bits of the address to store the ECC pairing with the data is what is converted by the operation of the ADR shift & offset setting circuit 125 illustrated in FIG. 38 (the portion where the values of A3 to A0 are labeled as "ADR shift & offset setup" in FIG. 39, or the area of four addresses from the bottom).

That is, as illustrated in FIG. 39, the data ("DATA0" to "DATA3") of the addresses ADR-0 ("0000") to ADR-3 ("0011") and the ECC ("ECC0 (0, 1, 2, 3)") of the address ADR-C ("1100") make a pair. The data ("DATA4" to "DATA7") of the addresses ADR-4 ("0100") to ADR-7 ("0111") and the ECC ("ECC1 (4, 5, 6, 7)") of the address ADR-D ("1101") make a pair. The data ("DATA8" to "DATAB") of the addresses ADR-8 ("1000") to ADR-B ("1011") and the ECC ("ECC2 (8, 9, A, B)") of the address ADR-E ("1110") make a pair. The area of the last address ADR-F ("1111") is not used.

Accordingly, when the address indicated by the address signal indicates one of the addresses ADR-C ("1100") to ADR-F ("1111") at which the ECC is stored, the ADR range limiting circuit 126 modifies the address to the address determined in advance among the addresses ADR-0 ("0000") to ADR-B ("1011") at which the data is stored.

As explained above, in Embodiment 7, the address as the second address is generated by shifting, to the lower direction by the offset bit number, the bits except the bits of the prescribed offset bit number from the lower order of the first address (corresponding to the N-bit address), and at the same time, by modifying the offset bits of the offset bit number (corresponding to M bit) from the higher order, to the set-up offset value.

According to this, it is clear that the completely same effect as in Embodiment 2 to Embodiment 6 is obtained. Accordingly, the detailed explanation thereof is omitted. According to Embodiment 7, it is possible to reduce the area of the address which is not used in the internal memory 14.

In Embodiment 7, when the first address specified by the bus master is included in the range determined in advance as the range which the second address can take, the ADR range limiting circuit 126 modifies the address specified by the bus master to the address determined in advance as the address which the first address can take.

Accordingly, even if the bus master specifies the address to store the ECC and the write of data is ready, as in the configuration according to Embodiment 7, it is possible to prevent the bus master from writing the data other than the ECC at the address at which the ECC is to be stored.

Embodiment 8

Next, the configuration and the operation of Embodiment 8 are explained with reference to drawings. The configuration and the operation of the CPU system 1 according to Embodiment 8 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 8 are fundamentally the same as the configuration and the operation of the I/F conversion circuit 13 according to Embodiment 6 as illustrated in FIG. 32. However, in the I/F conversion circuit 13 according to Embodiment 8, the configuration and the operation of a part of the ADR shift & offset setting circuit 125 included in the ADR conversion circuit 120 is different from the configuration and the operation of the ADR shift & offset setting circuit 125 according to Embodiment 6.

In Embodiment 8, it is possible to switch an ECC mode to either of two ECC modes. In a first ECC mode, the bus master performs the write and read of the 8-bit data to the internal memory 14, and the 5-bit ECC is generated to the 8-bit data and stored in the internal memory 14. In a second ECC mode, the bus master performs the write and read of the 32-bit data to the internal memory 14, and the 7-bit ECC is generated to the 32-bit data and stored in the internal memory 14.

The ADR shift & offset setting circuit 125 according to Embodiment 8 can switch the operation to either the operation as the ADR rotation circuit 123 according to Embodiment 5 illustrated in FIG. 29, or the operation as the ADR shift & offset setting circuit 125 according to Embodiment 6 illustrated in FIG. 33

That is, the ADR conversion circuit 120 according to Embodiment 8 can switch the operation to either "ADR rotation" or "ADR shift & offset setup", according to the set-up ECC mode.

Figure 40:
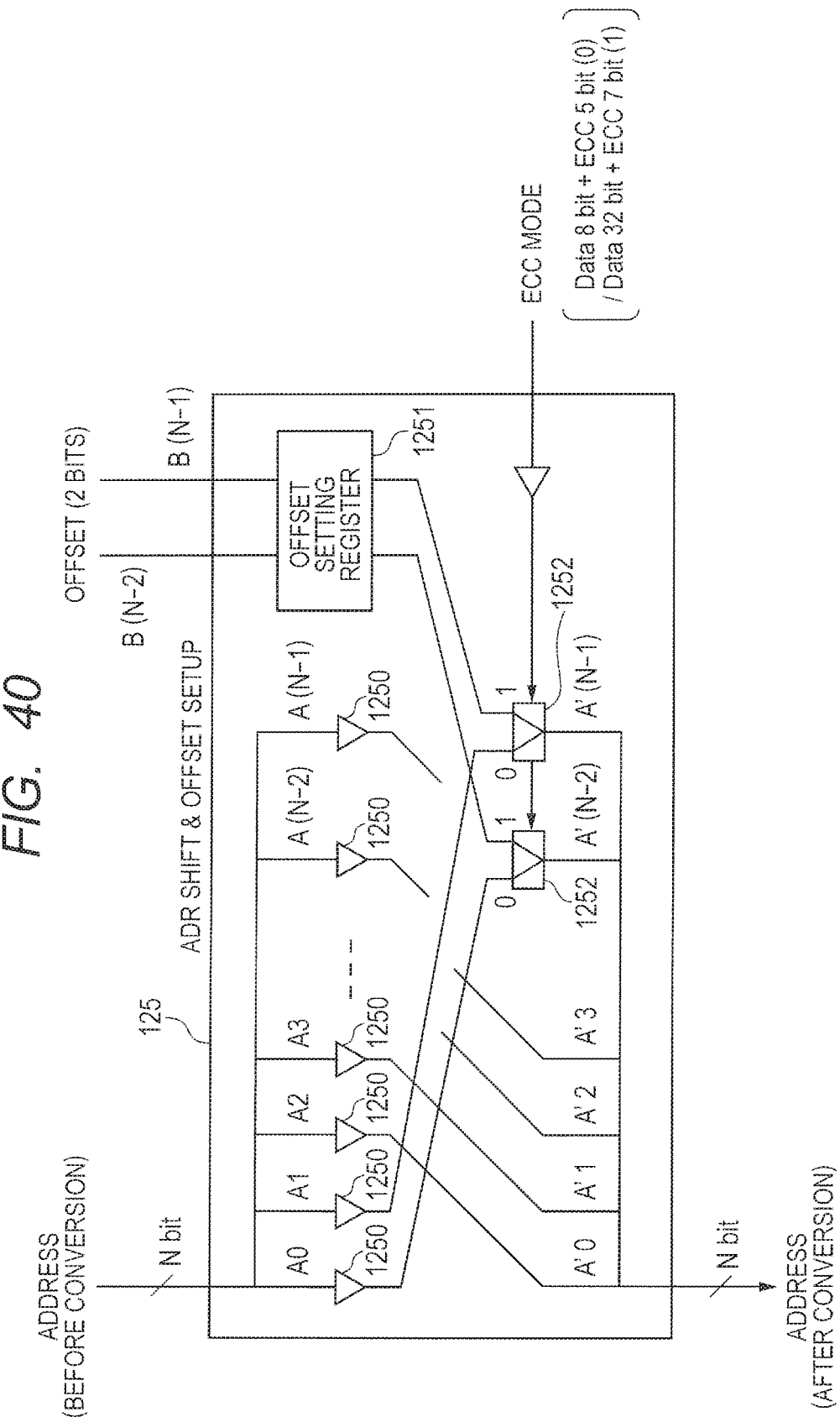
FIG. 40 is a block diagram illustrating the configuration of an ADR shift & offset setting circuit according to Embodiment 8.

Next, with reference to FIG. 40, the configuration of the ADR shift & offset setting circuit 125 according to Embodiment 8 is explained.

As illustrated in FIG. 40, the ADR shift & offset setting circuit 125 according to Embodiment 8 further includes selectors 1252 as many as the number of bits of the offset signal, as compared with the ADR shift & offset setting circuit 125 according to Embodiment 6. The explanation is made for an example in which the address signal is N bits and the offset signal is M bits (M=2).

Each of the lower-order M bits A0 and A1 of the address signal inputted into the ADR shift & offset setting circuit 125 is inputted into each of two selectors 1252. Each of the offset signals B(N−2) and B(N−1) indicating the 2-bit offset value stored in the offset setting register 1251 is inputted into each of two selectors 1252.

Each of the selectors 1252 selects either each of the lower-order M bits A0 and A1 of the address signal which are inputted from the bus master or each of the offset signals B(N−2) and B(N−1) which are inputted from the offset setting register 1251, and outputs the selected signals as the higher order M bits A'(N−2) and A'(N−1) of the address signal to be outputted from the ADR shift & offset setting circuit 125.

The ECC mode signal to specify the ECC mode is inputted into each of the selectors 1252. Each of the selectors 1252 selects each of the lower-order M bits A0 and A1 of the address signal, when the ECC mode signal ("0") to specify the first ECC mode is inputted. On the other hand, each of the selectors 1252 selects each of the offset signal B(N−2) and B(N−1), when the ECC mode signal ("1") to specify the second ECC mode is inputted.

Each of the higher order (N−M) bits A2, . . . , A(N−1) of the address signal inputted into the ADR shift & offset setting circuit 125 is set respectively as the lower order (N−M) bits A'0, A'1, . . . , A'(N−3) of the address signal to be outputted from the ADR shift & offset setting circuit 125. That is, this operation is the same as the operation of the ADR rotation circuit 123 according to Embodiment 5 illustrated in FIG. 29, and the operation of the ADR shift & offset setting circuit 125 according to Embodiment 6 illustrated in FIG. 33. Also in the ADR shift & offset setting circuit 125, the signal of each bit of the N-bit address signal lines A0 to A(N−1) is utilized after having been received by each of the N buffers 1250.

As explained above, in Embodiment 8, when the first mode is specified, the ADR shift & offset setting circuit 125 generates the address as the second address, by shifting all bits other than at least one bit of the first address (corresponding to the (N+1)-bit address) to the lower direction by the prescribed offset bit number. When the second mode is specified, the ADR shift & offset setting circuit 125 generates the address as the second address, by shifting the bits excluding the bits of the offset bit number from the lower order among the bits other than at least one bit of the first address to the lower direction by the offset bit number, and by modifying the offset bits of the offset bit number (corresponding to M bit) from the higher order, to the set-up offset value.

According to this, in the first ECC mode, it is clear that the completely same effect as Embodiment 5 is obtained selectively. Accordingly, the detailed explanation thereof is omitted. Also in the second ECC mode, it is clear that the completely same effect as Embodiment 6 is obtained selectively. Accordingly, the detailed explanation thereof is omitted.

Embodiment 9

Next, the configuration and the operation of Embodiment 9 are explained with reference to drawings. The configuration and the operation of the CPU system 1 according to Embodiment 9 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 9 are fundamentally the same as the configuration and the operation of the I/F conversion circuit 13 according to Embodiment 6 as illustrated in FIG. 32. However, in the I/F conversion circuit 13 according to Embodiment 9, the configuration and the operation of a part of the ADR conversion circuit 120 is different from the configuration and the operation of the ADR conversion circuit 120 according to Embodiment 6.

Figure 41:
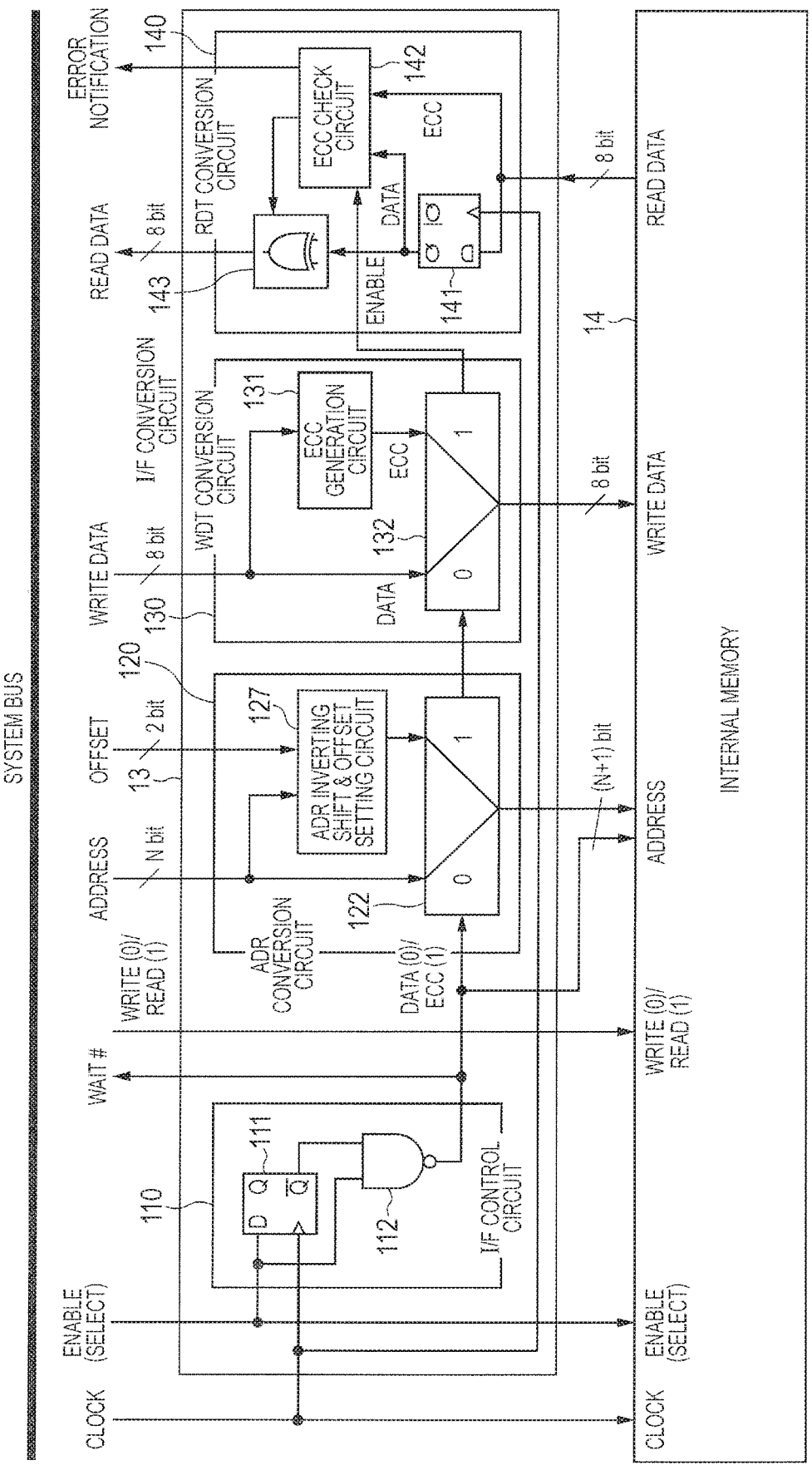
FIG. 41 is a block diagram illustrating the configuration of an I/F conversion circuit according to Embodiment 9.

Next, with reference to FIG. 41, the configuration of the I/F conversion circuit 13 according to Embodiment 9 is explained. As compared with the I/F conversion circuit 13 according to Embodiment 6, the I/F conversion circuit 13 according to Embodiment 9 includes an ADR inverting shift & offset setting circuit 127 in lieu of the ADR shift & offset setting circuit 125 in the ADR conversion circuit 120. The configuration and the operation of the I/F control circuit 110, the WDT conversion circuit 130, and the RDT conversion circuit 140 according to Embodiment 9 are the same as the configuration and the operation of the counterparts according to Embodiment 6.

In Embodiment 9, it is possible to switch an ECC mode to either of two ECC modes. In a first ECC mode, the bus master performs the write and read of the 8-bit data to the internal memory 14, and the 5-bit ECC is generated to the 8-bit data and stored in the internal memory 14. In a second ECC mode, the bus master performs the write and read of the 32-bit data to the internal memory 14, and the 7-bit ECC is generated to the 32-bit data and stored in the internal memory 14.

The ADR inverting shift & offset setting circuit 127 according to Embodiment 9 can switch the operation to either the operation as the ADR inverting circuit 121 according to Embodiment 1 illustrated in FIG. 3, or the operation to output the address signal to the selector 122, after inverting the value of the bit except the bit of the predetermined number of bits from the lower order of the inputted address signal, shifting to the lower order by the predetermined number of bits, and setting the offset value indicated by the offset signal to the bits of the predetermined number of bits from higher order. Accordingly, in Embodiment 9, the selector 122 selects one of the address signal outputted from the bus master and the address signal outputted from the ADR inverting shift & offset setting circuit 127, and outputs the selected address signal to the internal memory 14.

That is, the ADR conversion circuit 120 according to Embodiment 9 can switch the operation to either "ADR inversion" or "ADR inverting shift & offset setup", according to the set-up ECC mode.

Figure 42:
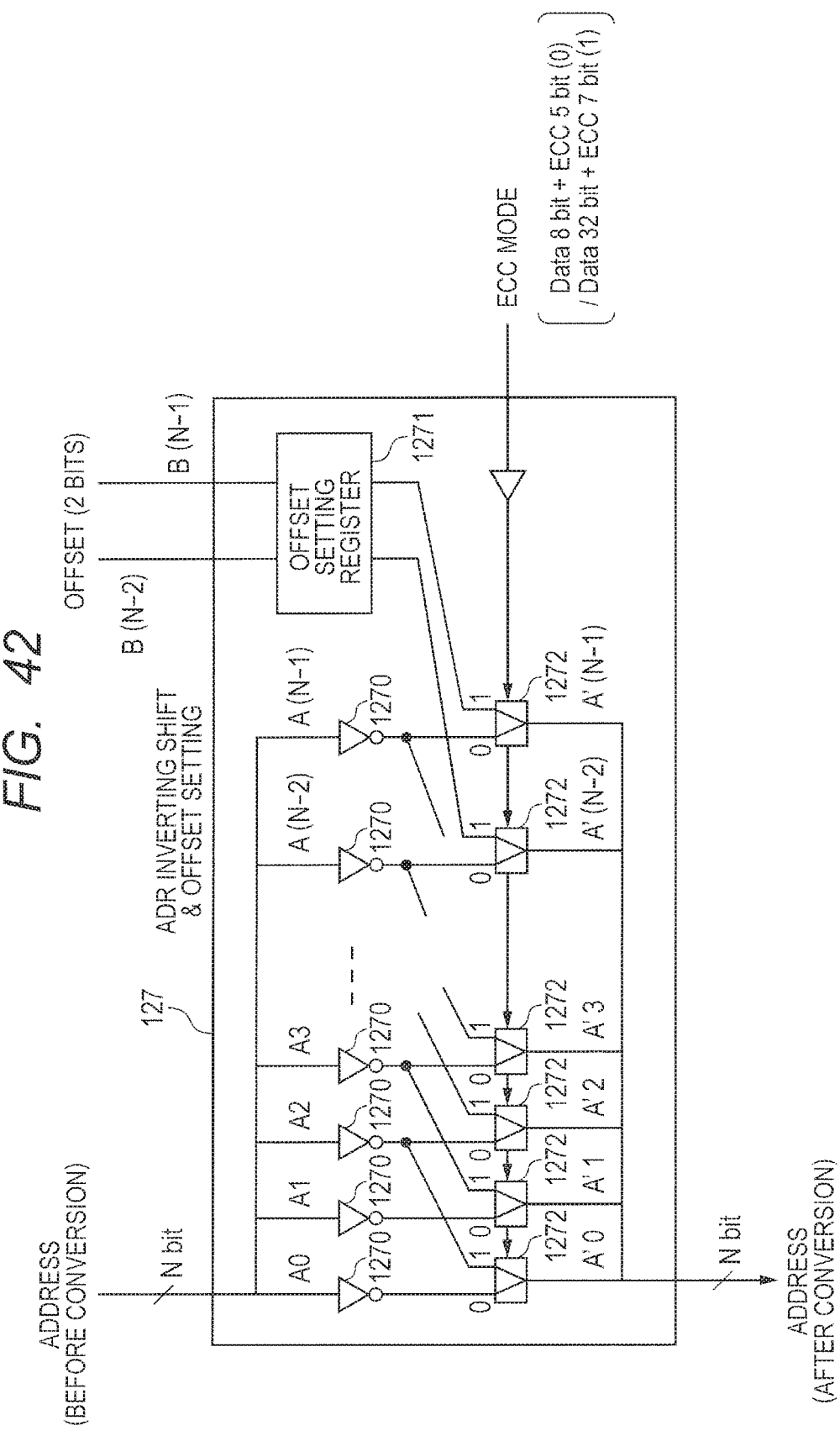
FIG. 42 is a block diagram illustrating the configuration of an ADR inverting shift & offset setting circuit according to Embodiment 9.

Next, with reference to FIG. 42, the configuration of the ADR inverting shift & offset setting circuit 127 according to Embodiment 9 is explained.

As illustrated in FIG. 42, the ADR inverting shift & offset setting circuit 127 includes N pieces of bit value inverting circuits 1270, an offset setting register 1271, and N pieces of selectors 1272. The explanation is made for an example in which the address signal is N bits and the offset signal is M bits (M=2).

Each of N pieces of the bit value inverting circuits 1270 corresponds to each of bits A0, A1, A2, . . . , and A (N−1) of the N-bit address signal. Each of N pieces of the bit value inverting circuits 1270 inverts the value of the corresponding bit of the address signal, and outputs the inverted value. The bit value inverting circuit 1270 is a NOT circuit, for example.

Here, each of the inverted values of N bits A0, A1, . . . , A (N−2), and A (N−1) of the address signal is inputted to each of N pieces of the selectors 1272 which output N bits A'0, A'1, . . . , A'(N−2), and A'(N−1) of the address signal. Each of the inverted values of the higher order (N−M) bits A2, A3, . . . , A (N−2), and A (N−1) of the address signal is inputted to each of (N−M) pieces of the selectors 1272 which output the lower order (N−M) bits A'0, A'1, . . . , A'(N−4), and A'(N−3) of the address signal.

An M-bit offset signal is fetched to the offset setting register 1271 as an offset value. Each of the M-bit offset values stored in the offset setting register 1271 is inputted into each of the M pieces of the selectors 1272 which output the higher order M bits A'(N−2) and A'(N−1) of the address signal.

Each of (N−M) pieces of the selectors 1272 which outputs each of the lower order (N−M) bits A'0, A'1, . . . , A'(N−4), and A'(N−3) of the address signal selects and outputs either each of the inverted values of the lower order (N−M) bits A0, A1, . . . , A(N−4), and A(N−3) of the address signal, or each of the inverted values of the higher order (N−M) bits A2, A3, . . . , A(N−2), and A(N−1) of the address signal.

The ECC mode signal to specify the ECC mode is inputted into each of the selectors 1272. When the ECC mode signal ("0") to specify the first ECC mode is inputted, each of (N−M) pieces of the selectors 1272 selects each of the inverted values of the lower order (N−M) bits A0, A1, . . . , A(N−4), and A(N−3) of the address signal. When the ECC mode signal ("1") to specify the second ECC mode is inputted on the other hand, each of (N−M) pieces of the selectors 1272 selects each of the inverted values of the higher order (N−M) bits A2, A3, . . . , A(N−2), and A(N−1) of the address signal.

Each of the M selectors 1272 which output each of the higher order M bits A'(N−2) and A'(N−1) of the address signal selects and outputs either each of the inverted values of the higher order M bits A(N−2) and A(N−1) of the address signal, or each of the offset values B(N−2) and B(N−1).

When the ECC mode signal ("0") to specify the first ECC mode is inputted, each of the M selectors 1272 selects each of the inverted values of the higher order M bits A(N−2) and A(N−1) of the address signal. When the ECC mode signal ("1") to specify the second ECC mode is inputted on the other hand, each of the M selectors 1272 selects each of the offset values B(N−2) and B(N−1).

As explained above, in Embodiment 9, when the first mode is specified, the ADR inverting shift & offset setting circuit 127 generates the address as the second address, by inverting all the values of bits other than at least one bit of the first address (corresponding to N+1 bit). When the second mode is specified, the ADR inverting shift & offset setting circuit 127 generates the address as the second address, by inverting the value of bits other than at least one bit of the first address, by shifting the bits except the bits of the prescribed offset bit number from the lower order to the lower-order direction by the offset bit number, and by modifying the offset bits of the offset bit number (corresponding to M bit) from the higher order, to the set-up offset value.

According to this, in the first ECC mode, it is clear that the completely same effect as in Embodiment 1 is obtained selectively. Accordingly, the detailed explanation thereof is omitted. Also in the second ECC mode, it is clear that the completely same effect as in Embodiment 6 is obtained selectively. Accordingly, the detailed explanation thereof is omitted.

Embodiment 10

Next, the configuration and the operation of Embodiment 10 are explained with reference to drawings. The configuration and the operation of the CPU system 1 according to Embodiment 10 are fundamentally the same as the configuration and the operation of the CPU system 1 according to Embodiment 1 as illustrated in FIG. 1. Accordingly, the explanation thereof is omitted. The configuration and the operation of the I/F conversion circuit 13 according to Embodiment 10 are fundamentally the same as the configuration and the operation of the I/F conversion circuit 13 according to Embodiment 6 as illustrated in FIG. 32. However, in the I/F conversion circuit 13 according to Embodiment 10, the configuration and the operation of a part of the ADR shift & offset setting circuit 125 included in the ADR conversion circuit 120 is different from the configuration and the operation of the ADR shift & offset setting circuit 125 according to Embodiment 6.

In Embodiment 10, it is possible to switch an ECC mode to either of two ECC modes. In a first ECC mode, the bus master performs the write and read of the 8-bit data to the internal memory 14, and the 5-bit ECC is generated to the 8-bit data and stored in the internal memory 14. In a second ECC mode, the bus master performs the write and read of the 32-bit data to the internal memory 14, and the 7-bit ECC is generated to the 32-bit data and stored in the internal memory 14.

The ADR shift & offset setting circuit 125 according to Embodiment 10 can switch the operation to either the operation as the ADR inverting circuit 121 according to Embodiment 1 illustrated in FIG. 3, or the operation as the ADR shift & offset setting circuit 125 according to Embodiment 6 illustrated in FIG. 33.

That is, the ADR conversion circuit 120 according to Embodiment 10 can switch the operation to either "ADR inversion" or "ADR shift & offset setup", according to the set-up ECC mode.

Figure 43:
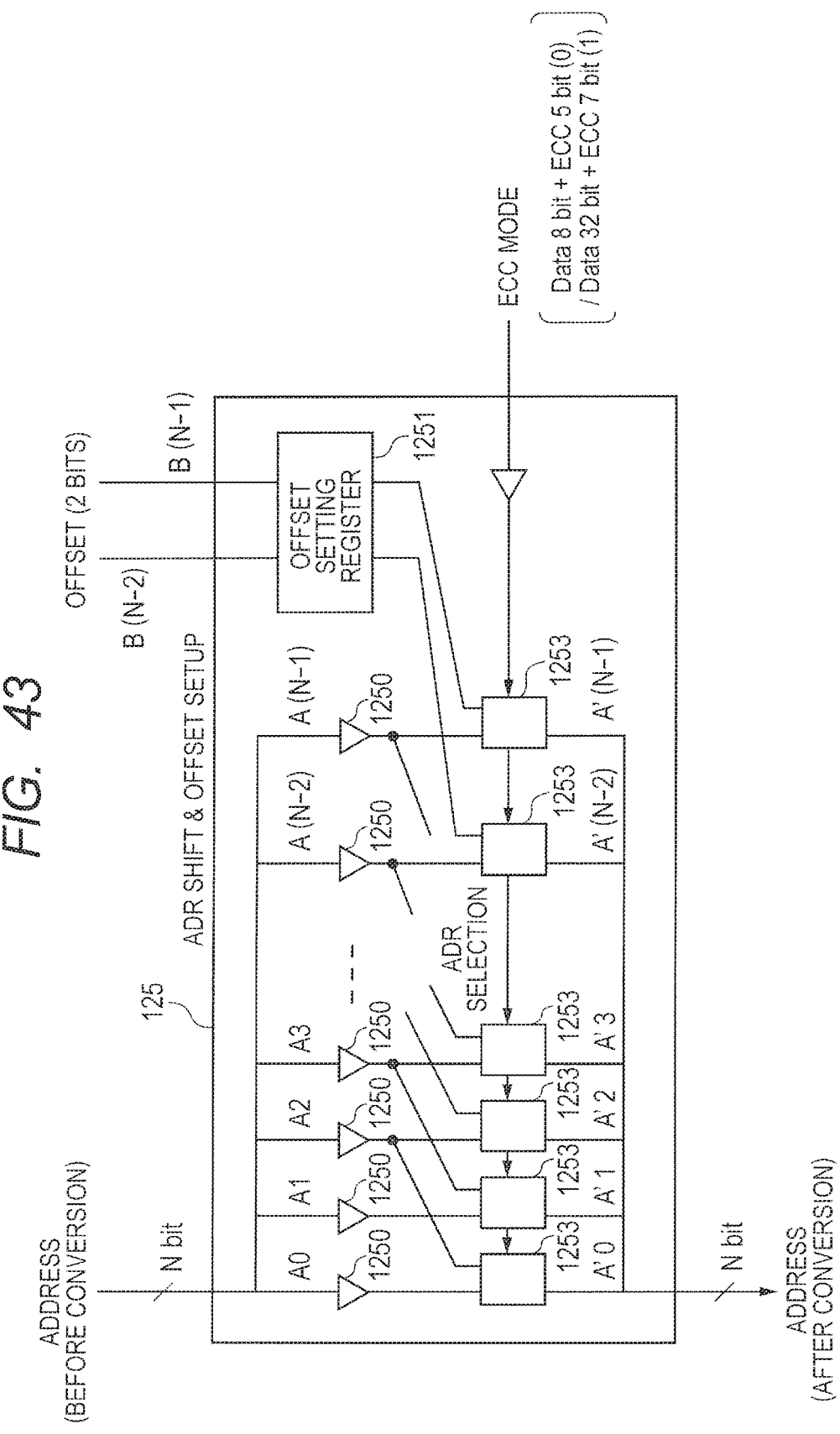
FIG. 43 is a block diagram illustrating the configuration of an ADR shift & offset setting circuit according to Embodiment 10.

Next, with reference to FIG. 43, the configuration of the ADR shift & offset setting circuit 125 according to Embodiment 10 is explained.

As illustrated in FIG. 43, the ADR shift & offset setting circuit 125 according to Embodiment 10 further includes N pieces of ADR selection circuits 1253, as compared with the ADR shift & offset setting circuit 125 according to Embodiment 6. The explanation is made for an example in which the address signal is N bits and the offset signal is M bits (M=2).

Each of values of N bits A0, A1, . . . , A(N−2), A(N−1) of the address signal is inputted to each of N pieces of the ADR selection circuits 1253 which output N bits A'0, A'1, . . . , A'(N−2), and A'(N−1) of the address signal, via the buffer 1250. Each of the values of the higher order (N−M) bits A2, A3, . . . , A(N−2), and A(N−1) of the address signal is inputted to each of (N−M) pieces of the ADR selection circuits 1253 which output the lower order (N−M) bits A'0, A'1, . . . , A'(N−4), and A'(N−3) of the address signal, via the buffer 1250.

An M-bit offset signal is fetched to the offset setting register 1251 as an offset value. The M-bit offset values B(N−2) and B(N−1) stored in the offset setting register 1251 are inputted into each of the M pieces of the ADR selection circuits 1253 which output each of the higher order M bits A'(N−2) and MA'(N−1) of the address signal.

Each of (N−M) pieces of the ADR selection circuits 1253 which outputs each of the lower order (N−M) bits A'0, A'1, . . . , A'(N−4), and A'(N−3) of the address signal selects and outputs either each of the inverted values of the lower order (N−M) bits A0, A1, . . . , A(N−4), and A(N−3) of the address signal, or each of the values of the higher order (N−M) bits A2, A3, . . . , A(N−2), and A(N−1) of the address signal.

The ECC mode signal to specify the ECC mode is inputted into each of the ADR selection circuits 1253. When the ECC mode signal ("0") to specify the first ECC mode is inputted, each of (N−M) pieces of the ADR selection circuits 1253 selects each of the values of the lower order (N−M) bits A0, A1, . . . , A(N−4), and A(N−3) of the address signal, and outputs the inverted value of the selected value. The value selected here is described later as "the first value." When the ECC mode signal ("1") to specify the second ECC mode is inputted on the other hand, each of (N−M) pieces of the ADR selection circuits 1253 selects and outputs each of the values of the higher order (N−M) bits A2, A3, . . . , A(N−2), and A(N−1) of the address signal. The value selected here is described later as "the second value."

Each of M pieces of the ADR selection circuits 1253 which output each of the higher order M bits A'(N−2) and A'(N−1) of the address signal selects and outputs either each of the inverted values of the higher order M bits A(N−2) and A(N−1) of the address signal, or each of the offset values B(N−2) and B(N−1).

When the ECC mode signal ("0") to specify the first ECC mode is inputted, each of M pieces of the ADR selection circuits 1253 selects each of the values of the higher order M bits A(N−2) and A(N−1) of the address signal, and outputs the inverted value of the selected value. The value selected here is described later as "the first value." When the ECC mode signal ("1") to specify the second ECC mode is inputted on the other hand, each of M pieces of the ADR selection circuits 1253 selects and outputs each of the offset values B(N−2) and B(N−1). The value selected here is described later as "the second value."

Figure 44:
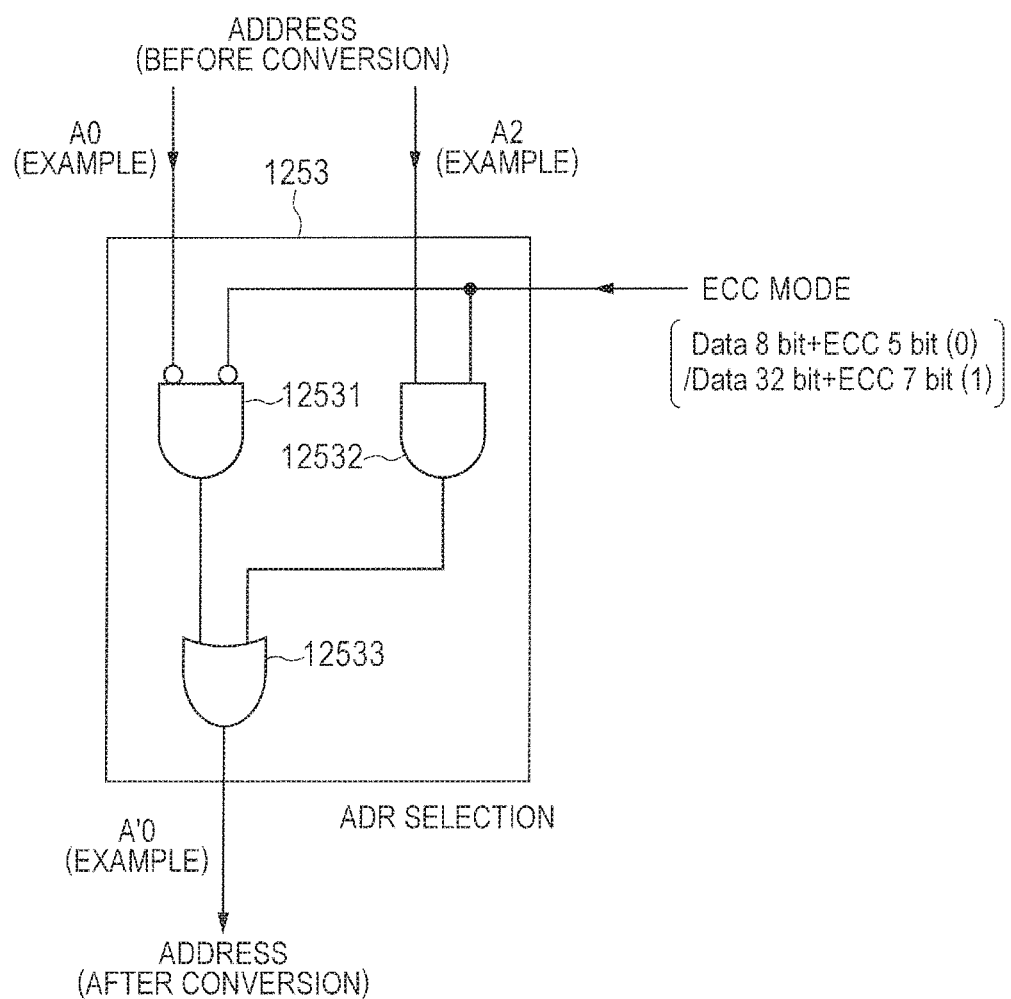
FIG. 44 is a block diagram illustrating the configuration of the ADR selection circuit according to Embodiment 10.

Next, with reference to FIG. 44, the configuration of the ADR selection circuits 1253 according to Embodiment 10 is explained.

As illustrated in FIG. 44, the ADR selection circuit 1253 includes an NOR circuit 12531, an AND circuit 12532, and an OR circuit 12533.

The NOR circuit 12531 outputs, to the OR circuit 12533, the signal as the arithmetic result of the NOR (negative logical addition) of the first value and the value of the ECC mode signal. The AND circuit 12532 outputs, to the OR circuit 12533, the signal as the arithmetic result of the AND (logical product) of the second value and the value of the ECC mode signal. The OR circuit 12533 outputs the signal as the arithmetic result of the OR (logical addition) of the signal inputted from the NOR circuit 12531 and the signal inputted from the AND circuit 12532.

As explained above, in Embodiment 10, when the first mode is specified, the ADR shift & offset setting circuit 125 generates the address as the second address by inverting all the values of bits other than at least one bit of the first address (corresponding to N+1 bits). When the second mode is specified, the ADR shift & offset setting circuit 125 generates the address as the second address, by shifting the bits excluding the bits of the prescribed offset bit number from the lower order among the bits other than at least one bit of the first address to the lower direction by the offset bit number, and, by modifying the offset bits of the offset bit number (corresponding to M bit) from the higher order, to the set-up offset value.

Accordingly, in the first ECC mode, it is clear that the completely same effect as in Embodiment 1 is obtained selectively. Therefore, the detailed explanation thereof is omitted. Also in the second ECC mode, it is clear that the completely same effect as in Embodiment 6 is obtained selectively. Therefore, the detailed explanation thereof is omitted.

Embodiment 11

Figure 45:
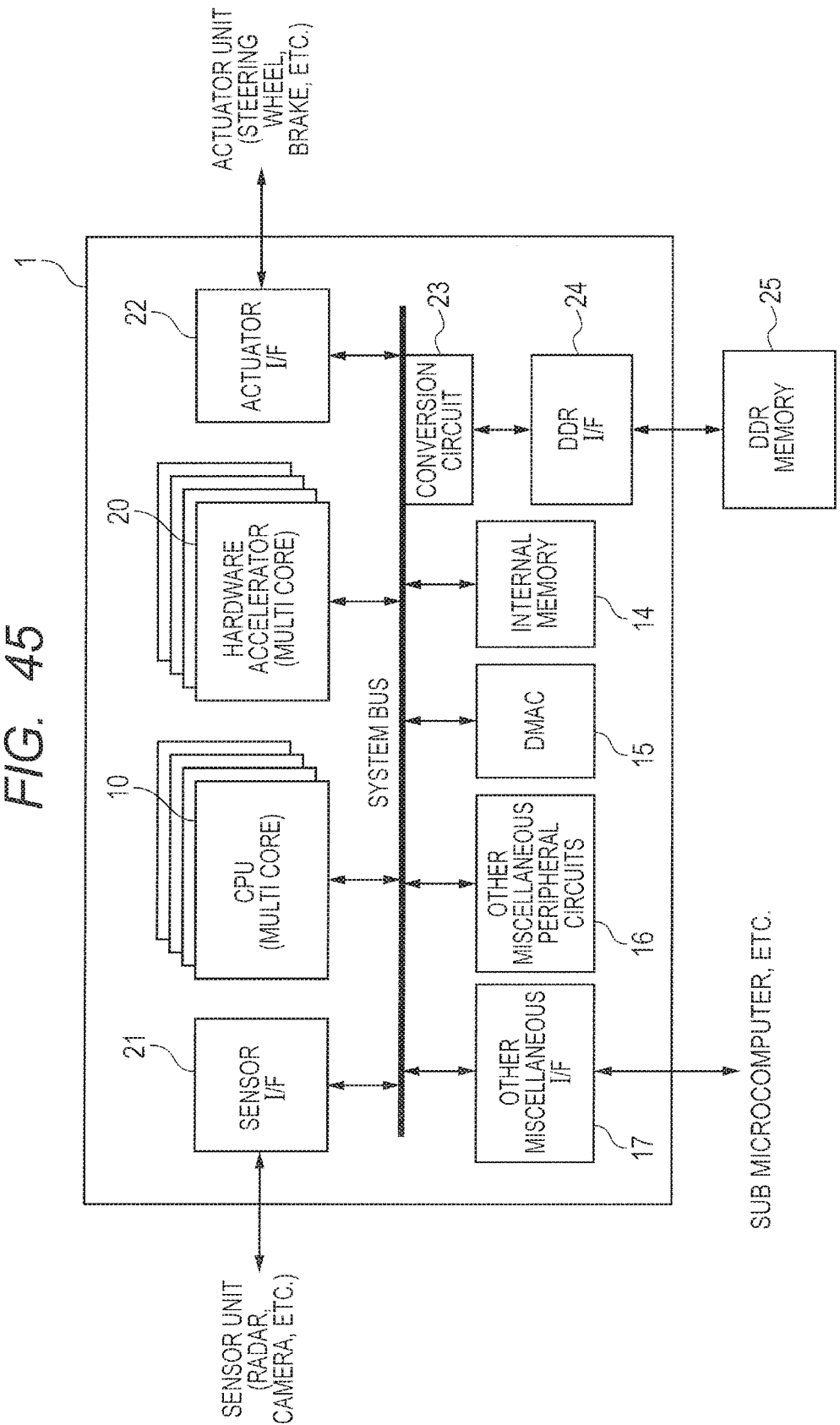
FIG. 45 is a block diagram illustrating the configuration of a CPU system according to Embodiment 11.

Next, the configuration and the operation of Embodiment 11 are explained with reference to drawings. With reference to FIG. 45, the configuration of the CPU system 1 according to Embodiment 11 is explained. As illustrated in FIG. 45, comparison with the CPU system 1 according to Embodiment 1 illustrated in FIG. 1 shows that the CPU system 1 according to Embodiment 11 does not includes the control input I/F 11, the command output I/F 12, and the I/F conversion circuit 13, but includes a hardware accelerator 20, a sensor I/F 21, an actuator I/F 22, a conversion circuit 23, a DDR I/F 24, and a DDR memory 25.

In Embodiment 11, a vehicle is provided with a sensor unit as an input unit. The sensor unit observes the circumference of the vehicle and sends the sensor data indicating the observation result to the CPU system 1 as input data. The sensor unit is a radar or a camera, for example.

The vehicle is provided with an actuator unit controlled by the CPU system 1, as a control unit. The control unit is a steering or a brake, for example.

In the CPU system 1 according to Embodiment 11, the CPU 10 has a multi-core structure. The CPU 10 generates control data based on the sensor data from the sensor unit. For example, when the control data is for the steering, the CPU 10 generates the control data which instructs modification of an steering angle of the steering as the control contents. For example, when the control data is for the brake, the CPU 10 generates the control data which instructs adjustment of a brake oil pressure as the control contents.

The hardware accelerator 20 is the hardware of multi-core structure and executes processing of the CPU 10 supplementarily. The hardware accelerator 20 is a GPU (Graphics Processing Unit) or a DSP (Digital Signal Processor), for example.

The sensor I/F 21 is an interface circuit which couples the sensor unit to the system bus. That is, the sensor data from the sensor unit is inputted into the sensor I/F 21. The actuator I/F 22 is an interface circuit which couples the actuator unit to the system bus. That is, the actuator I/F 22 outputs the command for controlling the actuator unit to the actuator unit.

The conversion circuit 23 is an interface circuit which couples the DDR I/F 24 to the system bus. As described later, as is the case with the I/F conversion circuit 13 according to Embodiments 1 to 10, the conversion circuit 23 executes the processing for detecting the fault of a data signal system and an address signal system, when each bus master (the CPU 10, the DMAC 15, and the hardware accelerator 20) accesses (writes data into or reads data from) the DDR memory 25 through the aid of the DDR I/F 24 via the system bus.

More specifically, when writing the data into the DDR memory 25, the conversion circuit 23 also writes the ECC generated from the data into the DDR memory 25. When reading the data from the DDR memory 25, the conversion circuit 23 generates the ECC from the read data, and compares the generated ECC with the ECC written into the DDR memory 25 with the data, and accordingly detects a fault. Also in Embodiment 11, it is possible to detect not only the fault of the data signal system but also the fault of the address signal system, by generating the address to store the ECC from the address to store the data.

The DDR I/F 24 executes the read of data from the DDR memory 25 or the write of data into the DDR memory 25, according to the packet inputted from the bus master via the conversion circuit 23. That is, in Embodiment 11, the bus master executes the write of data by outputting the data indicating the write address and the data indicating the write data to the conversion circuit 23 in the form of a packet. The bus master executes the read of data by outputting the data indicating the read address to the conversion circuit 23 in the form of a packet.

The DDR memory 25 is a storage circuit to store various kinds of data. That is, the DDR memory 25 stores, for example, the above-described sensor data, the control data (command), and the ECC.

Figure 46:
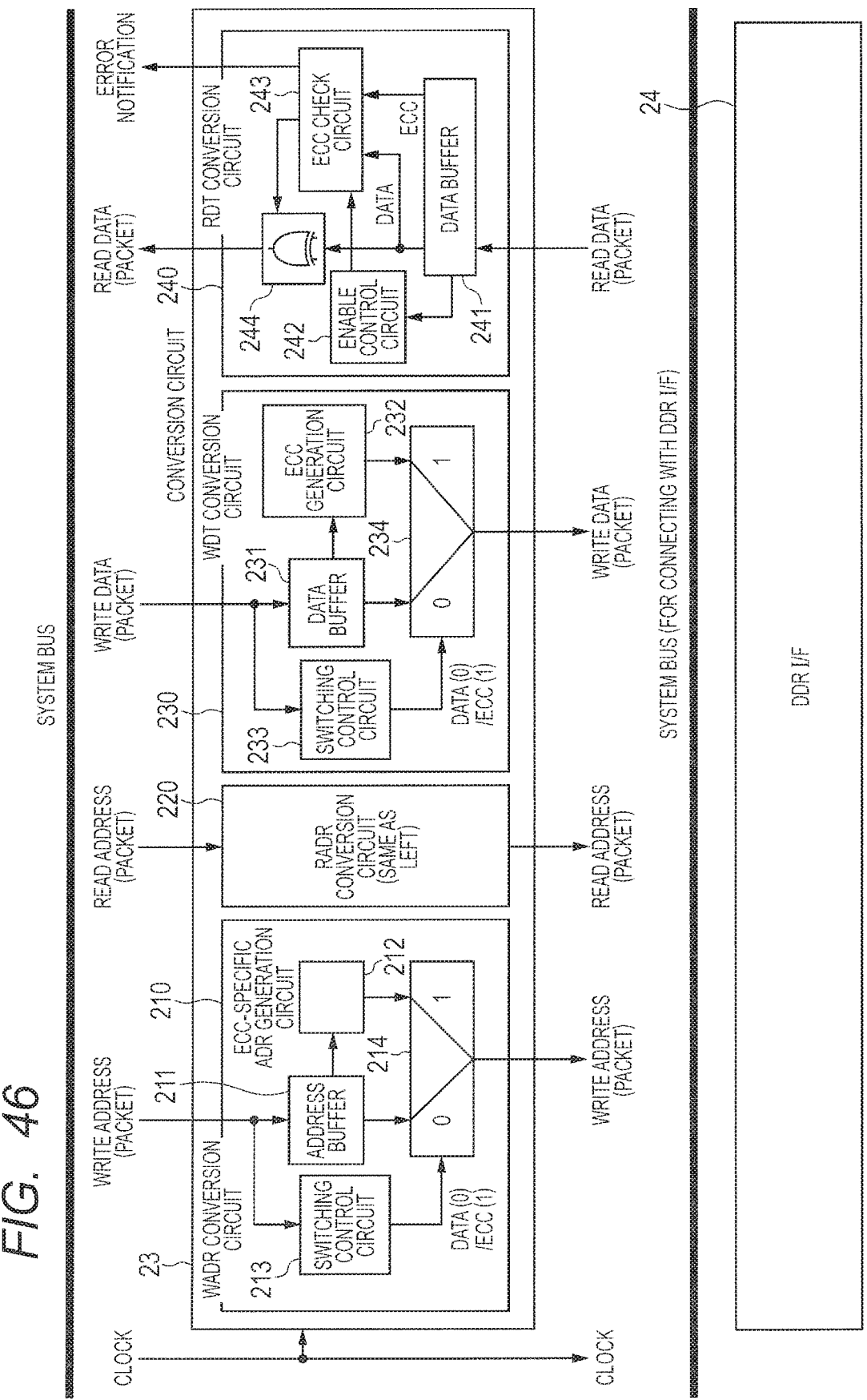
FIG. 46 is a block diagram illustrating the configuration of a conversion circuit according to Embodiment 11.

Next, with reference to FIG. 46, the configuration of conversion circuit 23 according to Embodiment 11 is explained. As illustrated in FIG. 46, the conversion circuit 23 includes a WADR conversion circuit 210, an RADR conversion circuit 220, a WDT conversion circuit 230, and an RDT conversion circuit 240. Here, "WADR" indicates a write address and "RADR" indicates a read address. "WDT" and "RDT" are as explained in Embodiment 1.

The bus master outputs a packet indicating a write address, a packet indicating a read address, and a packet indicating write data to the conversion circuit 23 via the system bus. The conversion circuit 23 outputs a packet indicating the read data and an error notification signal to the bus master via the system bus. The conversion circuit 23 operates based on a clock signal inputted from a clock generating circuit (not shown).

When writing the data into the DDR memory 25, the bus master outputs, to the conversion circuit 23, a packet indicating the write address serving as the address at which the data is written, and a packet indicating the write data serving as the data to be written. In response to this, the conversion circuit 23 outputs these packets to the DDR I/F 24, and in addition, a packet indicating the ECC address serving as the address at which the ECC corresponding to the write data is written and a packet indicating the ECC to be written into the DDR memory 25.

The DDR I/F 24 writes the write data indicated by the packet from the conversion circuit 23, at the write address of the DDR memory 25, indicated by the packet from the conversion circuit 23. The DDR I/F 24 writes also the ECC indicated by the packet from the conversion circuit 23, at the ECC address of the DDR memory 25, indicated by the packet from the conversion circuit 23.

When reading the data from the DDR memory 25, the bus master outputs, to the conversion circuit 23, a packet indicating the read address serving as the address from which the data is read. In response to this, the conversion circuit 23 outputs the packet to the DDR I/F 24, and in addition, a packet indicating the ECC address serving as the address from which the ECC corresponding to the read data as the data to be read is read.

The DDR I/F 24 reads the read data from the read address of the DDR memory 25, indicated by the packet from the conversion circuit 23, and outputs a packet indicating the read data read, to the conversion circuit 23. The DDR I/F 24 reads also the ECC from the ECC address of the DDR memory 25, indicated by the packet from the conversion circuit 23, and outputs a packet indicating the ECC read, to the conversion circuit 23.

Then, when the error of the data is detected by the check by use of the read data indicated by the packet from the DDR I/F 24 and the ECC indicated by the packet from the DDR I/F 24, the conversion circuit 23 outputs an error notification signal notifying the error to the bus master.

As illustrated in FIG. 46, the WADR conversion circuit 210 includes an address buffer 211, an ECC-specific ADR generation circuit 212, a switching control circuit 213, and a selector 214.

The address buffer 211 is a memory which outputs the packet indicating the write address from the bus master to the selector 214 and subsequently holds the packet temporarily.

The ECC-specific ADR generation circuit 212 generates a packet indicating the ECC address, based on the write address indicated by the packet stored in the address buffer 211. The operation to generate the ECC address from the write address is the same as that of the ADR inverting circuit 121 according to Embodiment 1. Accordingly, the detailed explanation thereof is omitted. The ECC-specific ADR generation circuit 212 outputs the generated packet to the selector 214. Note however that in Embodiment 11, the ECC-specific ADR generation circuit 212 switches the value of the highest-order bit of the address signal which is switched by the wait #signal in Embodiment 1.

While the packet indicating the write address is outputted from the address buffer 211 to the selector 214, the switching control circuit 213 instructs the selector 214 to select the packet. More specifically, the switching control circuit 213 outputs the data/ECC signal ("0") to the selector 214. After the completion of the output of the packet indicating the write address from the address buffer 211 to the selector 214, while the packet indicating the ECC address is outputted from the ECC-specific ADR generation circuit 212 to the selector 214, the switching control circuit 213 instructs the selector 214 to select the packet. More specifically, the switching control circuit 213 outputs the data/ECC signal ("1") to the selector 214.

When the data/ECC signal ("0") is inputted from the switching control circuit 213, the selector 214 selects the packet inputted from the address buffer 211, and outputs the selected packet to the DDR I/F 24. When the data/ECC signal ("1") is inputted from the switching control circuit 213 on the other hand, the selector 214 selects the packet inputted from the ECC-specific ADR generation circuit 212, and outputs the selected packet to the DDR I/F 24.

The configuration and the operation of the RADR conversion circuit 220 are the same as the configuration and the operation of the WADR conversion circuit 210. Accordingly, the explanation thereof is omitted.

As illustrated in FIG. 46, the WDT conversion circuit 230 includes a data buffer 231, an ECC generation circuit 232, a switching control circuit 233, and a selector 234.

The data buffer 231 is a memory which outputs the packet indicating the write data from the bus master to the selector 234 and subsequently holds the packet temporarily.

The ECC generation circuit 232 generates a packet indicating the ECC based on the write data indicated by the packet stored in the data buffer 231. The operation to generate the ECC from the write data is the same as that of the ECC generation circuit 131 according to Embodiment 1. Accordingly, the detailed explanation thereof is omitted. The ECC generation circuit 232 outputs the generated packet to the selector 234.

While the packet indicating the write data is outputted from the data buffer 231 to the selector 234, the switching control circuit 233 instructs the selector 234 to select the packet. More specifically, the switching control circuit 233 outputs the data/ECC signal ("0") to the selector 234. After the completion of the output of the packet indicating the write data from the data buffer 231 to the selector 234, while the packet indicating the ECC address is outputted from the ECC generation circuit 232 to the selector 234, the switching control circuit 233 instructs the selector 234 to select the packet. More specifically, the switching control circuit 233 outputs the data/ECC signal ("1") to the selector 234.

When the data/ECC signal ("0") is inputted from the switching control circuit 233, the selector 234 selects the packet inputted from the data buffer 231, and outputs the selected packet to the DDR I/F 24. When the data/ECC signal ("1") is inputted from the switching control circuit 233 on the other hand, the selector 234 selects the packet inputted from the ECC generation circuit 232, and outputs the selected packet to the DDR I/F 24.

The RDT conversion circuit 240 includes a data buffer 241, an enable control circuit 242, an ECC check circuit 243, and an error correction circuit 244.

The data buffer 241 is a memory which outputs the packet indicating the read data from the DDR I/F 24 to the ECC check circuit 243 and the error correction circuit 244, and subsequently stores the packet temporarily. The data buffer 241 stores the packet indicating the ECC from the DDR I/F 24.

When the packet indicating the ECC is stored in the data buffer 241, the enable control circuit 242 outputs an enable signal for determining whether the error of the data indicated by the packet stored in the data buffer 241 occurs. More specifically, the enable control circuit 242 outputs an asserted enable signal ("1") to the ECC check circuit 243. At all other times, the enable control circuit 242 outputs a deasserted enable signal ("0") to the ECC check circuit 243. For example, when the determination by the ECC check circuit 243 to be described later is completed, the enable control circuit 242 outputs the deasserted enable signal ("0") to the ECC check circuit 243.

Responding to the asserted enable signal ("1") from the enable control circuit 242, the ECC check circuit 243 determines whether the error of the data has occurred, based on the data indicated by the packet stored in the data buffer 241 and the ECC indicated by the packet stored in the data buffer 241.

When the ECC check circuit 243 determines that an error has occurred in any one bit of the data, the ECC check circuit 243 outputs an error correction signal indicating the position of the bit to the error correction circuit 244. When the ECC check circuit 243 determines that an uncorrectable two or more-bit error has occurred in the data, the ECC check circuit 243 outputs an error notification signal to notify the error to the bus master.

When no error has occurred in the data, the error correction circuit 244 outputs the packet indicating the data inputted from the data buffer 241 to the bus master as it is, as the read data. When the error has occurred in the data on the other hand, the error correction circuit 244 corrects the error of the data indicated by the packet inputted from the data buffer 241 and then outputs the packet to the bus master. The method and the configuration of the concrete error correction of the data are the same as those of the error correction circuit 143 according to Embodiment 1. Accordingly, the explanation thereof is omitted.

Here, in the DDR memory 25, it is possible to specify the address from which the data is read or into which the data is written, by specifying the column address and the row address. The DDR I/F 24 realizes the access to the DDR memory 25 by decomposing the address indicated by the packet into the column address and the row address and transmitting the address signal indicating each address to the DDR memory 25 in two steps. Accordingly, the number of the address signal lines between the DDR I/F 24 and the DDR memory 25 is reduced. However, for example, when the number of the data signal lines of the DDR memory 25 is 32, the lower-order 2 bits of the address indicated by the packet are meaningless; accordingly, they are not outputted to the DDR memory 25.

However, when a stuck-at fault occurs in one of the address signal lines, the above-described configuration is equivalent to the address being influenced by the stuck-at fault for 2 bits. However, according to Embodiment 11, the two or more-bit error can be detected as described above; therefore, such a fault also can be detected certainly.

Here, other effects of Embodiment 11 are explained with reference to FIG. 47. More specifically, as illustrated in FIG. 47, the DDR I/F 24 includes a DDR control circuit 310 and a cache memory 320.

The DDR control circuit 310 reads the data stored at the read address of the DDR memory 25 according to the packet indicating the read address outputted from the conversion circuit 23. When the data is cached to the cache memory 320, the DDR control circuit 310 reads the data from the cache memory 320 instead of reading from the DDR memory 25. Then, the DDR control circuit 310 generates a packet indicating the data read as the read data, and outputs the generated packet to the conversion circuit 23.

The cache memory 320 is managed with the set associative scheme and includes multiple ways. When the n-way set associative scheme is employed, the cache memory 320 includes n areas in each of which multiple data is stored. Each of the n areas is tagged with each of n kinds of different way addresses.

Figure 47:
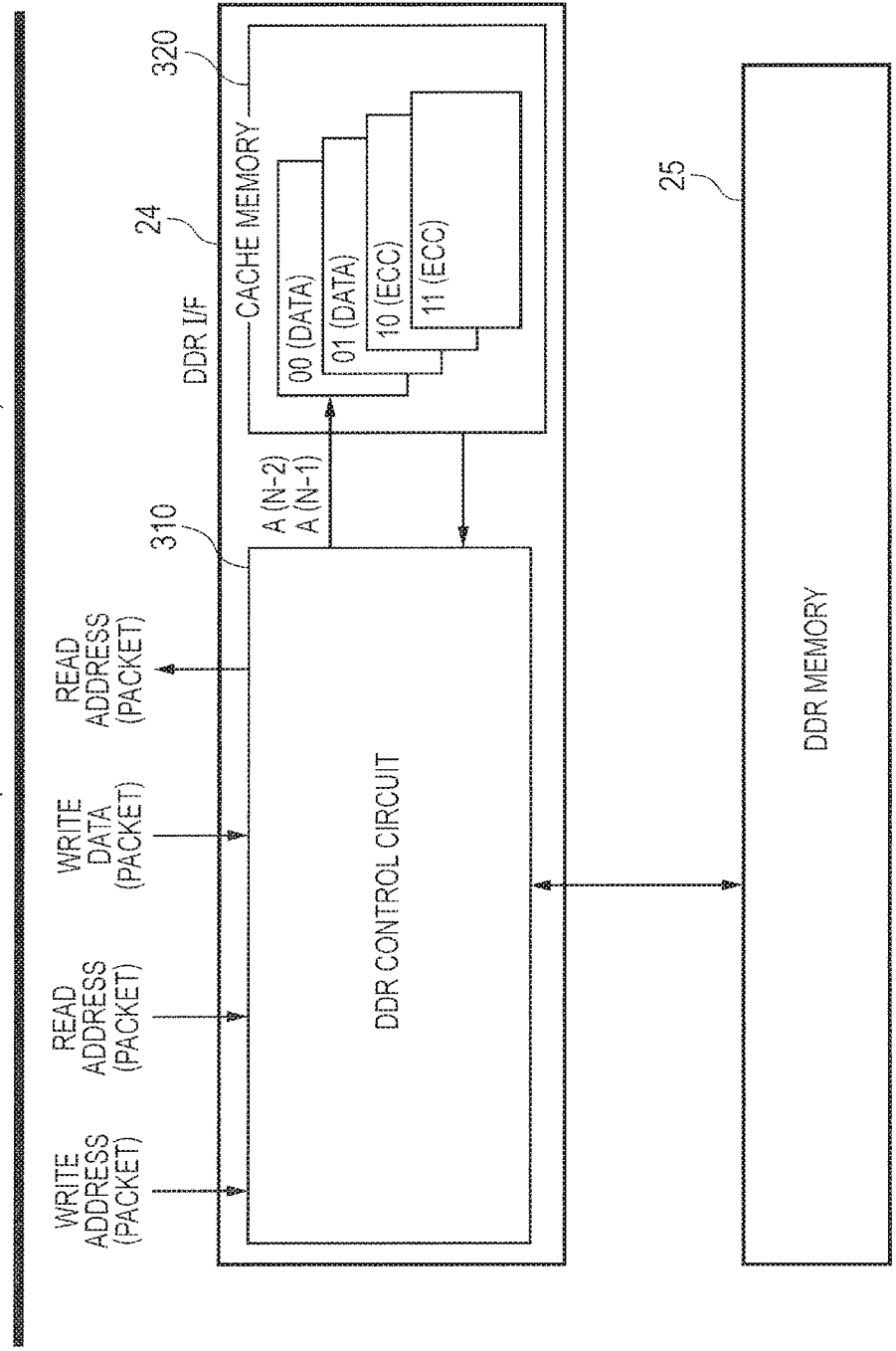
FIG. 47 is a drawing for explaining the effect of Embodiment 11.

A 4-way set associative scheme is employed in FIG. 47. FIG. 47 illustrates an example in which each of four areas are tagged with each of four kinds of way addresses, "00", "01", "10", and "11." Here, it is assumed that the way address uses higher-order 2 bits of the N-bit read address.

In Embodiment 11, the RADR conversion circuit 220 inverts the bit value of the address to read the ECC of the lower-order N bits among the (N+1) bits of the read address, to the address to read the data. Therefore, when the way address to read the data is "00", the way address to read the ECC becomes "11." That is, according to Embodiment 11, the value of the lower-order one bit is mutually different between the tag of the way to store the data and the tag of the way to store the ECC.

Therefore, when a stuck-at fault occurs in the signal line corresponding to the lower-order one bit of the way address among the address signal lines, the data and the ECC are read from the tag having the same value in the lower-order one bit. Accordingly, the pairing of the data and the ECC is collapsed. As a result, the fault is detected by the RDT conversion circuit 240. That is, it is understood that Embodiment 11 can be suitably applied to such a DDR I/F 24.

The above explanation is made for the example in which the address conversion according to Embodiment 1 is performed, in the configuration in which the write and read of data are performed by use of the packet according to Embodiment 11. However, the example is not restricted to this. In the configuration in which the write and read of data are performed by use of the packet according to Embodiment 11, it is also preferable to perform the address conversion according to one of other Embodiments 2 to 10. When the value of the bits of the number less than N of the address signal as the prescribed number of bits is inverted or permutated, each way of the cache memory 320 is tagged with the bits which include at least one bit of the prescribed number of bits of the address signal.

As explained above, in Embodiment 11, the address buffer 211 stores the first packet indicating the first address received from the bus master. The WADR conversion circuit 210 and the RADR conversion circuit 220 generate the second packet indicating the second address, based on the first address indicated by the first packet stored in the address buffer 211. The WADR conversion circuit 210 sends the first packet received from the bus master to the DDR I/F 24, and sends the generated second packet to the DDR I/F 24. Consequently, the WADR conversion circuit 210 executes the write of the data at the first address and the write of the error detecting code at the second address. The RADR conversion circuit 220 sends the first packet received from the bus master to the DDR I/F 24, and sends the generated second packet to the DDR I/F 24. Consequently, the RADR conversion circuit 220 executes the read of the data from the first address and the read of the error detecting code from the second address.

Accordingly, even when the write and read of data are performed in the form of a packet from the bus master, it is possible to detect the fault of the address signal system. When the burst access mode in which consecutive multiple addresses are accessed continuously is provided in order to improve data access efficiency, it is preferable to output the original value as the lower-order multiple bits of the address corresponding to the range accessed by one burst access, excluding them from the target of the address conversion in the ECC-specific ADR generation circuit 212 of the WADR conversion circuit 210 and the RADR conversion circuit 220. Even in this case, when a stuck-at fault occurs in one of the address signal lines between the DDR I/F 24 and the DDR memory 25, the corresponding higher-order multiple bits which are sent after being decomposed into the column address and the row address via the same address signal line as the lower-order multiple bits are also influenced by the stuck-at fault. Accordingly, it is also possible to detect such fault.

In Embodiment 11, the DDR I/F 24 includes the cache memory 320 to cache the data of the DDR memory 25 with the set associative scheme. The address as the second address is generated by inverting the value of the prescribed number of bits among the bits (corresponding to the lower-order N bits) other than the value of at least one bit of the first address (corresponding to the (N+1)-bit address). Each way of the cache memory 320 is tagged with the bits including at least one bit of the prescribed number of bits.

Accordingly, it is possible to detect the fault of the address signal system by diverting the function in the cache memory 320 of the DDR I/F 24.

Embodiment 12

Next, the configuration and the operation of Embodiment 12 are explained with reference to drawings. The configuration and the operation of the CPU system 1 according to Embodiment 12 are fundamentally the same as the configuration and the operation of the CPU system 1 according to Embodiment 1 as illustrated in FIG. 1. Accordingly, the explanation thereof is omitted. However, in Embodiment 12, the configuration and the operation of a part of the I/F conversion circuit 13 included in the CPU system. 1 are different from the configuration and the operation of the I/F conversion circuit 13 according to Embodiment 1.

Figure 48:
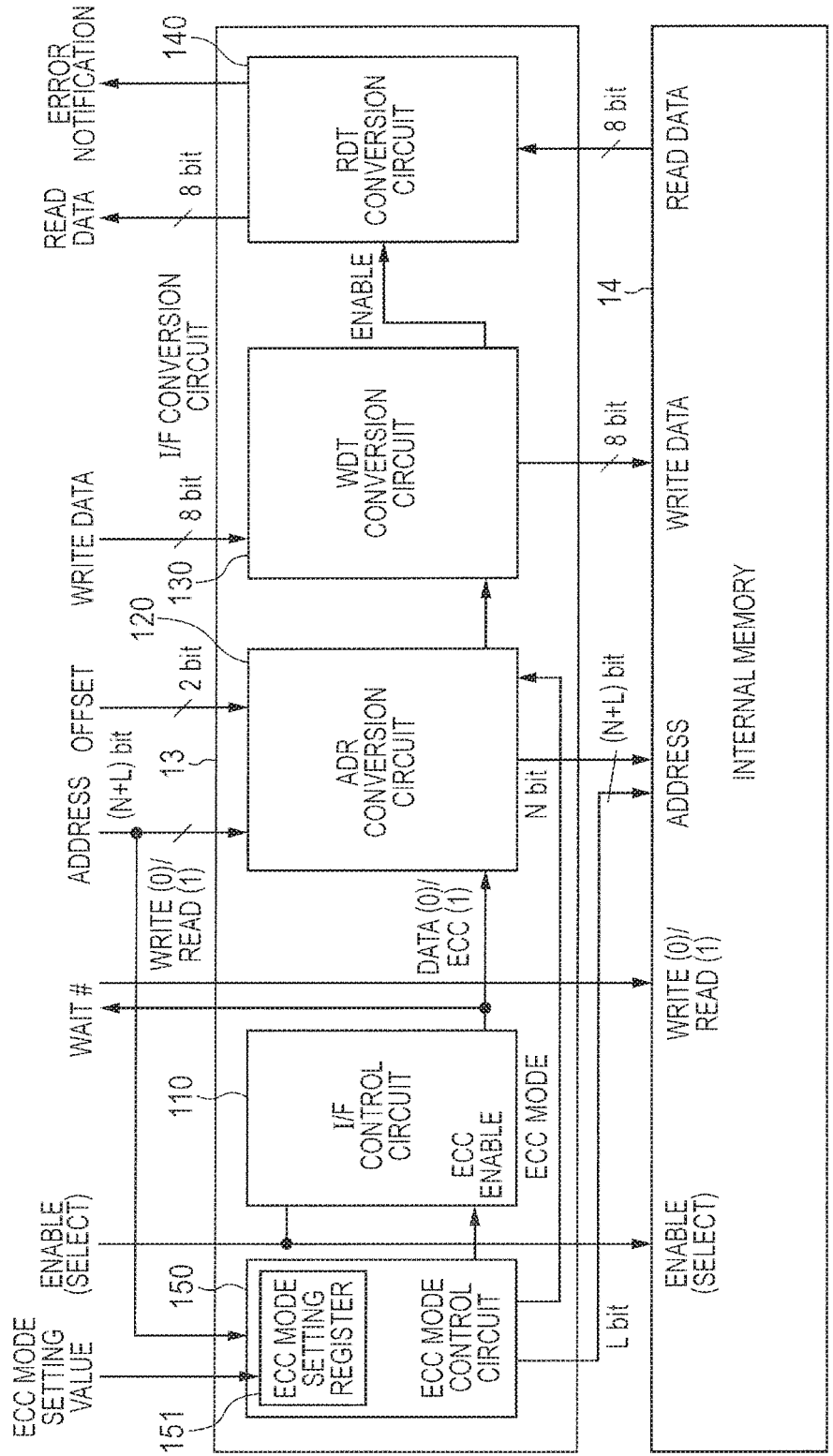
FIG. 48 is a block diagram illustrating the configuration of an I/F conversion circuit according to Embodiment 12.

Next, with reference to FIG. 48, the configuration of the I/F conversion circuit 13 according to Embodiment 12 is explained. The I/F conversion circuit 13 according to Embodiment 12 further includes an ECC mode control circuit 150, as compared with the I/F conversion circuit 13 according to Embodiment 10.

The ECC mode control circuit 150 includes an ECC mode setting register 151. The ECC mode setting register 151 stores various kinds of setting values concerning the ECC mode. The ECC mode control circuit 150 performs the control to enable or to disenable the ECC mode and the control to switch the ECC mode when the ECC mode is enabled, according to the setting value stored in the ECC mode setting register 151.

Here, for example, the following (1)-(4) are set to the ECC mode setting register 151, as the setting value. Here, in (2)-(4), it is possible to set up multiple groups each being associated.

(1) Enabling/disenabling the ECC mode
(2) ECC mode
(3) Range of the ECC mode (specified by the start address and the end address of the range, for example)
(4) Offset from the area to store the data to the area to store the ECC When the setting value to disenable the ECC mode is stored in the ECC mode setting register 151, the ECC mode control circuit 150 suppresses the processing concerning the ECC (the write of the ECC into the internal memory 14, the read of the ECC from the internal memory 14, and the determination of the data error based on the ECC), in the I/F control circuit 110, the ADR conversion circuit 120, the WDT conversion circuit 130, and the RDT conversion circuit 140.

For example, the ECC mode control circuit 150 outputs the deasserted ECC enable signal ("0") to the I/F control circuit 110. When the deasserted ECC enable signal ("0") is inputted from the ECC mode control circuit 150, the I/F control circuit 110 suppresses the output of the asserted wait #signal ("0") in the first clock cycle.

When the setting value to enable the ECC mode is stored in the ECC mode setting register 151 on the other hand, the ECC mode control circuit 150 permits the processing concerning ECC (the write of the ECC into the internal memory 14, the read of the ECC from the internal memory 14, and the determination of the data error based on the ECC), in the I/F control circuit 110, the ADR conversion circuit 120, the WDT conversion circuit 130, and the RDT conversion circuit 140.

For example, the ECC mode control circuit 150 outputs the asserted ECC enable signal ("1") to the I/F control circuit 110. When the asserted ECC enable signal ("1") is inputted from the ECC mode control circuit 150, the I/F control circuit 110 outputs the asserted wait #signal ("0") in the first clock cycle.

The address signal inputted from the bus master into the ADR conversion circuit 120 is inputted also into the ECC mode control circuit 150. When the ECC mode is enabled, the ECC mode control circuit 150 determines whether the address indicated by the address signal is included in the range of the ECC mode of (3). When the address indicated by the address signal is included in the range of the ECC mode, the ECC mode control circuit 150 outputs, to the ADR conversion circuit 120, the ECC mode signal to specify the ECC mode which is set in an associated manner within the range of the ECC mode in the ECC mode setting register 151.

The ECC mode control circuit 150 modifies the value of the higher-order L bits of the address signal inputted from the bus master, into the value added with the offset value of (4) described above which is set in an associated manner in the range of the ECC mode in the ECC mode setting register 151. The ECC mode control circuit 150 outputs a signal indicating the value after the modification to the internal memory 14. This L-bit signal is utilized as the signal of the higher-order L bits of the (N+L)-bit address signal to be inputted into the internal memory 14.

Figure 49:
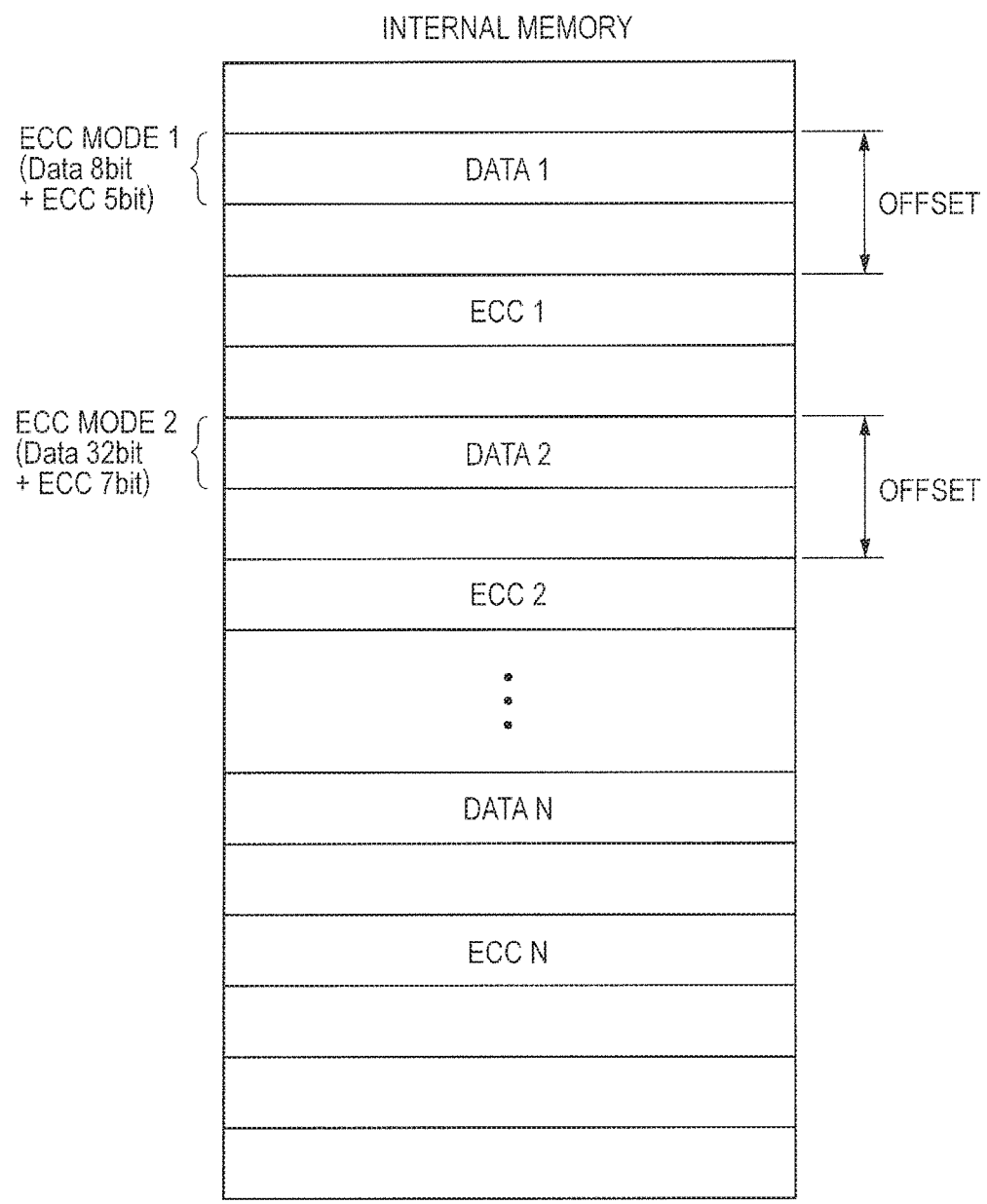
FIG. 49 is a conceptual drawing of a memory map of an internal memory according to Embodiment 12.

Accordingly, as illustrated in FIG. 49, as for the data stored in the specific range in the internal memory 14, the ECC corresponding to the data can be stored in the first ECC mode, and as for the data stored in other specific range, the ECC corresponding to the data can be stored in the second ECC mode.

Accordingly, the address is converted as illustrated in FIG. 50. That is, in the first ECC mode as illustrated in the upper part of FIG. 50, an offset is added to the value of the higher-order L bits of the (N+L)-bit address, and the value of the lower-order N bits is inverted. In the second ECC mode as illustrated in the lower part of FIG. 50, an offset is added to the value of the higher-order L bits of the (N+L)-bit address. As for the value of the lower-order N bits, the higher-order M bits are modified into the offset set in the offset setting register 1251, and the lower-order (N−M) bits change to values in which the higher-order (N−M) bits are shifted to the lower direction.

The above explanation is made for the example in which the ECC mode control circuit 150 according to Embodiment 12 is applied to the I/F conversion circuit 13 according to Embodiment 10. However, the example is not restricted to this. The ECC mode control circuit 150 according to Embodiment 12 may be applied to the I/F conversion circuit 13 according to one of Embodiments 8 and 9.

Outline Configuration of the Embodiment

Figure 51:
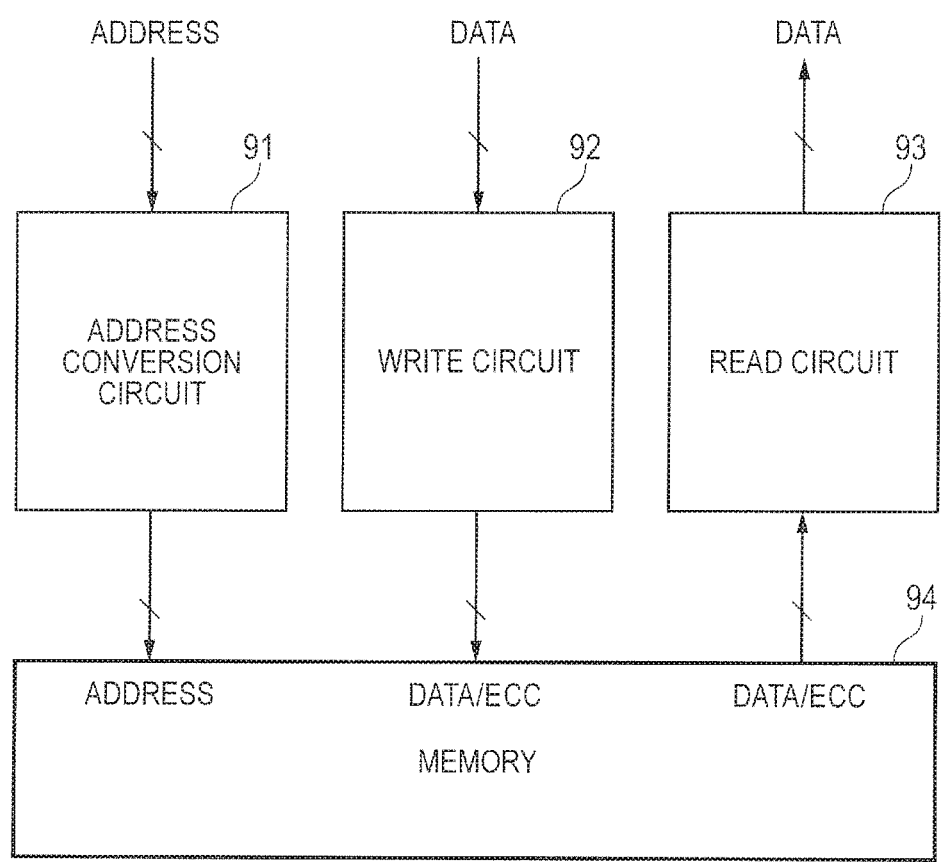
FIG. 51 is a drawing illustrating the semiconductor device serving as the outline configuration of Embodiments 1 to 12.

With reference to FIG. 51, the following explains the configuration of a semiconductor device 9 as the outline configuration of the CPU system 1 according to Embodiments 1 to 12 described above. That is, a part of characteristic configuration in the CPU system 1 according to Embodiments 1 to 12 is extracted as illustrated in FIG. 51.

As illustrated in FIG. 51, the semiconductor device 9 includes an address conversion circuit 91, a write circuit 92, and a read circuit 93.

The address conversion circuit 91 generates the second address for storing the error detecting code generated from the data based on the first address for storing the data in a memory 94. The address conversion circuit 91 corresponds to the ADR conversion circuit 120.

When the write of data to the first address is requested, the write circuit 92 writes the data in the first address and at the same time writes the error detecting code in the second address. The write circuit 92 corresponds to the WDT conversion circuit 130.

When the read of data from the first address is requested, the read circuit 93 reads the data from the first address, reads the error detecting code from the second address, and detects an error based on the data and the error detecting code. The read circuit 93 corresponds to the RDT conversion circuit 140.

Here, the address conversion circuit 91 generates an address as the second address, by modifying the value of at least one bit of the first address, by offsetting the storing position of the error detecting code to the storing position of the data, and by inverting or permutating the value of the prescribed number of bits among the other bits.

As described above, the invention accomplished by the present inventors has been concretely explained based on the embodiments. However, it cannot be overemphasized that the present invention is not restricted to the embodiments as described above, and it can be changed variously in the range which does not deviate from the gist.

In Embodiments 1 to 12 described above, the explanation is made for the example in which the ECC (error correction code) enabling one-bit error correction and two or more-bit error detection is employed as the error detecting code for detecting the error of the data. However, the example is not restricted to this. It is also preferable to utilize the CRC (Cyclic Redundancy Check) or the parity code, as the error detecting code. However, it is more preferable to utilize the ECC which enables not only an error detection but also error correction, as described above.

In the address signal processing circuit of the internal memory 14 or the DDR I/F 24 described above, even in the case where the processing to convert the address between the logical address and the physical address is executed, the present embodiments can be applied.

The number and the value of bits of various kinds of signals described above are not restricted to the examples described above. For example, the enable signal and the error notification signal may set the asserted value to "0" and the negated value as "1." The wait #signal may be an active-high signal. The write/read signal may set the value to specify the write as "1", and the value to specify the read as "0." The wait #signal may be multiple bits which specify the prescribed higher-order bits of the address.

The data width, the address width, and the data volume of the internal memory 14 described above are not restricted to the example described above. The number of bits M of the offset value is not restricted to the example of two bits described above. The offset value is not restricted to the value described above.

What is claimed is:

1. A semiconductor device comprising:
   an address conversion circuit configured to receive, from a bus master, read/write requests including a first address for storing data in a memory and to generate a second address for storing an error detecting code generated from the data based on the first address;
   a write circuit configured to write the data at the first address when a write request for writing the data at the first address is received from the bus master, and to write the error detecting code at the second address received from the address conversion circuit; and
   a read circuit configured to read the data from the first address when a read request for reading the data stored at the first address is received from the bus master, and to read the error detecting code from the second address received from the address conversion circuit and detect an error based on the read data and the read error detecting code,
   wherein the address conversion circuit is configured to generate an address as the second address by modifying a value of at least one bit of the first address so as to offset a storing position of the error detecting code relative to a storing position of the data, and by inverting a value of, or permutating an order of, bits of a prescribed number of other bits of the first address,
   wherein, when a first mode is specified, the address conversion circuit is configured to generate an address as the second address by shifting bits other than the at least one bit of the first address by a prescribed offset bit number to a lower-order direction, and
   wherein, when a second mode is specified, the address conversion circuit is configured to generate an address as the second address by shifting bits except bits of an offset bit number from a lower order to a lower-order direction by the offset bit number among the bits other than the at least one bit of the first address, and by modifying the shifted bits of the offset bit number from a higher order to a preset offset value.

2. The semiconductor device according to claim 1, wherein the address conversion circuit is configured to generate an address as the second address by inverting the value of the bits of the prescribed number.

3. The semiconductor device according to claim 1, wherein the address conversion circuit is configured to generate an address as the second address by permutating the order of the bits of the prescribed number.

4. The semiconductor device according to claim 3, wherein the address conversion circuit is configured to generate an address as the second address by shifting the bits of the prescribed number to a higher-order direction or a lower-order direction.

5. The semiconductor device according to claim 3, wherein the address conversion circuit is configured to generate an address as the second address by inverting the order of the bits of the prescribed number.

6. A semiconductor device comprising:
   an address conversion circuit configured to receive, from a bus master, read/write requests including a first address for storing data in a memory and to generate a second address for storing an error detecting code generated from the data based on the first address;
   a write circuit configured to write the data at the first address when a write request for writing the data at the first address is received from the bus master, and to write the error detecting code at the second address received from the address conversion circuit; and
   a read circuit configured to read the data from the first address when a read request for reading the data stored at the first address is received from the bus master, and to read the error detecting code from the second address received from the address conversion circuit and detect an error based on the read data and the read error detecting code,
   wherein the address conversion circuit is configured to generate an address as the second address by modifying a value of at least one bit of the first address so as to offset a storing position of the error detecting code relative to a storing position of the data, and by inverting a value of, or permutating an order of, bits of a prescribed number of other bits of the first address,
   wherein, when a first mode is specified, the address conversion circuit is configured to generate an address as the second address by inverting the value of bits other than the at least one bit of the first address, and
   wherein, when a second mode is specified, the address conversion circuit is configured to generate an address as the second address by shifting bits except bits of a prescribed offset bit number from a lower order to a lower-order direction by the offset bit number among the bits other than the at least one bit of the first address, and by modifying the shifted bits of the offset bit number from a higher order to a preset offset value.

7. The semiconductor device according to claim 1,
   wherein the write request is the received from a bus master,
   wherein the bus master outputs an enable signal to the memory to enable a write operation of the data during a unit time in which the write operation of the data is carried out, wherein the semiconductor device further comprises a control circuit configured to, in response to the enable signal outputted by the bus master to enable the write operation, output to the bus master a second wait signal to disenable an operation of the bus master in lieu of a first wait signal to enable the operation of the bus master, during the unit time, and wherein the write circuit is configured to write the data at the first address, in response to the output of the second wait signal, and write the error detecting code at the second address, in response to a subsequent output of the first wait signal.

8. The semiconductor device according to claim 7,
wherein the memory is configured to store the write data inputted from the write circuit at the address indicated by the address signal inputted from the address conversion circuit,
wherein the address conversion circuit is configured to output an address signal indicative of the first address to the memory, in response to the output of the second wait signal, and output an address signal indicative of the second address to the memory, in response to the subsequent output of the first wait signal, and
wherein the write circuit is configured to output the data to the memory as the write data, in response to the output of the second wait signal, and output the error detecting code to the memory as the write data, in response to the subsequent output of the first wait signal.

9. The semiconductor device according to claim 7,
wherein the second wait signal is utilized as a value of the at least one bit of the first address, and
wherein the first wait signal is utilized as the value of the at least one bit of the first address after the modification.

10. The semiconductor device according to claim 1,
wherein the read request of the data is received from a bus master,
wherein the bus master outputs an enable signal to the memory to enable a read operation of the data during a unit time in which the read operation is carried out,
wherein the semiconductor device further comprises a control circuit configured to, in response to the enable signal to enable the read operation from the bus master, output to the bus master a second wait signal to disenable an operation of the bus master in lieu of a first wait signal to enable the operation of the bus master, during the unit time, and
wherein the read circuit is configured to read the data from the first address in response to the output of the second wait signal, and read the error detecting code from the second address in response to the subsequent output of the first wait signal.

11. The semiconductor device according to claim 10, wherein the read circuit is configured to hold the data read from the memory in response to the output of the second wait signal, and detect an error based on the error detecting code read from the memory and the held data, in response to the subsequent output of the first wait signal.

12. The semiconductor device according to claim 1,
wherein each of the write request of the data and the read request of the data is received from a bus master by receiving a first packet indicative of the first address from the bus master,
wherein the semiconductor device further comprises:
a buffer configured to store the first packet received from the bus master; and
an interface circuit configured to execute a write operation of the data and a read operation of the data, based on the address indicated by the first packet,
wherein the address conversion circuit is configured to generate a second packet indicative of the second address based on the first address indicated by the first packet stored in the buffer,
wherein the write circuit is configured to perform the write operation of the data at the first address and the write operation of the error detecting code at the second address, by transmitting the first packet received from the bus master to the interface circuit and transmitting the second packet generated by the address conversion circuit to the interface circuit, and
wherein the read circuit is configured to perform a read operation of the data from the first address and the read operation of the error detecting code from the second address, by transmitting the first packet received from the bus master to the interface circuit and transmitting the second packet generated by the address conversion circuit to the interface circuit.

13. The semiconductor device according to claim 12,
wherein the address conversion circuit is configured to generate an address as the second address by inverting the value of bits of a prescribed number,
wherein the interface circuit comprises a cache memory configured to cache data of the memory using a set associative scheme, and
wherein each way of the cache memory is tagged with bits including at least one of the bits of the prescribed number.

14. The semiconductor device according to claim 1 further comprising:
a mode control circuit provided with a storage unit to set a value indicative of the first mode or the second mode, and which specifies the first mode or the second mode set in the storage unit to the address conversion circuit.

15. A memory access control method comprising the steps of:
writing data in a first address when a request to write the data at the first address for storing the data in a memory is received from a bus master;
generating a second address for storing an error detecting code generated from the data, the second address being generated based on the first address, and writing the error detecting code at the generated second address;
reading the data from the first address when a request to read the data stored in the first address is received from the bus master, and generating the second address based on the first address; and
reading the error detecting code from the second address, and detecting an error based on the read data and the read error detecting code,
wherein each of the generating the second address for storing an error detecting code and the generating the second address based on the first address generates an address as the second address by modifying a value of at least one bit of the first address so as to offset a storing position of the error detecting code to the storing position of the data, and by inverting the value of, or permutating an order of, bits of a prescribed number among bits other than the at least one bit,
wherein, when a first mode is specified, an address is generated as the second address by shifting bits other than the at least one bit of the first address by a prescribed offset bit number to a lower-order direction, and wherein, when a second mode is specified, an address is generated as the second address by shifting bits except bits of an offset bit number from a lower order to a lower-order direction by the offset bit number among the bits other than the at least one bit of the first address, and by modifying the shifted bits of the offset bit number from a higher order to a preset offset value.

\* \* \* \* \*